United States Patent [19]

Binkley et al.

[11] Patent Number: 5,088,033

[45] Date of Patent: Feb. 11, 1992

[54] DATA PROCESSING SYSTEM EMULATION IN A WINDOW WITH A COPROCESSOR AND I/O EMULATION

[75] Inventors: Joseph H. Binkley; Perry A. Caro; John B. Dillon, all of Palo Alto; Charles R. Fay, Long Beach; Jonathan Gibbons, Mountain View; Hilary N. Hooks, Newark; Abdo G. Kadifa; Jeffery W. Lee, both of Sunnyvale; William C. Lynch, Palo Alto; Clayton W. Mock, Redwood City; Everett T. Neely, Montara; Michael L. Tallan, Mountain View; Geoffrey O. Thompson, Palo Alto; Gaya Vukkadala, Sunnyvale; John D. Wick, Palo Alto; Donald R. Woods, Los Altos, all of Calif.

[73] Assignee: Xerox Corporation, Stamford, Conn.

[21] Appl. No.: 499,196

[22] Filed: Mar. 23, 1990

Related U.S. Application Data

[63] Continuation of Ser. No. 856,526, Apr. 28, 1986, abandoned.

[51] Int. Cl.⁵ .............................................. G06F 9/455
[52] U.S. Cl. ................................... 395/500; 364/232.3; 364/228.6; 364/237.2; 364/264.3; 364/DIG. 1
[58] Field of Search ... 364/200 MS File, 900 MS File

[56] References Cited

U.S. PATENT DOCUMENTS

| | | | |
|---|---|---|---|
| 3,643,252 | 2/1972 | Roberts, Jr. | 340/324 A |
| 3,932,843 | 1/1976 | Trelut et al. | 340/172.5 |
| 3,955,180 | 5/1976 | Hirtle | 340/172.5 |

(List continued on next page.)

FOREIGN PATENT DOCUMENTS

| | | |
|---|---|---|
| 0165517 | 12/1985 | European Pat. Off. . |
| 0168034 | 1/1986 | European Pat. Off. . |
| 0197499 | 10/1986 | European Pat. Off. . |
| 0205949 | 12/1986 | European Pat. Off. . |

(List continued on next page.)

OTHER PUBLICATIONS

Mike Heck "Quadlink Running Apple Software on an IBMPC", Interface Age, May 1984, pp. 108–110.

(List continued on next page.)

*Primary Examiner*—Thomas C. Lee
*Assistant Examiner*—Larry Donaghue
*Attorney, Agent, or Firm*—James T. Beran

[57] ABSTRACT

An emulating data processor includes a host system and an emulating processor with outputs to and inputs from the host system. The emulating processor executes sequences of instructions executable by a PC being emulated, but a host processor independently executes sequences of its instructions which are different from PC instructions. Circuitry monitors the emulating processor ouputs and provides information to the host system so that it can emulate the environment of the PC CPU, emulating both memory and I/O devices. The memory accesses of the emulating processor are mapped into the host system memory, so that the host processor is protected from defective PC software on the emulating processor. The display updates of the emulating processor are detected and provide information for the host processor in updating a part of its display which provides the information a PC display would provide simultaneously with the display characteristic of the host system. An input/output processor handles I/O operation requests of the emulating processor, using the host system I/O devices to emulate some of the PC I/O devices. Output operations to the printer may go either to a local printer or to a file for subsequent printing, so a buffer which can be unloaded to either destination emulates the PC printer. Floppy operations may be handled either by a floppy disk controller like that of the PC or by a software controller of a file in host rigid disk memory which may be accessed as a PC floppy disk, so that a data structure containing parameters of the operation is loaded and provided to the appropriate controller. Rigid disk operations are handled by another file in host rigid disk memory which may be accessed as a PC rigid disk, and an appropriate I/O operating system routine is provided so that the emulating processor can pass the operation parameters through to the host rigid disk controller in a group of registers. Keyboard input operations may come either from the host keyboard or directly from a data structure managed by the host processor, in each case converted to PC codes, and another buffer which can be loaded from either source emulates the PC keyboard. The host system emulates the environment of the emulating processor while emulating the user interface of the PC.

47 Claims, 61 Drawing Sheets

U.S. PATENT DOCUMENTS

| | | | |
|---|---|---|---|
| 4,031,517 | 6/1977 | Hirtle | 364/200 |
| 4,149,148 | 4/1979 | Miller et al. | 340/721 |
| 4,149,238 | 4/1979 | James et al. | 364/200 |
| 4,204,206 | 5/1980 | Bakula et al. | 340/721 |
| 4,253,145 | 2/1981 | Goldberg | 364/200 |
| 4,278,973 | 7/1981 | Hughes et al. | 340/721 |
| 4,315,310 | 2/1982 | Bayliss et al. | 364/200 |
| 4,365,294 | 12/1982 | Stokken | 364/200 |
| 4,365,295 | 12/1982 | Katzman et al. | 364/200 |
| 4,437,184 | 3/1984 | Cork et al. | 371/19 |
| 4,456,954 | 6/1984 | Bullions, III et al. | 364/200 |
| 4,458,331 | 7/1984 | Amezcua et al. | 364/900 |
| 4,463,442 | 7/1984 | Dachowski et al. | 364/900 |
| 4,484,266 | 11/1984 | Becker et al. | 364/200 |
| 4,484,302 | 11/1984 | Cason et al. | 364/900 |
| 4,550,386 | 10/1985 | Hirosawa et al. | 364/900 |
| 4,555,775 | 11/1985 | Pike | 364/900 |
| 4,564,903 | 1/1986 | Guyette et al. | 364/300 |
| 4,590,556 | 5/1986 | Berger et al. | 364/200 |
| 4,591,975 | 5/1986 | Wade et al. | 364/200 |
| 4,617,624 | 10/1986 | Goodman | 364/900 |
| 4,621,319 | 11/1986 | Braun et al. | 364/200 |
| 4,648,034 | 3/1987 | Heninger | 364/200 |
| 4,665,482 | 5/1987 | Murray, Jr. et al. | 364/200 |
| 4,695,945 | 9/1987 | Irwin | 364/200 |
| 4,703,420 | 10/1987 | Irwin | 364/200 |
| 4,709,328 | 11/1987 | Anthony, Jr. et al. | 364/200 |
| 4,713,751 | 12/1987 | Dretton et al. | 364/200 |
| 4,716,526 | 12/1987 | Mori et al. | 364/200 |
| 4,722,048 | 1/1988 | Hirsch et al. | 364/200 |
| 4,727,480 | 2/1988 | Albright et al. | 264/200 |
| 4,727,491 | 2/1988 | Culley | 364/200 |
| 4,729,094 | 3/1988 | Zolnowsky et al. | 364/200 |
| 4,731,736 | 3/1988 | Mothersole et al. | 364/900 |
| 4,757,441 | 7/1988 | Buckland et al. | 364/200 |
| 4,787,026 | 11/1988 | Barnes et al. | 364/200 |
| 4,812,975 | 3/1989 | Adachi et al. | 364/300 |
| 4,833,596 | 5/1989 | Buckland et al. | 364/200 |
| 4,899,136 | 2/1990 | Beard et al. | 340/706 |
| 4,934,036 | 6/1990 | Beard et al. | 340/706 |
| 4,939,507 | 7/1990 | Beard et al. | 340/706 |

FOREIGN PATENT DOCUMENTS

| | | |
|---|---|---|
| 0210345 | 2/1987 | European Pat. Off. |
| 0223383 | 5/1987 | European Pat. Off. |
| 0229336 | 7/1987 | European Pat. Off. |
| 0229700 | 7/1987 | European Pat. Off. |
| 0237671 | 9/1987 | European Pat. Off. |
| 2119977 | 11/1983 | United Kingdom |

OTHER PUBLICATIONS

Moskowitz "Applin-Card-Enchancing Your Apple", Interface Age Aug. 1983, pp. 107-108, 111.

Morganstein "Alf's 8088 Coprocessor for Your Apple", Byte, Dec. 1984, A. 38, 40-43.

Peck "Expanding Your Apple's Applications", Byte, Dec. 1984, pp. A45-A47, A122-126.

Libertine, J. A., "The Xerox 16/8 Professional: A Workhorse for the Office", *Business Computer Systems*, May 1984, pp. 147, 149, 151.

Xerox Corporation, "16/8 Professional Computer", one sheet Brochure.

Xerox Corporation, "Xerox 16/8 Professional Computer—Two Computers in One—Meeting Leaders Guide", 1-11, 1983.

"New Systems Abound at the National Computer Conference", *Byte*, Jul. 1983, p. 7.

"Honeywell MicroSystem 6/10", Honeywell Information Systems CU60-01, 1983.

"MicroSystem 6/10", Honeywell Information Systems CU60-04, 1985.

"How Would You Design A MicroSystem", Honeywell Information Systems GB 83-00.

"Honeywell Introduces Networking Microcomputer", Honeywell Inc., 1983.

"First Public Showing of MicroSystem 6/10 at NCC", Honeywell Inc., 1983.

"Honeywell Offers Powerful Networking Microcomputer", Honeywell Inc., 1983.

Irwin, J. W., "Use of a Coprocessor for Emulating the PC AT", in F. Waters, Ed., *IBM RT Personal Computer Technology*, IBM, Austin, 1986, pp. 137-141.

Krishnamurty, R., and Mothersole, T., "Coprocessor Software Support", in F. Waters, Ed., *IBM RT Personal Computer Technology*, IBM, Austin, 1986, pp. 142-146.

Goering, R., "Apollo Entry Fuels CAE/CAD Workstation Battle", *Computer Design*, Mar. 1, 1986, pp. 26-27.

"Copydisk", Xerox Corp., Palo Alto, 1980.

Rose, C.D., "Apollo Fights Back with New Work Stations", *Electronics*, Feb. 24, 1986, pp. 20-21.

Mace, S. and Sorenson, K., "Amiga, Atari Ready PC Emulators", *InfoWorld*, vol. 8, No. 18, May 5, 1986.

(List continued on next page.)

OTHER PUBLICATIONS

"IBM, Introduces High-Speed, Personal or Multi-User Workstations with New Technology for Technical Professionals", Business Wire, Inc., Jan. 21, 1986.

*8010 Star Information System Reference Library*, 5.0 Update, Xerox Corporation, 1984, pp. 119-188.

"M8.0 Operating System Sofware Bulletin", Xerox Corporation.

Seawright, L. H. and Mackinnon, R. A., "VM/370—A Study of Multiplicity and Usefulness", *IBM Syst. J.*, vol. 18, No. 1, 1979, pp. 4-17.

Deitel, H. M., *An Introduction to Operating Systems*, Addison-Wesley, Reading, Mass., 1984, pp. 601-629.

Madnick, S. E., and Donovan J. J., *Operating Systems*, McGraw-Hill, New York, 1974, pp. 549-563.

Smith, D. C., Irby, C., Kimball, R., and Harslem, E., "The Star User Interface: An Overview", AFIPS 1982 National Computer Conference Proceddings.

Hall, D. E., Scherrer, D. K., and Sventek, J. S., "A Virtual Operating System", *Communications of the ACM*, vol. 23, No. 9, Sep. 1980, pp. 495-502.

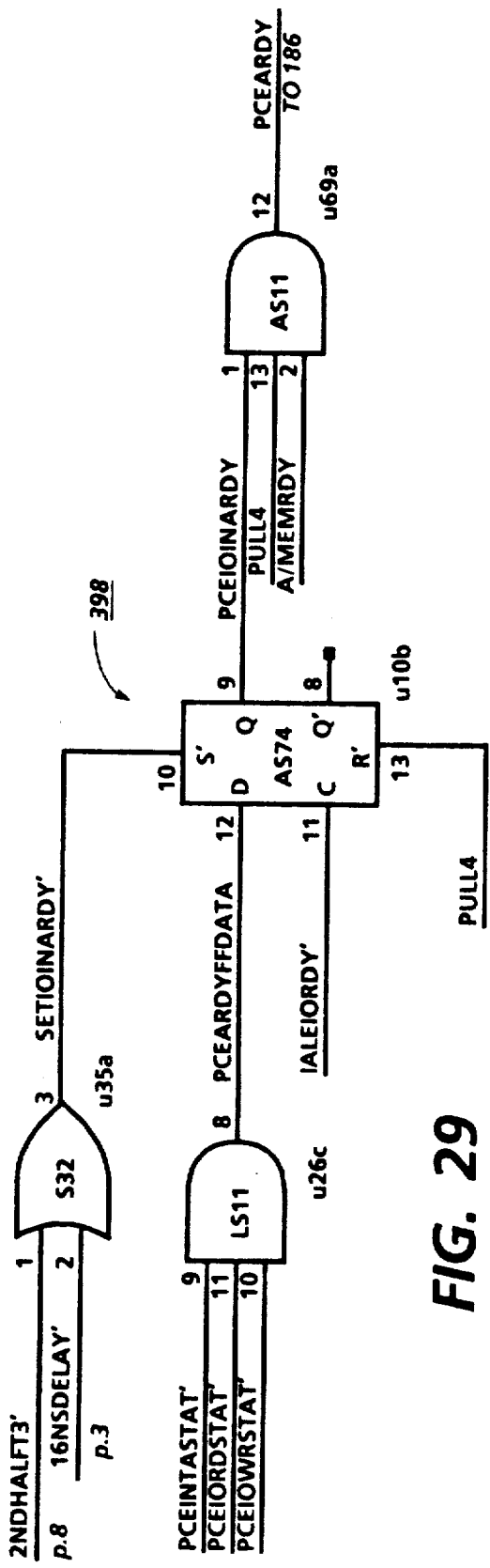
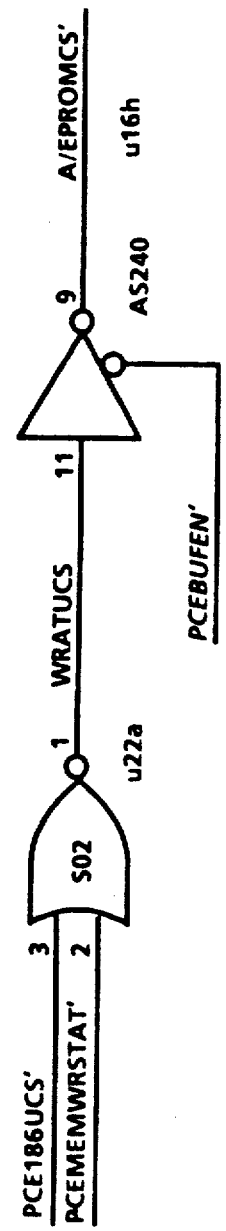
FIG. 29
FIG. 30

DATA PROCESSING SYSTEM EMULATION IN A WINDOW WITH A COPROCESSOR AND I/O EMULATION

This is a continuation of application Ser. No. 06/856,526, filed Apr. 28, 1986, now abandoned.

BACKGROUND OF THE INVENTION

The present invention relates to the emulation of one data processing system by another. More specifically, the present invention relates to the modification of a *host* data processing system to emulate another, dissimilar *target* system with a central processor (CPU) which is capable of executing a set of instructions different than those executable by the host system's CPU.

Many techniques for emulating a target data processing system are known. Such a technique may alternatively be described as a simulation of the target system, as making another system compatible with the target system, or as providing the target system as a virtual machine on a host system. U.S. Pat. No. 4,253,145 contains a helpful discussion of virtual machines in the prior art, most of which simulate mainframe computers so that programs written for the simulated computer can be run on the virtual machine.

In recent years, a vast amount of software has been written for a microprocessor-based data processing system called the IBM PC or IBM PC XT ("PC"), produced by International Business Machines Corporation. In order to make their products more useful, many manufacturers have developed systems which are either equivalent to the PC or can be made to operate in an equivalent manner by the use of software. Hardware and software technology have progressed rapidly, however, so that systems far more powerful than the PC can be produced for roughly the same cost. To devote such a system to the running of PC software is to sacrifice capabilities it could otherwise have. Therefore, it would be useful to have a technique for modifying one of these more powerful systems so that it could run software written for the PC without limiting its other capabilities.

SUMMARY OF THE INVENTION

The present invention provides techniques for modifying a system so that it can run PC software while retaining its own characteristic capabilities. For example, the present invention makes it possible for a host system capable of displaying more information than a PC to display within its own characteristic display all the information a PC would provide on its display, making that information available for manipulation by an operator using the features of the more powerful host system. Furthermore, the present invention makes it possible to execute PC software in such a manner that if the PC software cannot be executed, and therefore results in a crash, the host system will be protected and will continue to operate with full capabilities.

The present invention combines a host system with an emulating processor which is capable of running software written for a target system. The emulating processor is added so as not to prevent the host system CPU from performing its own independent operations while the emulating processor is operating, even though the two processors have different instruction sets. Also, the host system can provide an external interface which includes the features of an external interface of the target system while retaining those of the host system. For example, the host system can provide a display which includes the target system display but retains the display features of the host system.

The emulating processor is thus added in a manner which protects the host system CPU from crashes in the target system software, since the host system CPU is not executing the software which leads to the crash and may continue with its independent operation. Rather than being surrounded by the devices found in the target system, the emulating processor provides its output signals to the host system and receives input signals from the host system. Those input signals from the host system enable the emulating processor to continue to run target system software. The host system continues to operate as an independent system while supporting emulation of the environment which the emulating processor would have if it were the central processor of the target system. The host system CPU can therefore continue to operate independently with its own capabilities despite failure of the emulating processor due to defective or malicious software.

A number of previous techniques have made use of more than one processor in operations resembling emulation. None of the known techniques, however, combines a host system with an emulating processor which executes a different instruction set while the host system processor continues its independent operation. Similarly, none of the known techniques combines a host system with an emulating processor so that the host system interface for providing external transfer of signals operates in a manner characteristic of the host system while simultaneously operating in a different manner characteristic of a target system being emulated.

U.S. Pat. No. 4,564,903, for example, illustrates a technique for using more than one processor in a virtual machine system, with each of several multiprocessors executing as a virtual machine, and an I/O processor providing a channel between I/O devices and the main storage shared by the multiprocessors, the I/O processor servicing the I/O operations of the multiprocessors. U.S. Pat. No. 3,932,843 shows a similar technique in which two operational computers simulate the execution of a program on a target system for testing and development of the program, while a simulation computer simulates the peripheral equipment of the operational computers in response to their I/O operations.

It is also known to use a processor in a local terminal to access a remote computer, the display of the local terminal appearing as if it were a standard terminal of the remote computer. In this arrangement, there is no emulating processor, only the emulation of the display of the remote processor by the local terminal.

Techniques are also known in which a system is modified so that it can emulate another system by adding a board or card. These systems conventionally can operate only in one of the alternative modes at a time, however, so that an added processor is only able to perform emulation while the host system's CPU is either disabled from executing its own instructions or dedicated to servicing the I/O requests of the added processor, and therefore the host system's CPU cannot operate independently while the added processor is emulating. Furthermore, the display provides either the display of the host CPU or, if the added processor is operating, the display of the added processor, but not both at once.

The host system capabilities are in effect sacrificed while the added processor is operating.

Although each of the above techniques uses more than one processor to perform emulation, none uses an emulating processor which executes a different instruction set than the host system CPU while the host system CPU continues to operate independently. Furthermore, none of the above techniques has an interface which, during emulation, provides at the same time the characteristic features of a host system interface and the characteristic features of a target system interface, which differ from the host system interface.

In emulation according to one aspect of the invention, a host system has a host processor which executes a sequence of host system instructions and performs its independent operations while an emulating processor executes a sequence of target system instructions. The host system instruction set differs from the target system instruction set. The host system receives output signals from the emulating processor and provides input signals so that the emulating processor continues executing.

The target system includes a set of devices which provides an environment, referred to as its processor environment, in which the target system's central processor executes. According to a further aspect of the invention, the host system provides an equivalent environment to the emulating processor by providing input signals to the emulating processor corresponding to the input signals provided by the target system devices and by accepting output signals from the emulating processor. The host system may include circuitry which monitors the emulating processor for an output requesting an I/O operation and provides an I/O signal. The host system may further include emulating means for emulating that target system device in response to the I/O signal. The independent operations of the host processor may include I/O operations making use of I/O devices which are also used to emulate the target system devices. A target system device which is a memory medium may be emulated using a host system file which can also be accessed by the emulating processor as a memory medium. This memory medium file may be used to transfer data under the control of one processor to the control of the other, by selecting a screen object providing access to the file, by indicating a destination such as an emulated I/O device used by the emulating processor to access that type of memory medium and by providing the file to the destination processor.

The target system and the host system each have an interface for external transfer of signals and a processor controlling that interface. The processor in each system controls its interface in a manner characteristic of that system and different from the other system. According to another aspect of the invention, while the emulating processor executes target system instructions, providing output signals to and receiving input signals from the host system, the host processor controls the host interface to provide a transfer of signals in a manner which is characteristic of the host system and is simultaneously characteristic of the target system.

The host system interface may, for example, include a user interface having a display screen. The display characteristic of the target system may appear in part of the host system display screen, included within the display characteristic of the host system. This makes it possible for information transferred to the user through the target system display part to be manipulated according to information transferred from the user in a manner characteristic of the host system.

These and other objects, features and advantages of the invention will become more apparent from the attached drawings together with the following description and the appended claims.

BRIEF DESCRIPTION OF THE DRAWINGS

FIG. 29 is a detailed circuit diagram of ready signal circuitry.

FIG. 30 is a detailed circuit diagram of EPROM control signal circuitry.

DETAILED DESCRIPTION OF THE PREFERRED EMBODIMENTS

I. General Features

Figure 1:
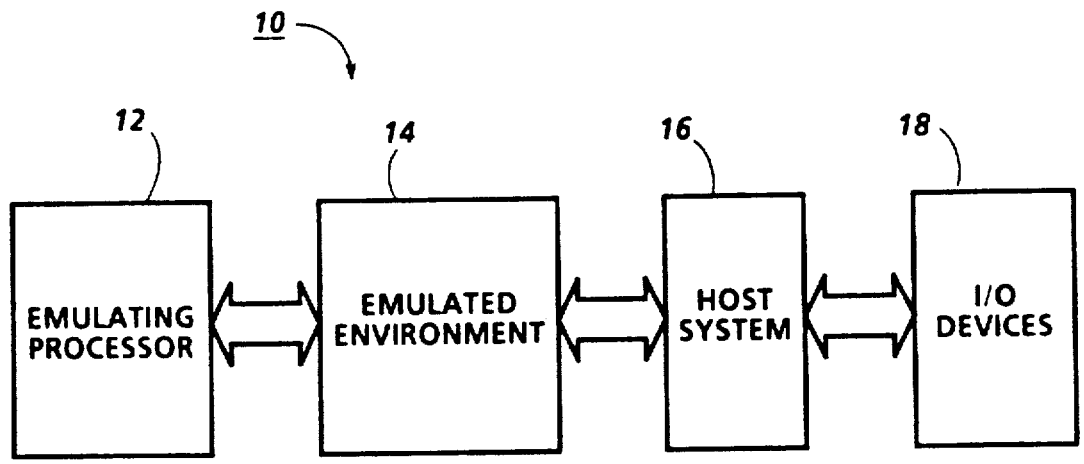
FIG. 1 is a functional block diagram showing the major components of an emulating system according to the invention.
Figure 2:
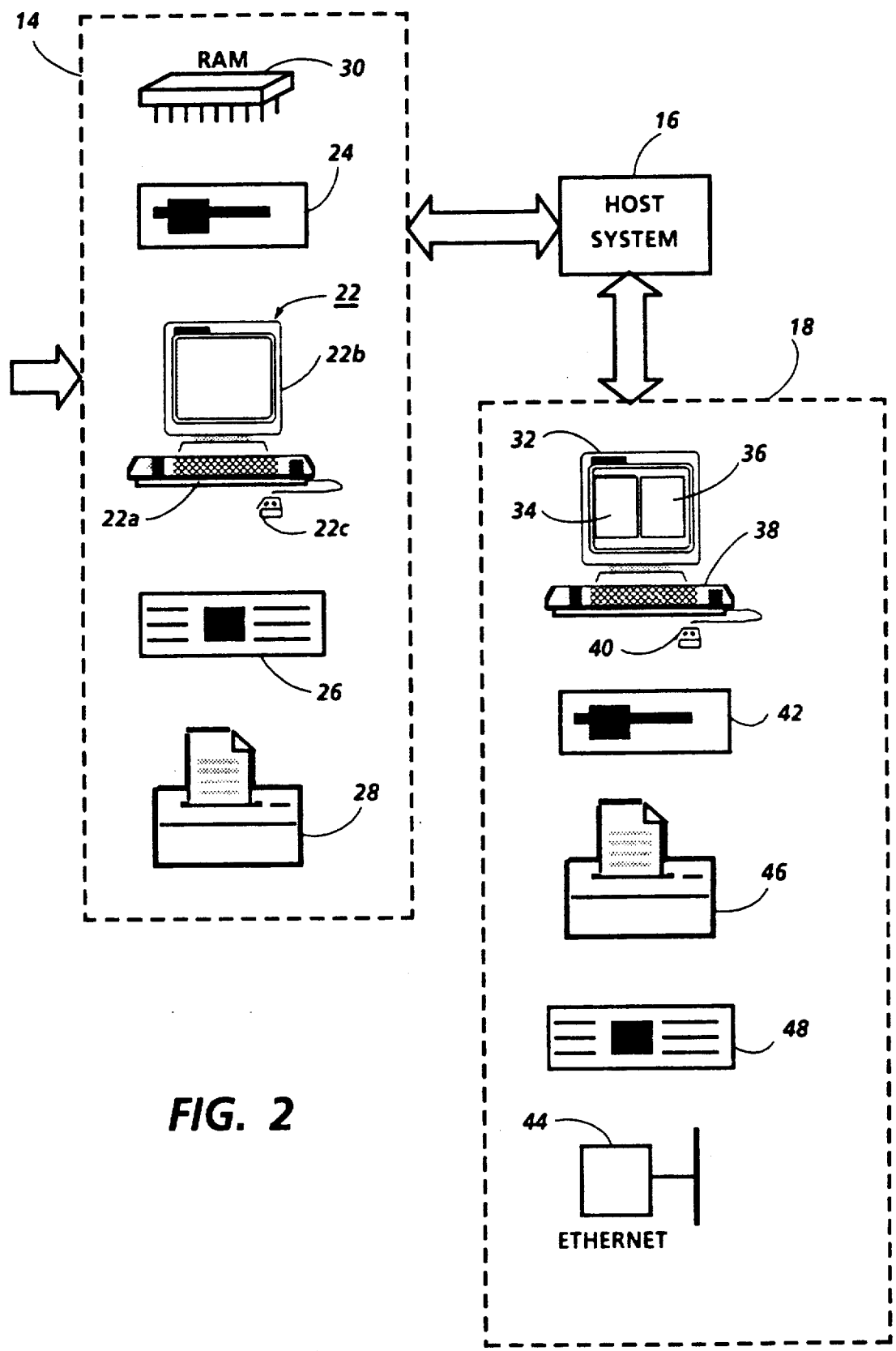
FIG. 2 is a is a schematic diagram illustrating emulation of the processor environment and user interface of a target system.

The general features of the invention can be understood from FIGS. 1-6. FIGS. 1 and 2 show features of systems according to the invention, while FIGS. 3-6 show features of methods according to the invention.

FIG. 1 shows the basic functional blocks of a data processing system according to the invention. As noted above, the underlying problems is that modifying a system to emulate another system ("the target system") usually sacrifices some capabilities of the system being modified. This problem is particularly acute when the system being modified is much more powerful and versatile than the target system, so that valuable capabilities are lost during emulation. System 10 in FIG. 1, however, solves this problem by providing emulation without loss of capabilities.

The focus of emulation in system 10 is the emulating processor 12, which is capable of executing sequences of the same instructions which the central processor of the target system can execute. This means that if one of those sequences of instructions is presented to the emulating processor 12, it will perform operations which permit it to continue to execute that sequence until the sequence is completed. While executing, it will provide output signals and receive input signals.

If emulating processor 12 were in fact the central processor of the target system, it would be connected to a set of devices which would provide a processor environment, receiving its output signals and, in response, providing appropriate input signals to it. Therefore, even though emulating processor 12 is capable of executing sequences of the same instructions as the target system central processor, it must also be in an environment which is equivalent to the processor environment. The emulated environment 14 in FIG. 1 represents this environment, which is in effect an interface which receives output signals from and, in response, provides input signals to emulating processor 12 corresponding to the input signals which would be provided by the set of devices in the target system. As a result, emulating processor 12 can continue to execute the sequence of instructions as if it were the target system central processor.

Emulated environment 14, rather than being provided by a set of devices as in the target system, is provided by host system 16, the system which is modified for emulation. As discussed below in greater detail, host system 16 is modified by a combination of hardware and software to provide appropriate input signals in response to output signals from emulating processor 12. These modifications are made without sacrificing the capabilities of host system 16, but rather by supplementing its capabilities, so that the resulting system has more capabilities than host system 16 by itself.

FIG. 1 also shows input and output (I/O) devices 18 connected to host system 16. Emulation would be somewhat cumbersome, however, if the user were unable to treat host system 16 as if it were the target system being emulated. Therefore, an important additional feature of the invention is to emulate the target processor's user interface in a manner which does not sacrifice the capabilities of the host system 16.

FIG. 2 shows in more detail the emulated environment 14 and the I/O devices 18 which provide the emulated user interface, all supported by host system 16. The emulated environment 14 includes emulated terminal 22, with emulated keyboard 22a and emulated display monitor 22b. It would also be possible to include emulated mouse 22c as part of emulated terminal 22. Emulated environment 14 may also include emulated floppy disk drive 24, emulated fixed or rigid disk 26 and emulated printer 28. Emulated environment 14 further includes emulated main memory 30 and also includes a number of other emulated devices or components discussed below. Referring to each of these devices as "emulated" implies only that they appear to the emulating processor 12 as if an equivalent actual device were connected to it. System 10 may not in fact include a corresponding actual device, or the corresponding actual device may not in fact be involved in the operation of an emulated device. In other words, host system 16 is capable of providing input signals to emulating processor 12 in the same manner as any of the emulated devices were it present.

The actual I/O devices 18 also emulate the user interface of the target system in the manner illustrated in FIG. 2. Of particular importance is display 32, which may emulate the target system's display within a part 34 of its screen, referred to as a window. At the same time, display 32 may continue to provide the host system's display in the background around window 34, in window 36 and elsewhere on the screen. Keyboard 38, mouse 40 and floppy disk drive 42 emulate the target system user interface differently, by being operable in the conventional manner by host system 16, but with host system 16 converting input data from and output data to these devices as if they were the corresponding devices in the target system. In other words, host system 16 interprets keystrokes, mouse clicks and data read from a floppy as if they were coming respectively from the target system keyboard, mouse and floppy disk drive. Network or Ethernet connection 44 may also be provided, permitting access to remote printers or workstations. Local printer 46 could also be provided, and it may be fed data as if it were the target system printer. The rigid disk 48 also participates in user interface emulation by providing an emulated rigid disk and virtual floppy disks which the user may treat as if they were part of the target system.

The specific emulated devices and actual I/O devices shown in FIG. 2 are merely illustrative. These devices would be appropriate for emulation of an IBM PC by a Xerox 6085 workstation, but other devices could be provided for emulation of other target systems by other host systems. The basic principle of emulating the processor environment and the user interface is extremely useful for an emulation implemented according to the invention.

Figure 3:
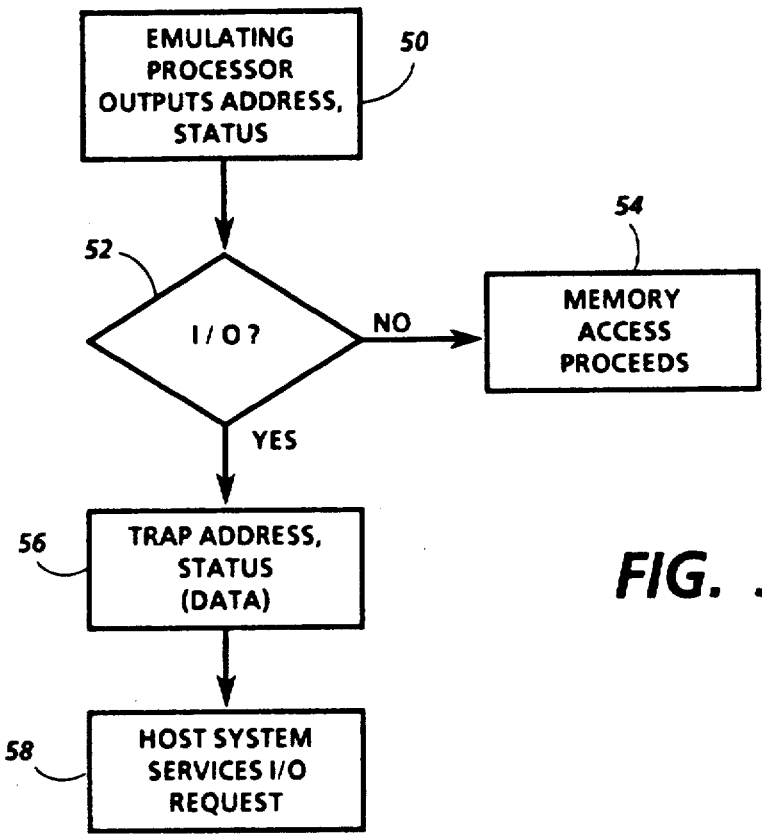
FIG. 3 is a flowchart showing basic steps in emulation of a target system's processor environment according to the invention.

FIG. 3 is a flowchart showing basic functional steps in emulation of the emulating processor's environment according to the invention. In box 50, emulating processor 12, during execution of a sequence of target system instructions, outputs information, such as an address and a number of bits of status information, indicating a type of operation. The operation may be a memory access or an I/O device operation. This information is received by a part of host system 16 which then determines in box 52 whether the requested operation is an I/O device operation.

If the requested operation is not an I/O device operation, host system 16 permits or enables the memory access by emulating processor 12 to proceed, in box 54. Emulating processor 12 may read or write to its main memory which is mapped into the host system memory as discussed below.

If the test in box 52 determines that an I/O device operation was requested, the information output by emulating processor 12 is trapped or stored, including address, status and, if an output operation is requested, data information, in box 56. Then host system 16 services the I/O request by emulating the I/O device requested, in box 58, providing appropriate inputs to enable emulating processor 12 to continue to execute the sequence of instructions.

Figure 4:
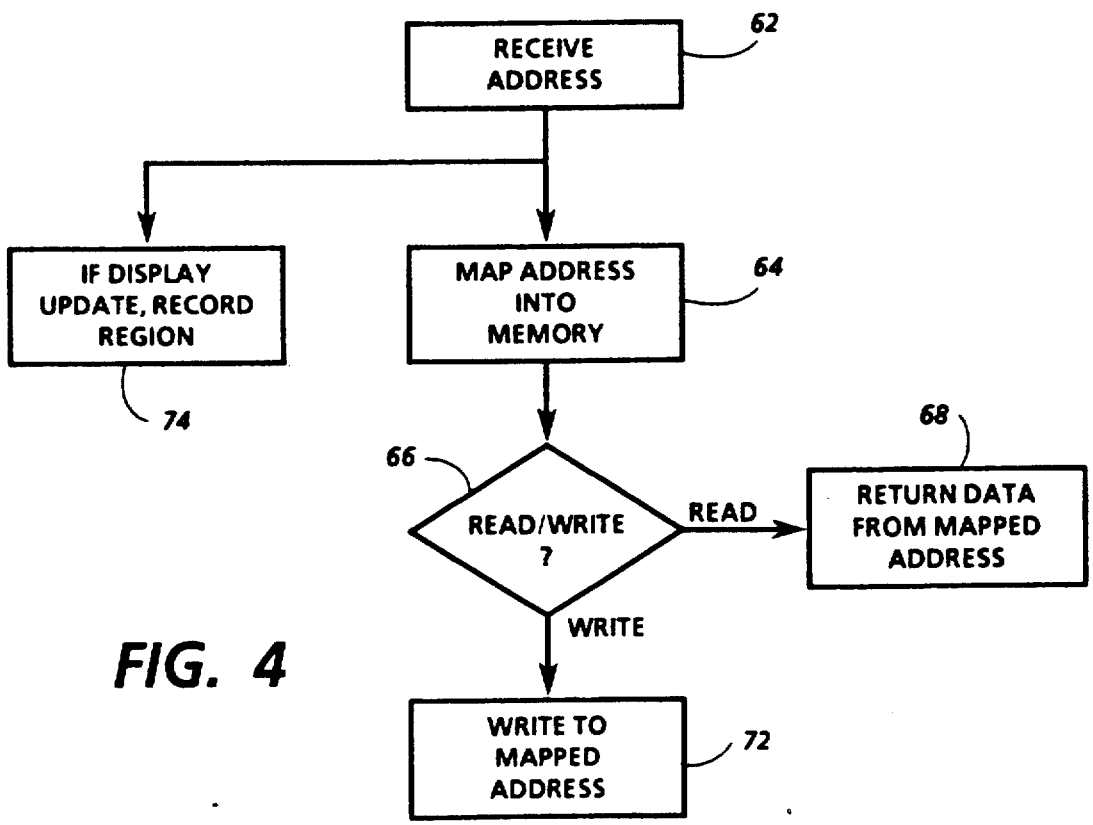
FIG. 4 is a flowchart showing a general technique for main memory emulation by memory mapping according to the invention.
Figure 5:
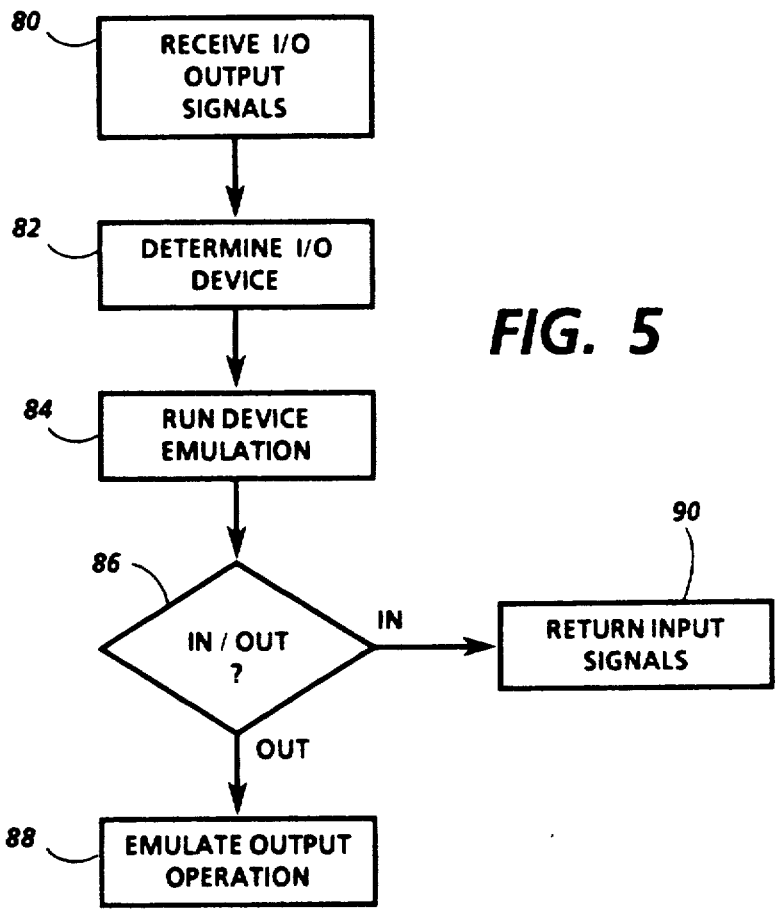
FIG. 5 is a flowchart showing a general technique for I/O device emulation according to the invention.

FIGS. 4 and 5 are generalized flowcharts showing in more detail how host system 16 performs some of the functions in FIG. 3. FIG. 4 shows how host system 16 may provide emulated main memory 30 during a memory access in box 54 in FIG. 3 and FIG. 5 shows how host system 16 may emulate an I/O device in emulated environment 14 while servicing an I/O request in box 58 in FIG. 3.

The main memory emulation technique of FIG. 4 permits host system 16 to allocate any appropriate part of memory to be the main memory for the emulating processor, while permitting host system 16 itself to also access that memory for its own purposes. In box 62, host system 16 receives an address from emulating processor 12. In box 64, host system 16 maps the address received according to an algorithm which is transparent to emulating processor 12. If emulating processor 12 calls for a read operation, as determined in box 66, host system 16 returns the data from the mapped address to emulating processor 12, as shown in box 68. But if a write operation is called for, host system 16 writes the data from emulating processor 12 to the mapped address in box 72. In box 74, concurrently with the above operations, another circuit in host system 16 receives the address and detects whether data is being written to a display bank in memory. If so, the updated display region is recorded. Subsequently, host system 16 retrieves the recorded information and updates the actual display, as discussed below in relation to FIG. 6.

FIG. 5 shows a technique for emulating an I/O device such as a floppy disk drive, keyboard, fixed disk drive, or printer. Host system 16 receives output I/O signals from emulating processor 12 in box 80, including address, status and, if an output I/O request, data, as mentioned above, and determines in box 82 to which I/O device the signals are directed. Then, in box 84, host system 16 calls a routine which emulates that device, making use of any appropriate resources actually available to host system 16, which may include a corresponding actual I/O device or dissimilar I/O devices. During the emulation routine, a test as in box 86 typically determines whether the I/O request is an output (OUT) or input (IN) request. An OUT request is typically handled by emulating the output operation, in box 88, while an IN request is typically handled by returning appropriate input signals in box 90. A number of specific emulation routines are discussed in greater detail below.

Emulating processor 12 typically accesses memory frequently, in order to retrieve its instructions and manipulate its data. I/O device operations are only requested occasionally, however, and emulating processor 12 typically operates so that the I/O device has more time in which to provide the responsive input signals. Therefore, the hardware and software implementation of memory emulation, as summarized in FIG. 4, is much different than I/O device emulation, summarized in FIG. 5, as is more fully described below.

We have already noted that the emulation of the target system's user interface is relatively straightforward for such devices as the keyboard and floppy disk drive. In each of these cases, it is basically necessary to convert or translate data into the form it would have if it had been generated or stored on the emulated device. The emulation of the display, however, is a special case, due to the problem of providing a display simultaneously having the characteristics of the target system display and the characteristics of the host system display. As with the more straightforward devices, it may be necessary to convert or translate the display update data from emulating processor 12, but it will also be necessary to integrate that data into a display with display data from host system 16.

Figure 6:
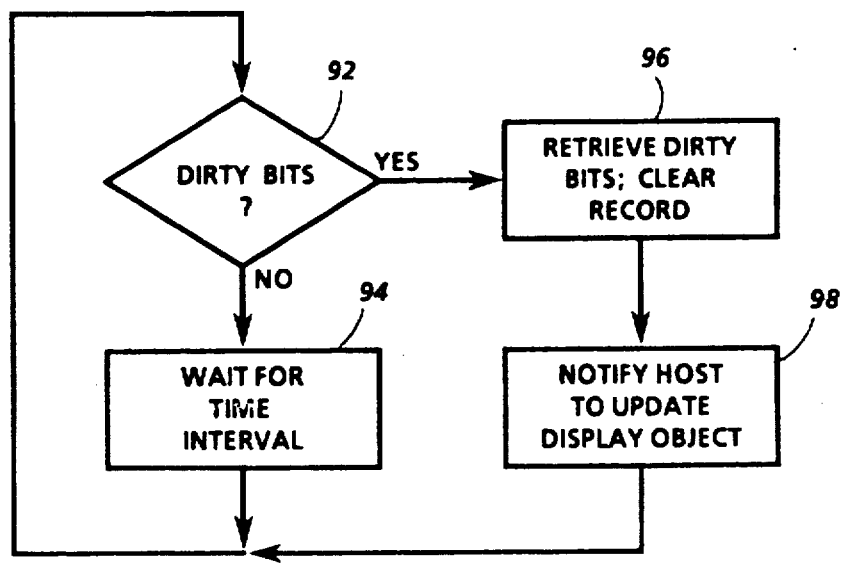
FIG. 6 is a flowchart showing a general technique for display emulation according to the invention.

FIG. 6 shows a technique according to the invention which solves this problem, enabling host system 16 to present a display characteristic of the host system which includes an emulated display characteristic of the target system based on data from emulating processor 12. This technique depends on information recorded in the step in box 74 in FIG. 4, in which a circuit in host system 16 records the region of the display which has been updated when emulating processor 12 writes data to its display bank in memory, which may be a character buffer or a bitmap memory. The technique of FIG. 6, however, is asynchronous with the step in box 74, even though it is performed by another part of host system 16.

In box 90, host system 16 determines whether any of the display regions have been updated based on the information recorded in box 74, if any. The record for each region may be a bit, referred to as a dirty bit, indicating when set that that region has been updated. If none of the dirty bits have been set, host system 16 waits for a time interval in box 94 before again performing the test in box 92. But if at least one dirty bit has been set, all of the dirty bits are retrieved and the record of dirty bits is cleared, in box 96. In box 98, another part of host system 16 is notified that the dirty bits have been retrieved, and proceeds to update a display object for the emulated display. In doing so, host system 16 will retrieve data from the emulating processor's display bank and will convert that data, if necessary, before loading it into the display object's data structure. The display object's data structure, however, is managed in much the same manner as other display object data structures in host system 16, so that even though its contents have the characteristics of a target system display, those contents appear within a display characteristic of the host system.

A display object data structure includes data which can be loaded into the host system bitmap memory by software running on the host system CPU, and which will then occupy only a part of the display, such as a window. The manner in which the data is loaded and the size and location of this window are determined by the software which loads the display object into the bitmap memory, preferably under control of the user. This elegant solution provides a display which can include both an emulated screen characteristic of the target system in a window and a background display including other windows and other display features characteristic of host system 16. This opens up the possibility of transferring data between the emulated screen and other windows under user control, a feature discussed in greater detail in coassigned U.S. patent application Ser. No. 856,525, now U.S. Pat. No. 4,899,136, incorporated herein by reference in its entirety.

The general features of the invention described above could be implemented in many ways with any of a multitude of different host systems emulating any of a multitude of target systems. The following detailed description shows more specifically how the Xerox 6085 system may be modified to emulate the IBM PC.

II. Host System Architecture

Implementation of the invention on a specific host system will depend heavily on that host system's architecture. Yet the invention could be implemented on any host system of suitable architecture and processing capabilities. The architecture of the host system must, of course, permit transfer of data as necessary between the emulating processor and the host system.

Figure 7:
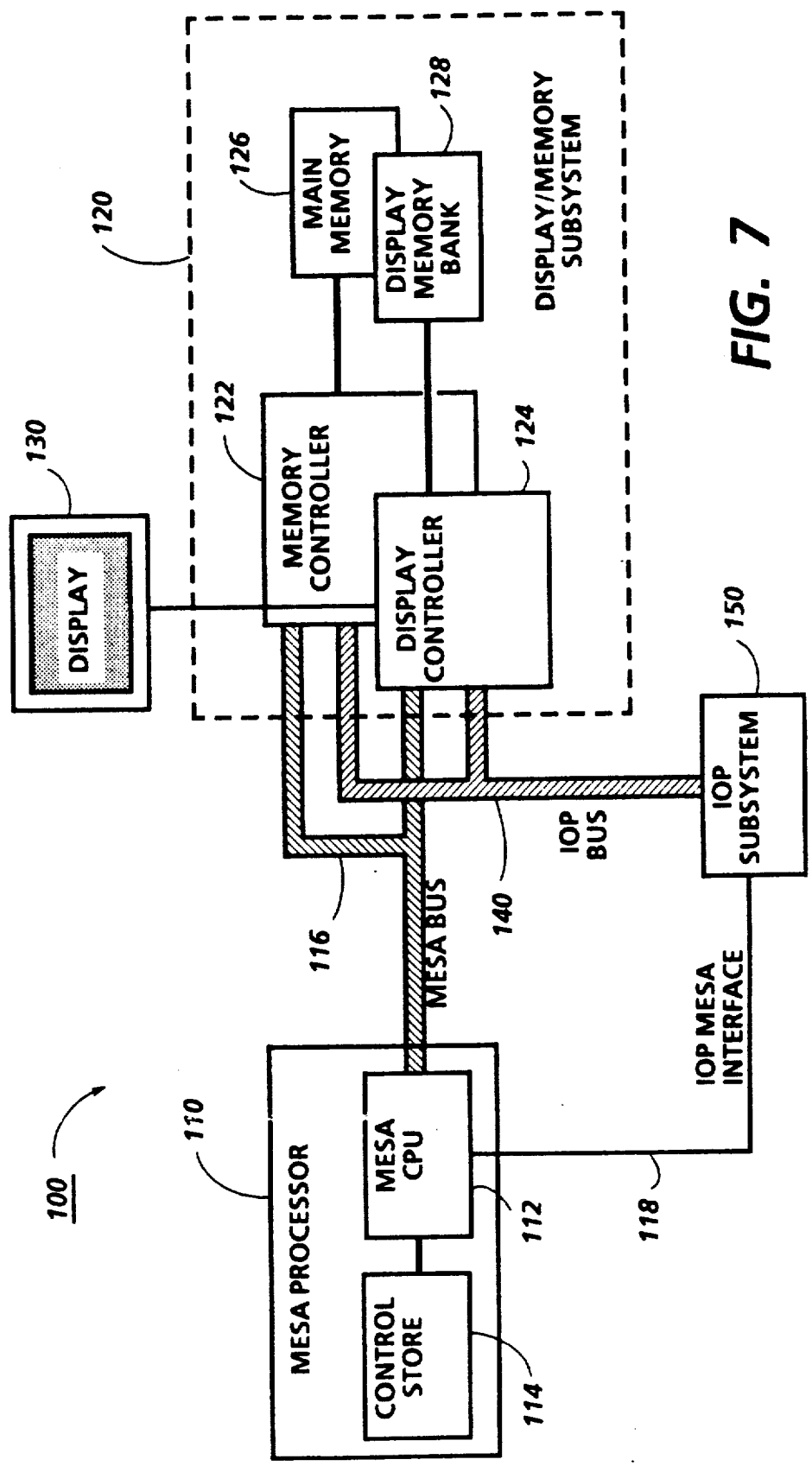
FIG. 7 is a block diagram showing a host system architecture like that of the Xerox 6085.

FIG. 7 shows the major subsystem of a system 100 with an architecture like the Xerox 6085. The main processor in system 100 is the Mesa processor 110, including Mesa CPU 112 and its control store 114. The Mesa processor 110 may be implemented in a number of ways, but is currently implemented as discrete components on a printed circuit board which, when running a microcoded Mesa emulator stored in control store 114, provides the architecture defined in the *Mesa Processor Principles of Operation*, Version 4.0, (May 1985) Xerox Corporation. Mesa processor architecture is further discussed in Johnsson, R. K. and Wick, J. D., *An Overview of the Mesa Processor Architecture*, Proc. of the Symposium on Architectural Support for Programming Languages and Operating Systems, Palo Alto, March 1982, also appearing in SIGARCH Computer Architecture News 10(2) and SIGPLAN Notices 17(4). Any suitable processor of comparable power could be used in place of Mesa processor 110 in system 100, and it may be preferable to implement Mesa CPU 112 on a single VLSI chip. Mesa processor 110 is connected by Mesa bus 116 to display/memory subsystem 120 and by an input/output processor (IOP)-Mesa interface 118 to the IOP subsystem 150.

Display/memory subsystem 120 includes memory controller 122 and display controller 124, each of which is connected to Mesa processor 110 by Mesa bus 116 and also to IOP subsystem 150 by IOP bus 140. These controllers are also currently implemented as components on printed circuit boards, but they may also each be implemented as a VLSI chip, with compatibility obtained by using the same chip for both controllers or by other appropriate means. Memory controller 122 controls main memory 126, determining which of several components, including Mesa processor 110 and IOP subsystem 150, currently has access to main memory 126 and providing memory refresh as necessary. Display controller 124 similarly controls access to display bank 128, which contains the bitmap memory, and reads from it to provide information for display on display monitor 130.

The subsystems described above remain substantially the same with or without the emulation feature of the present invention. As discussed below, Mesa CPU 112 executes some additional software during emulation. Parts of main memory 126 are used to store information to emulate the main memory of the emulating processor 12 and to emulate the devices which provide the processor environment, and it is helpful to have two sets of mapping registers in memory controller 122, as discussed below. Otherwise, the changes which must be made in system 100 to perform emulation according to the invention are in IOP subsystem 150.

FIG. 8 shows system 100 again, but with IOP subsystem 150 shown in greater detail. IOP bus 140 is the main data path through IOP subsystem 150. The components connected to it include controllers for a number of I/O devices, including floppy disk controller 142, connected to floppy disk drive 152; Ethernet controller 144 connected to Ethernet 154; rigid disk controller 146, connected to rigid disk drive 156; serial controller 148a, connected to receive signals from keyboard 158, including mouse signals; and serial controller 148b, connected to an RS232C port. The processor responsible for servicing these controllers is the I/O processor (IOP) 160, which may be an Intel 80186 microprocessor, as discussed below. IOP 160 also has access to RAM 162 and EPROM 164, which are connected to IOP bus 140. A bus arbiter/mode control, discussed below, arbitrates bus control requests from Ethernet controller 144, rigid disk controller 146 and IOP 160.

Figure 8:
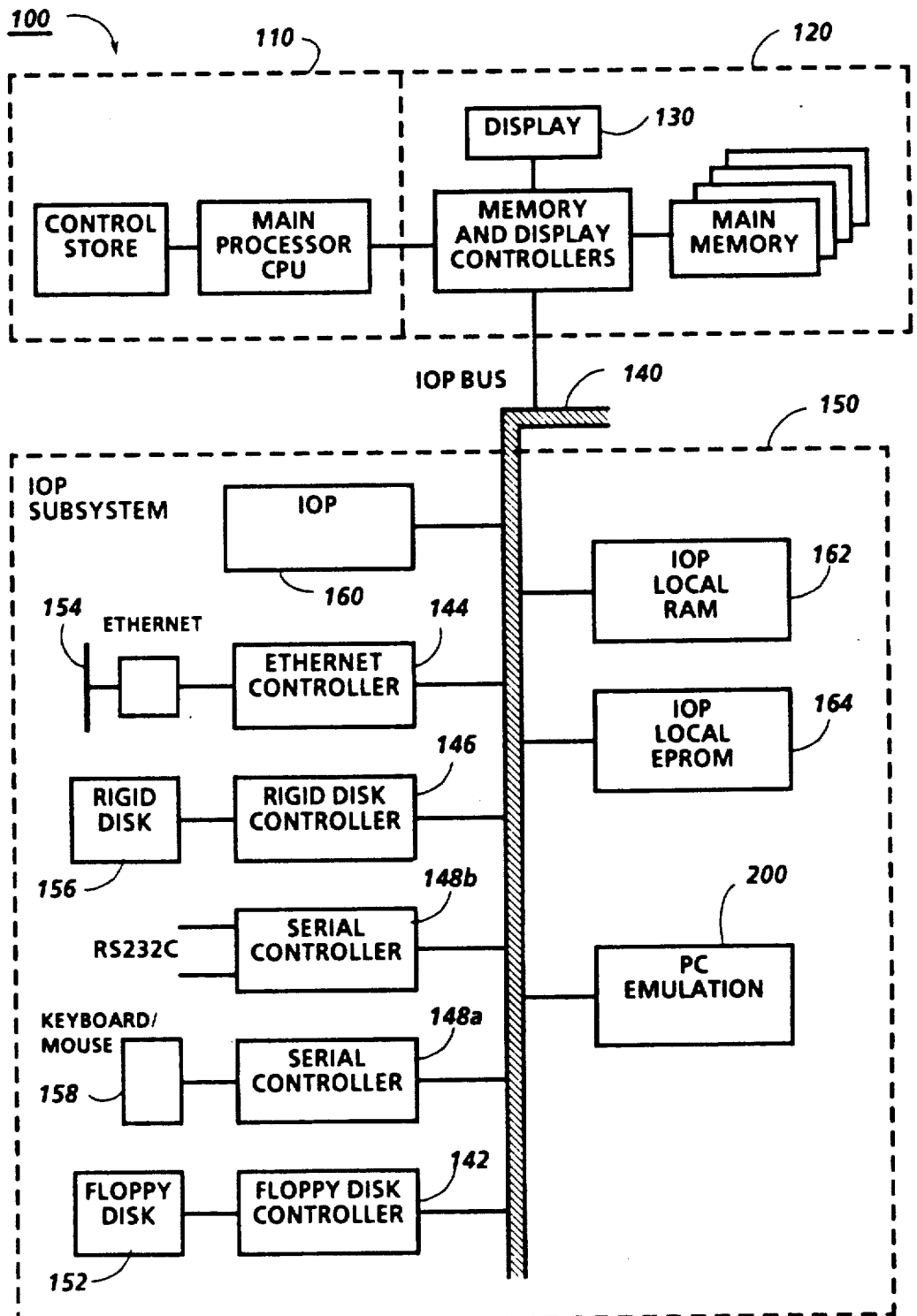
FIG. 8 is a block diagram showing in more detail the IOP subsystem of FIG. 7, including the PC emulation option according to the invention.

FIG. 8 shows PC Emulation (PCE) option 200 attached to IOP bus 140 in order to implement the present invention on system 100. PCE option 200 is preferably a discrete unit, such as a printed circuit board with attached components, so that it can be installed as an extension of IOP bus 140 without otherwise modifying the hardware of system 100. It may be necessary, however, that some components within IOP subsystem 150 and memory controller 122 be designed to accept PCE option 200. The emulating processor is within PCE 200, as discussed below.

Figure 10:
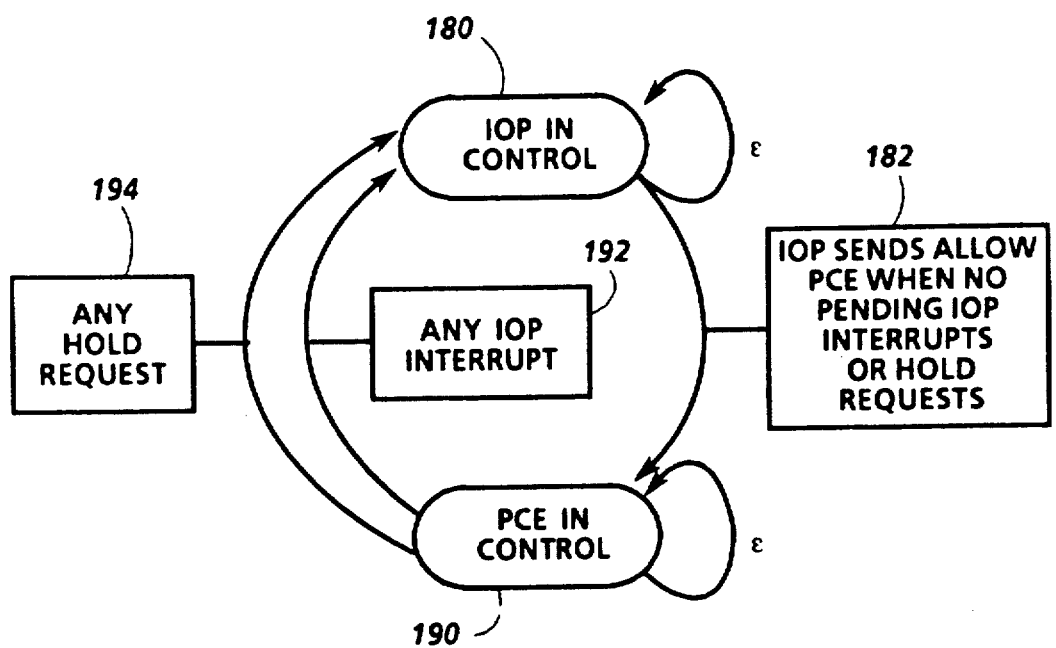
FIG. 10 is a state diagram of the mode control operation of bus arbiter/mode control of FIGS. 9A and 9B.
Figure 9A:
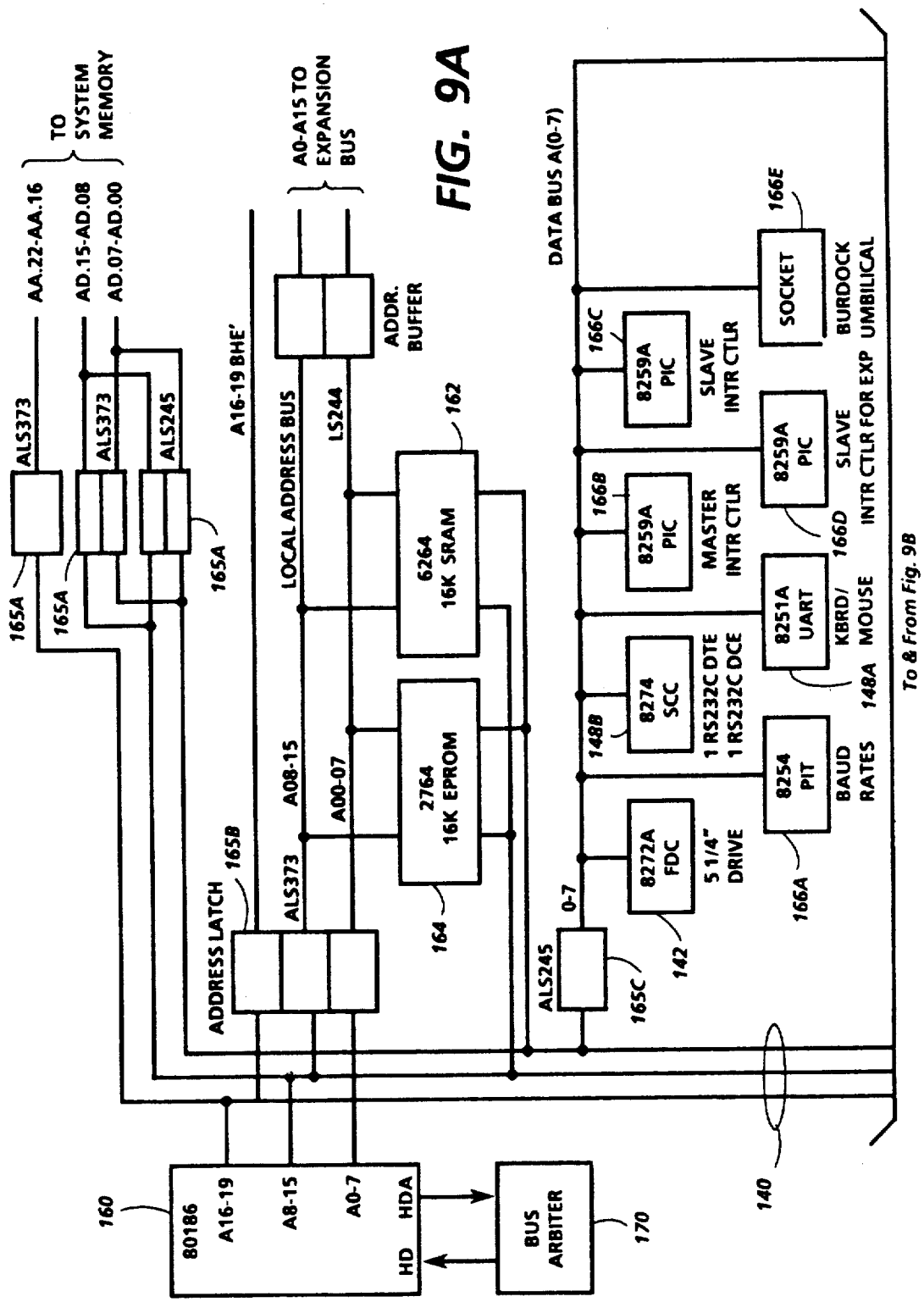
FIGS. 9A and 9B are a generalized circuit diagram showing in greater detail the components of the IOP subsystem of FIG. 8.
Figure 9B:
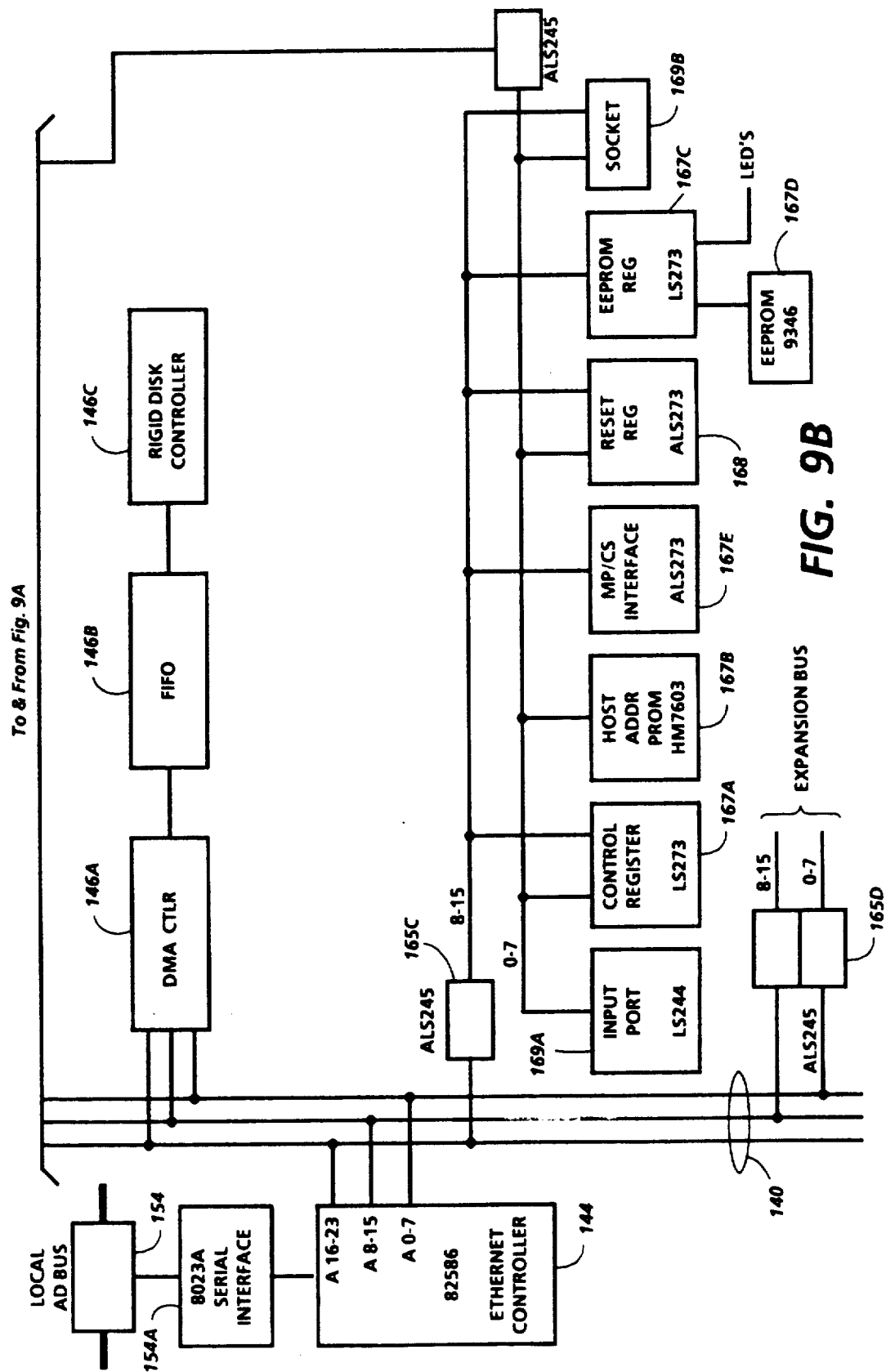

FIGS. 9A and 9B show the IOP bus structure of FIG. 8 in more detail, with many of the same components being shown with like reference numerals and with part numbers. Rigid disk controller 146 is connected to bus 140 through DMA controller 146a and FIFO buffer 146b. Ethernet controller 144 is connected to Ethernet 154 through serial interface 154a. FIG. 9A also shows bus arbiter/mode control 170 connected to IOP 160 so that arbiter/mode control 170 can send a hold request to IOP 160, which can reply with a hold acknowledge signal. FIG. 10, discussed below, provides more details about the mode control feature of arbiter/mode control 170.

FIGS. 9A and 9B show a number of additional connections to bus 140, generally involving buffers, drivers or latches, all of which are referred to below as connectors. Connectors 165a connect IOP bus 140 to the part of IOP bus 140 on the backplane, to which PCE option 200 is also connected. Connectors 165b connect to RAM 162 and EPROM 164, discussed above. Connectors 165c connect the data bus to a number of components, including floppy disk controller 142 and serial controllers 148a and 148b, discussed above, and additional components discussed below. Connectors 165d connect to an expansion bus for connecting additional options to the IOP bus 140.

The components connected through connectors 165c also include timer 166a, interrupt controllers 166b, 166c and 166d and socket 166e. Timer 166a provides timing signals to other components, such as serial controllers 148a and 148b. Master interrupt controller 166b receives interrupt request signals from a number of devices, several of which, including Mesa CPU 112, provide their requests through slave interrupt controller 166c, which may in turn receive interrupt requests from expansion bus devices through slave interrupt controller 166d. PCE 200 provides its interrupts directly to master controller 166b as the lowest priority interrupts. When no higher priority interrupts are present, master controller 166b will provide an interrupt request to IOP 160, also received by arbiter/mode control 170 and will also provide the starting address of the routine for servicing that interrupt. The routine for servicing a PCE interrupt is discussed below. Socket 166e provides a connection which can be used for debugging by connecting to another system.

Additional components connected through connectors 165c include control register 167a, host address PROM 167b, EEPROM register 167c, EEPROM 167d, MP/CS interface 167e, reset register 168, input port 169a and socket 169b. Control register 167a receives signals from IOP 160 and provides appropriate control signals to a number of I/O devices, including the speaker and floppy disk drive. Host address PROM 167b holds the unique Ethernet address of system 10, and can be accessed by IOP 160. EEPROM register 167c drives a number of LEDs and holds data used in writing EEPROM 167d at the time system 10 is installed. EEPROM 167d stores the configuration information for system 10 which is read at boot, and, for example, will contain data indicating whether PCE option 200 is included in system 10 or not. MP/CS interface 167e is a connector to the Mesa CPU 112 and its control store 114, a RAM, making it possible for IOP 160 to send and receive signals with CPU 112 and to write control store 114 in order to load it during boot of system 10. Reset register 168 receives signals from IOP 160 and provides appropriate reset signals to a number of devices, including PCE 200, Mesa CPU 112 and most of the I/O device controllers. Input port 169a is a port to a number of manual switches, permitting direct operator input for operation and testing of system 10. Socket 169b permits connection to bus 140 for debugging purposes.

Except as noted above, many of the components in FIGS. 9A and 9B do not relate directly to PCE 200. In addition to arbitrating requests from DMA controller 146a and Ethernet controller 144 for use of bus 140, however, arbiter/mode control 170 switches bus 140 between two modes, one in which IOP 160 has control and another in which a processor in PCE 200 has control. FIG. 10 shows a state diagram illustrating the mode control operation of arbiter/mode control 170. Circuitry to implement this state diagram could be implemented in many ways, including a circuit with discrete logic components or a dedicated VLSI chip.

In FIG. 10, IOP 160 has control of IOP bus 140 in state 180. This control is subject, however, to requests from DMA controller 146a and Ethernet controller 144 for use of bus 140, each of which may have priority over IOP 160. Such requests will therefore result in a hold request to IOP 160, and, when IOP 160 acknowledges the hold, the requesting controller will take control of the bus as needed. Upon completion of such operations, control will return to IOP 160, so that the mode control remains in box 180.

The only transition to another state from state 180 is transition 182, which occurs when IOP 160 sends a command to allow PCE 200 to have control of bus 140 at a time when no hold requests or interrupts to IOP 160 are pending. All other events follow the epsilon transition back to state 180, as shown. If IOP 160 sends the allow PCE command when an IOP interrupt or hold request is pending, this epsilon transition will be followed.

When transition 182 occurs, the mode control enters state 190, in which PCE 200 has control of bus 140. In this state, PCE 200 can access memory 126 through bus 140 and can proceed to execute a sequence of instructions until one of the transitions back to state 180 occurs. Transition 192 occurs whenever an interrupt is asserted to IOP 160, including an interrupt indicating that PCE 200 has requested an I/O operation. Similarly, transition 194 occurs whenever a hold request is made, such as on behalf of DMA controller 146a or Ethernet controller 144. PCE 200 does not originate hold requests. As long as neither an IOP interrupt or a hold request occurs, all events will follow the epsilon transition back to state 190, and PCE 200 will retain control of bus 140.

In effect, IOP 160 invites PCE 200 to use bus 140 at appropriate times as determined by IOP software. If no IOP interrupts or hold requests are pending when the invitation occurs, PCE 200 then takes control of IOP bus 140 and continue to operate until IOP 160 or another device asserts control or until PCE 200 requires I/O operations to be performed by IOP 160. In addition to performing mode control according to FIG. 10, arbiter/mode control 170 contains circuitry which, when a hold signal is sent to PCE 200 to cause it to relinquish control of bus 140, prevents other circuitry from taking over bus 140 until PCE 200 acknowledges the hold. Arbiter/mode control 170 contains additional circuitry, not shown, which arbitrates between requests from rigid disk controller 146, Ethernet controller 144 and IOP 160 and which ensures that when an interrupt occurs, IOP 160 services it. The arbitration circuitry may treat a hold acknowledge from PCE 200 substantially the same as a hold acknowledge from IOP 160.

The software modifications which accompany the addition of PCE option 200 are discussed in greater detail below, but first we turn to a discussion of the architecture of PCE option 200.

III. PCE Board Structure

Figure 11:
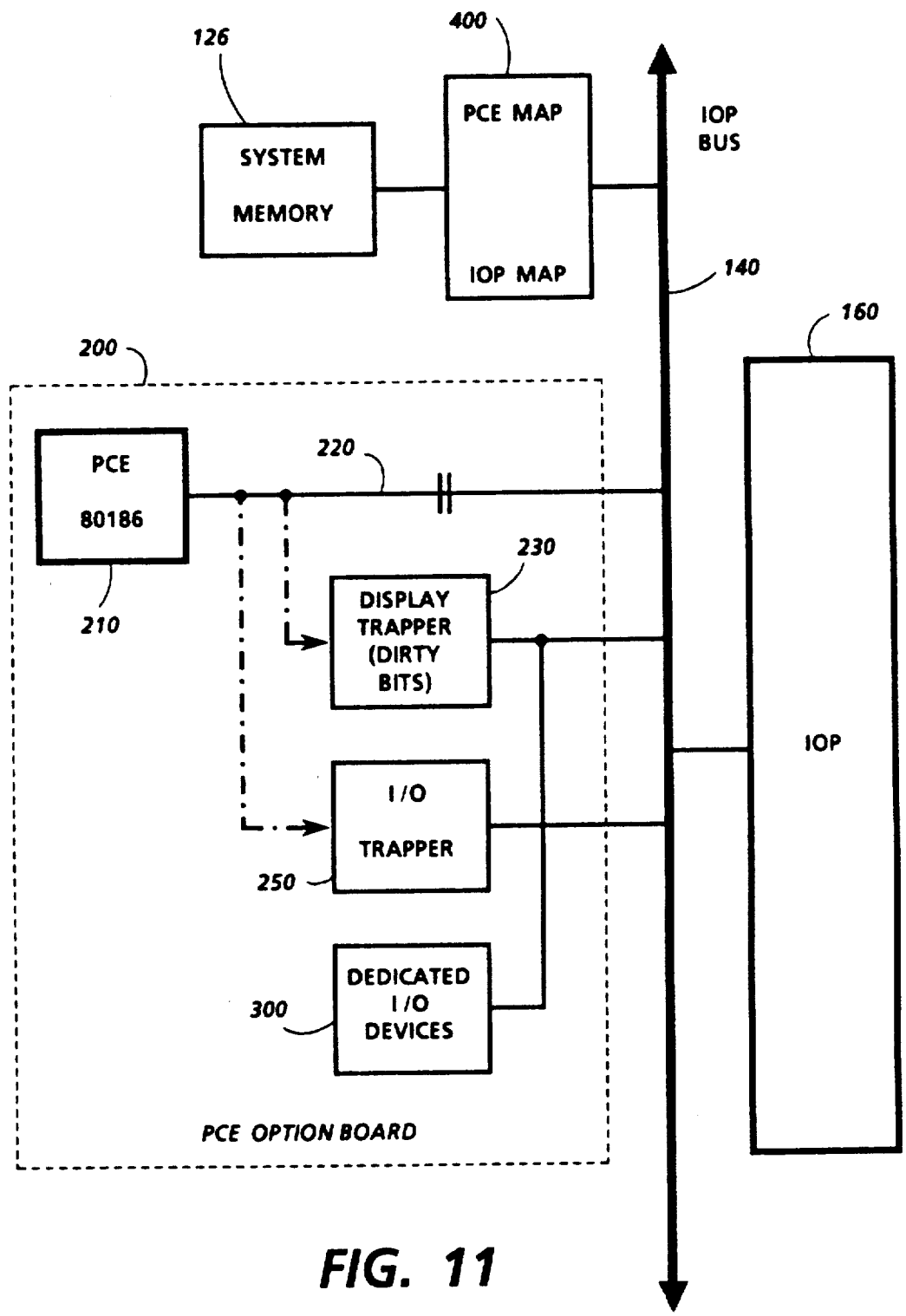
FIG. 11 is a block diagram of the components of the PC emulation option of FIG. 8.

PCE option 200 may conveniently be implemented as a separate board which may be added to system 10 by connecting it to IOP bus 140 on the backplane. FIG. 11 shows the major functional components of PCE option 200, including PCE CPU 210, an 80186 which operates as a coprocessor with IOP 160; PCE bus 220, which serves as the PCE board bus and which also serves as an extension of IOP bus 140 during memory transactions; display trapper 230; I/O trapper 250; and dedicated I/O devices 300.

FIG. 11 also shows how both IOP 160 and PCE CPU 210 are connected to system memory 126 through mapper 400, discussed below in relation to memory emulation. As will be seen, the mapper 400 connects each of the 80186 processors to its own respective section of memory based on the addresses provided by the respective processor. A set of mapping registers for each processor provides the high order bits for addressing that processor's section of memory.

Display trapper 230 and I/O trapper 250 monitor the operations of PCE CPU 210 for display updates and I/O operations, respectively. Upon detecting an I/O operation, I/O trapper stores or traps relevant PCE CPU 210 outputs and then signals IOP 160 with an interrupt. As discussed in greater detail below, IOP 160 takes control of IOP bus 140, retrieves the trapped data, and performs the appropriate operations to permit PCE CPU 210 to continue to execute a sequence of IBM PC instructions when it again has control of IOP bus 140. Display trapper 230, on the other hand, simply records the display regions which have been updated in the form of dirty bits, and IOP 160 asynchronously retrieves the dirty bits and requests a display update. Therefore display trapper 230 is substantially different than I/O trapper 250.

A. Display trapper

Figure 12:
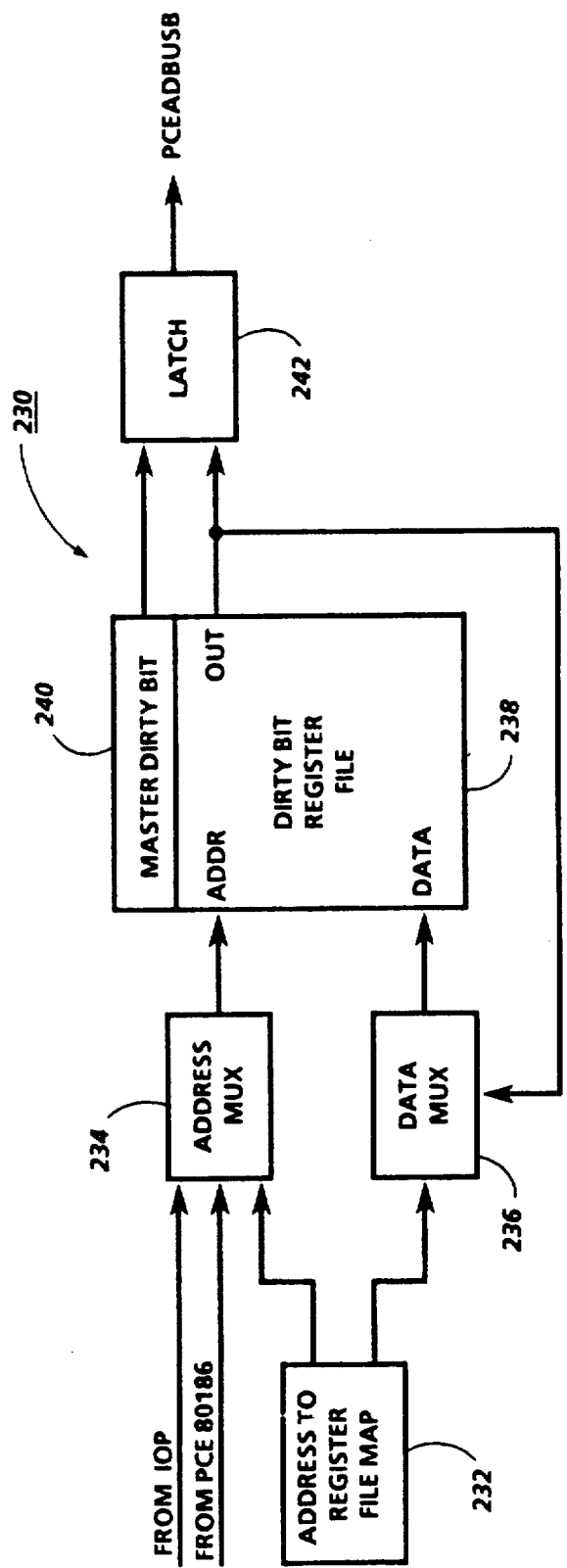
FIG. 12 is a block diagram of the display trapper of FIG. 11.

Display trapper 230 monitors the updating of display memory by PCE CPU 210 and records which area of the display was updated. FIG. 12 shows the major functional blocks within an embodiment of display trapper 230.

Address to register file map 232 receives an address from PCE CPU 210, and provides two outputs—an address output and a data output. The address output indicates which sector of the PCE display memory is being updated, while the data output indicates more precisely what part of that sector is updated by providing a bit corresponding to each part. If a part is updated, its bit is changed from 0 to 1, referring to as a "dirty bit".

Address multiplexer (MUX) 234 receives the address output from file map 232 and may also receive address outputs from IOP 160. In response to control signals from IOP 160 and PCE CPU 210, address MUX 234 provides the appropriate address at its output. Similarly, data MUX 236 receives the data output from file map 232 and also receives data output from dirty bit register file 238, and provides the appropriate data at its output in response to control signals from IOP 160 and PCE CPU 210.

Dirty bit register file 238 receives the address from address MUX 234 and the data from data MUX 236, together with control signals indicating whether to perform a read operation or to write the data received at the address received. As dirty bits are received from file map 232 through data MUX, they are stored in corresponding locations in register file 238 through a series of write operations, until IOP 160 reads them, at which time the locations read are cleared of all dirty bits. Master dirty bit store 240 contains a single bit indicating whether any dirty bits have been stored in any of the registers in register file 238. Latch 242 holds the outputs from register file 238 and master dirty bit store 240 for subsequent reading by IOP 160.

Figure 13A:
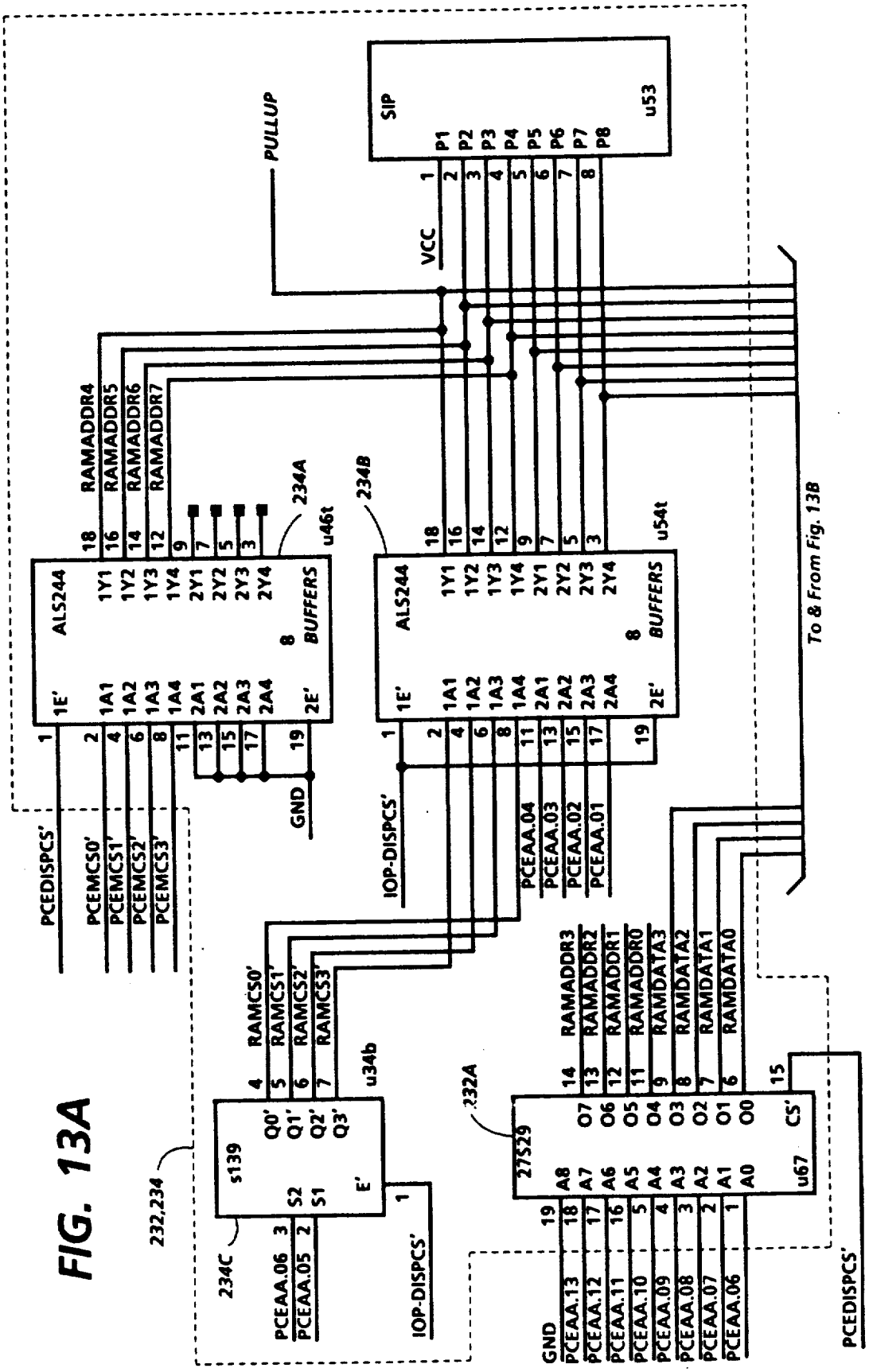
FIGS. 13A, 13B, and 13C are a detailed circuit diagram of the display trapper of FIG. 12.
Figure 13B:
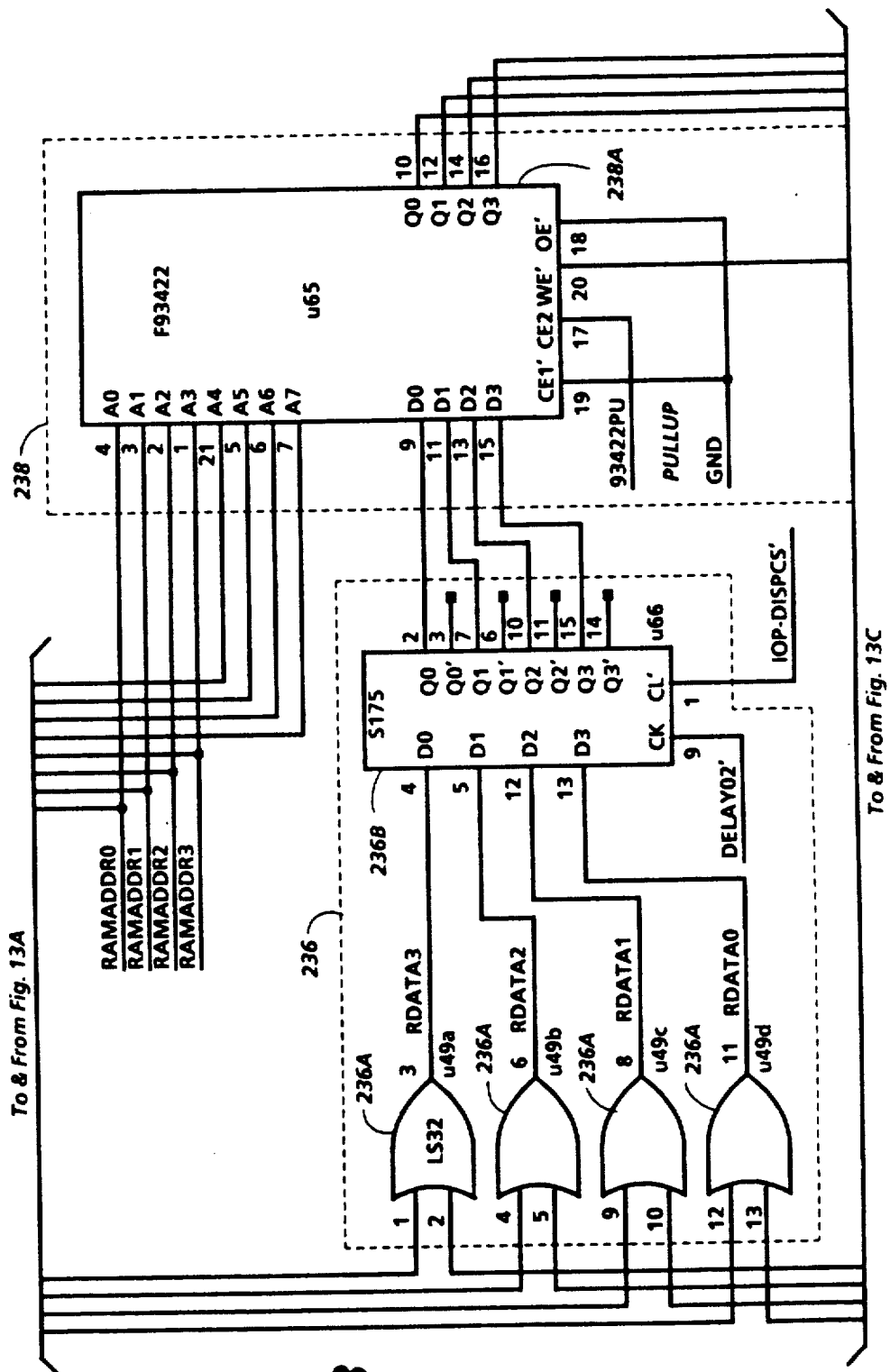
Figure 13C:
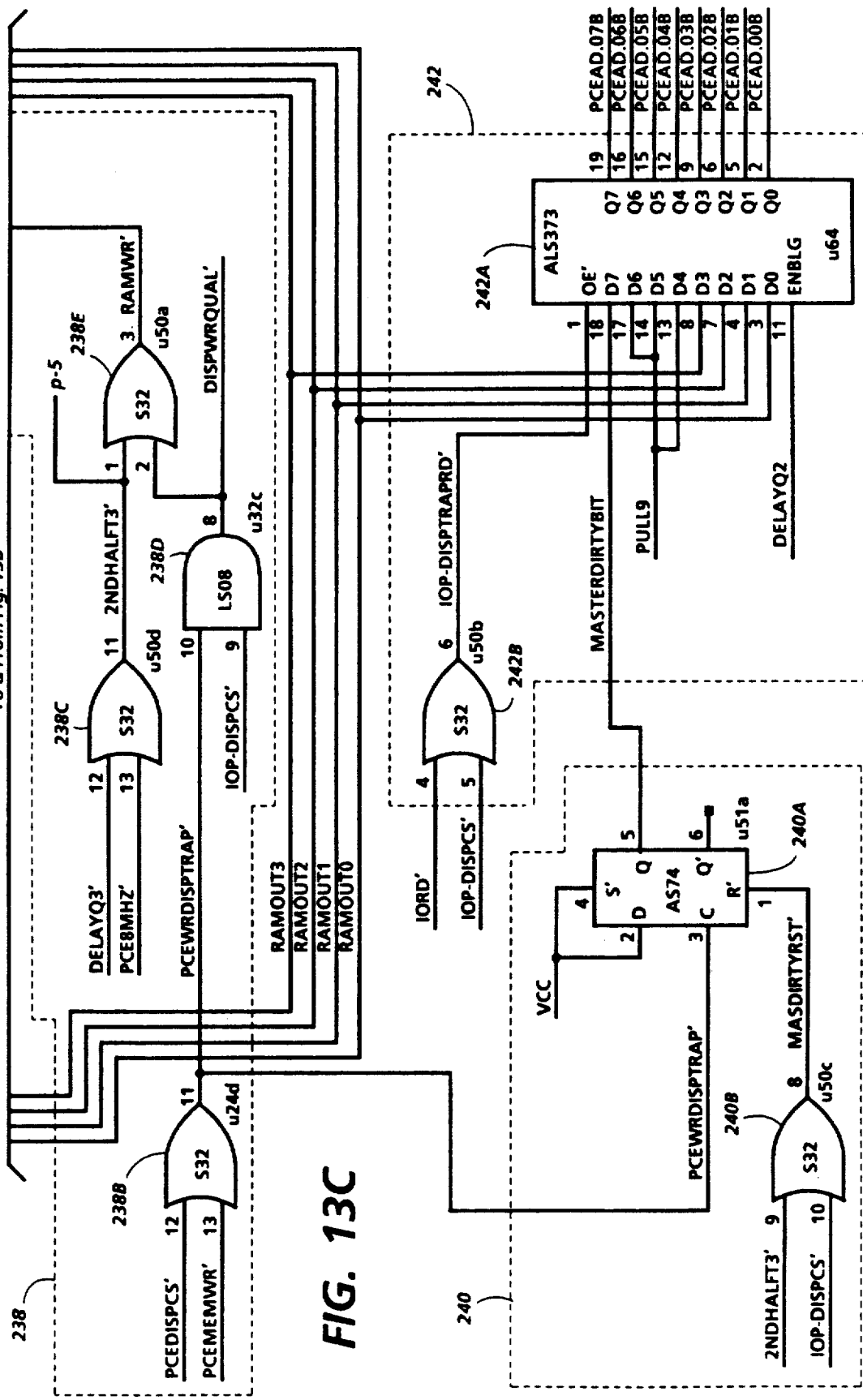

FIGS. 13A, 13B, and 13C show a circuit implementing the functional blocks of FIG. 12 according to the invention. As shown, file map 232 and address MUX 234 share a component, PROM 232a, which serves primarily to translate an eight bit display memory address from PCE CPU 210 into a four bit register file address and a dirty bit on one of four data lines. This translation can be understood more clearly from FIG. 14, showing part of the contents of PROM 232a and the relationship between the addresses and the display memory locations.

A standard IBM PC provides either monochrome or color/graphics display, and uses memory locations B0000-B3FFh (h meaning the preceding numbers are hexadecimal) as its monochrome display buffer and B8000-BBFFFh as its color/graphics bitmap memory. The emulator of the present invention may provide optionally monochrome or color display, and its display memory potentially includes memory locations B0000-BFFFFh, although not all of this memory is necessary to emulate the standard PC. The 16 bits for the four hex digits other than B are therefore sufficient to determine the location of a byte within the emulating processor's display memory. Only eight address bits are provided to PROM 232a, however, with the six lower-order bits being omitted and the two higher-order bits being handled separately to select one of four display memory buffers, as described below.

Figure 14:
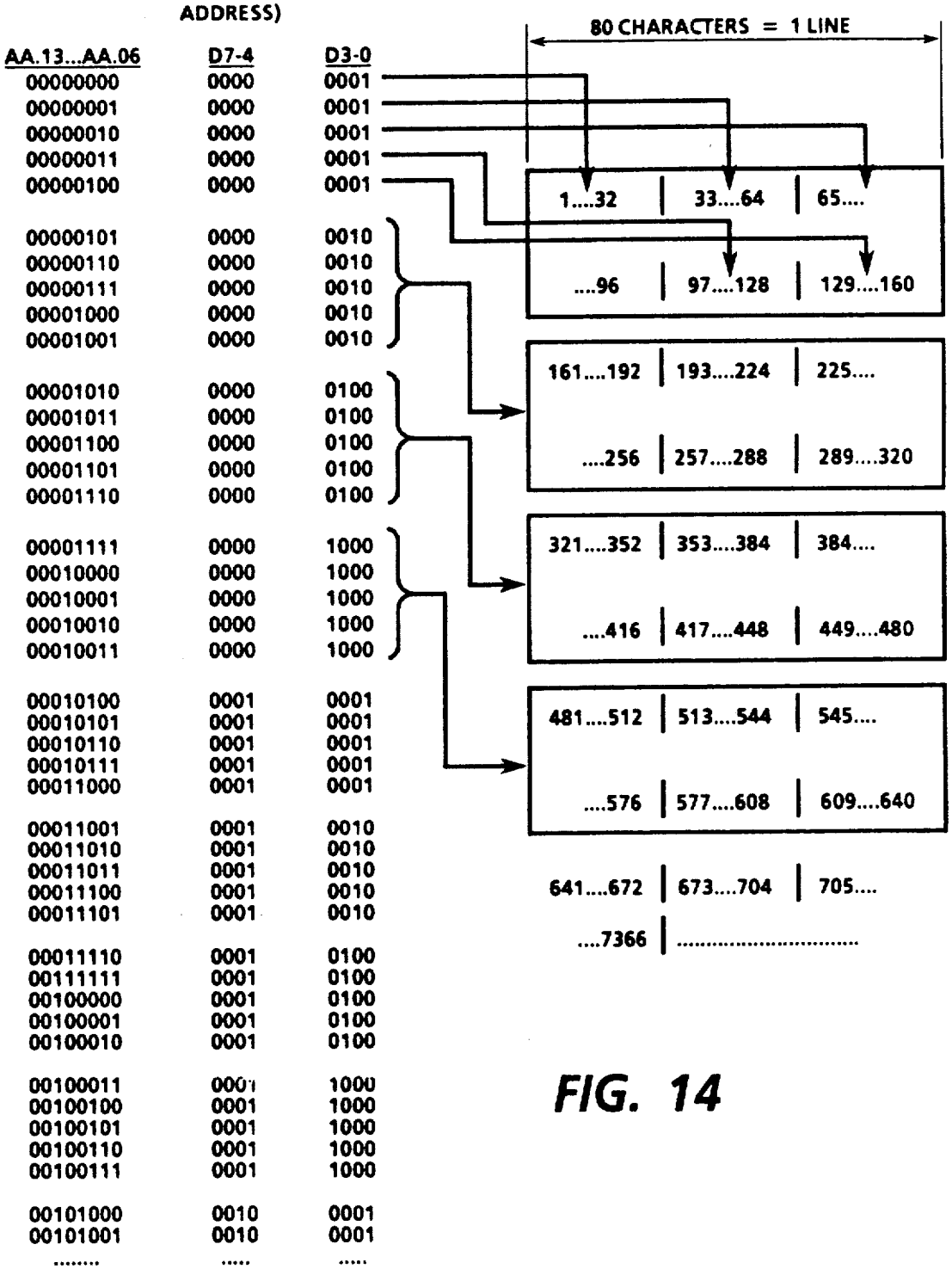
FIG. 14 illustrates schematically the relation between the contents of the display trapper PROM of FIGS. 13A, 13B, and 13C and the regions of the PC display.

As can be seen from FIG. 14, each eight bit address provided to PROM 232a corresponds to a 32 character block, within which the omitted lower-order bits indicating a character. If any of those 32 locations is updated, the corresponding dirty bit will have a value of one in the four bits D3-D0 at the output of PROM 232a, and each dirty bit corresponds to five of the 32 character blocks or two lines of the display.

PROM 232a also serves as part of address MUX 234 because the values at its outputs D7-4 provide the lower four bits RAMADDR3-0 of a register file address. Since there are four dirty bit locations at each register file address in register file 238, and each dirty bit corresponds to two lines of the display, each four bit register file address corresponds to eight lines of the display, as shown in FIG. 14. These four bits are provided under control of a signal from PCE CPU 210, PCEDISPCS', which also controls buffer 234a, which provides the remaining four bits RAMADDR7-4 of the register file address as discussed below. PCEDISPCS' therefore causes an eight bit address RAMADDR7-0 to be provided to register file 238.

Buffer 234a provides RAMADDR7-4 based on PCEMCS3'-0', only one of which is on at a time. PCEMCS3'-0' are signals from PCE CPU 210 derived from the higher order bits A19-14 of a display memory address. PCE CPU 210, during boot, loads a special routine which is part of the implementation of the invention. This routine is executed so that, each time PCE CPU 210 writes to its display memory, one of PCEMCS3' -0' goes on to indicate which one of the four available banks of display memory is being accessed and, correspondingly, which of four banks of registers in register file 238 is addressed, the MCS2 bank being for monochrome display, the MCS0 bank being for color or graphics display, and the MCS1 and MCS3 banks being unused in emulating the standard PC. Each bank contains 16 registers, each register storing four dirty bits. RAMADDR3-0 indicate which register within a selected bank is addressed.

Address MUX 234 also includes buffer 234b and 2-to-4 bit decoder 234c which are selected by the signal IOP-DISPCS' as the source of the register file address when IOP 160 is reading register file 238. IOP 160 provides six address bits, the higher order pair of which are decoded to indicate which bank is addressed, the lower order bits indicating the register within that bank. Thus the function of address MUX is to select between the address provided by buffer 234b and decoder 234c, on the one hand, and the address provided by PROM 234a and buffer 234a on the other.

Data MUX 236 performs a different type of multiplexing, in which a respective one of OR gates 236a performs a logical OR operation on each of the data outputs of PROM 232a and the corresponding data output of register file 238. In effect, each previously set dirty bit will remain dirty, while new dirty bits will be added, until IOP 160 reads the register file 138. The results of the OR operations are stored in a bank of flip-flops 236b by the signal DELAYQ2', and flip-flops 236b are cleared by IOP-DISPCS' when IOP 160 reads register file 238. The Q outputs of flip-flops 236b are applied as data input to register files 238.

Register file 238 includes RAM 238a and circuitry for controlling its writing and reading. As discussed above, RAM 238a receives an address on lines RAMADDR7-0 and dirty bits on lines RAMDIN3-0 from flip-flops 236b. Each line of its output goes to one of the OR gates 236a for multiplexing with new dirty bits. Gates 238b-e control the writing of RAM 238a in response to control signals from IOP 160 and PCE CPU 210. OR gate 238b provides a high output only when PCE CPU 210b signals that it has ended either enabling PROM 232a or writing to system memory 126. OR gate 238c, on the other hand, provides a low signal periodically based on DELAYQ3', timed to occur after DELAYQ2'. AND gate 238d provides a high signal only when OR gate 238b provides a high and IOP 160 signals that it is no longer addressing RAM 238a. Therefore, OR gate 238e permits RAM 238a to be written periodically, if either IOP 160 or PCE CPU 210 has finished providing an address to RAM 238. In other words, RAM 238a will be written with dirty bits from flip-flops 236b when addressed by PCE CPU 210 and with zeroes from cleared flip-flops 236b when addressed by IOP 160.

Master dirty bit store 240 includes flip-flop 240a which is clocked to store a high value by a high signal from OR gate 238b, indicating PCE CPU 210 has completed the writing of dirty bits to RAM 238a. Flip-flop 240a is reset to a low value when IOP 210 completes the reading of RAM 238a.

Since IOP 160 rewrites each addressed location with zeroes immediately after reading it, latch element 242a in latch 242 holds the dirty bits for retrieval by IOP 160. Timing signal DELAYQ2 ensures that it will receive and store the dirty bits before they are replaced by zeroes upon the occurrence of DELAYQ3', and it also stores the master dirty bit. Latch element 242a provides its output in response to a signal from OR gate 242b indicating that IOP 160 has completed a read operation during which it addressed RAM 238a.

Figure 15:
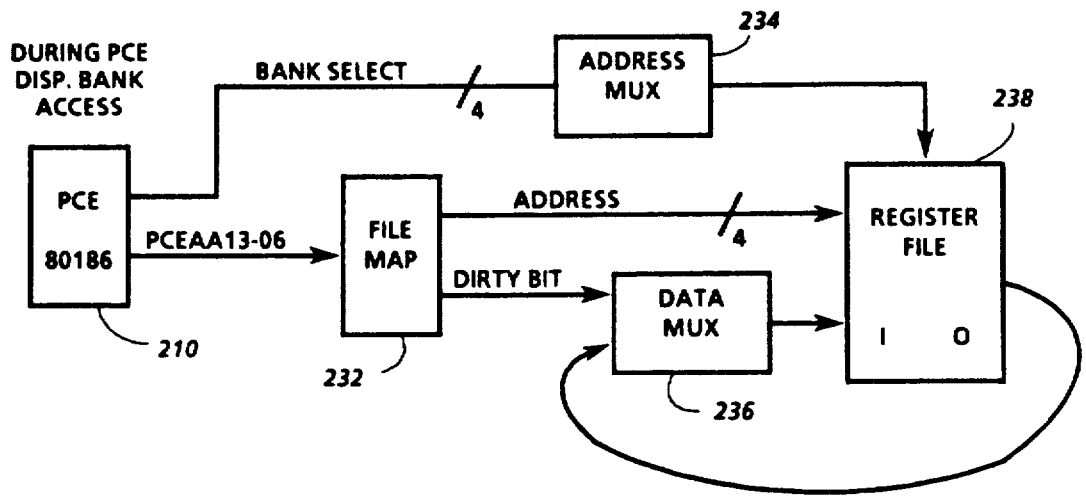
FIG. 15 is an information flow diagram showing the monitoring operation of the display trapper of FIG. 12.
Figure 16:
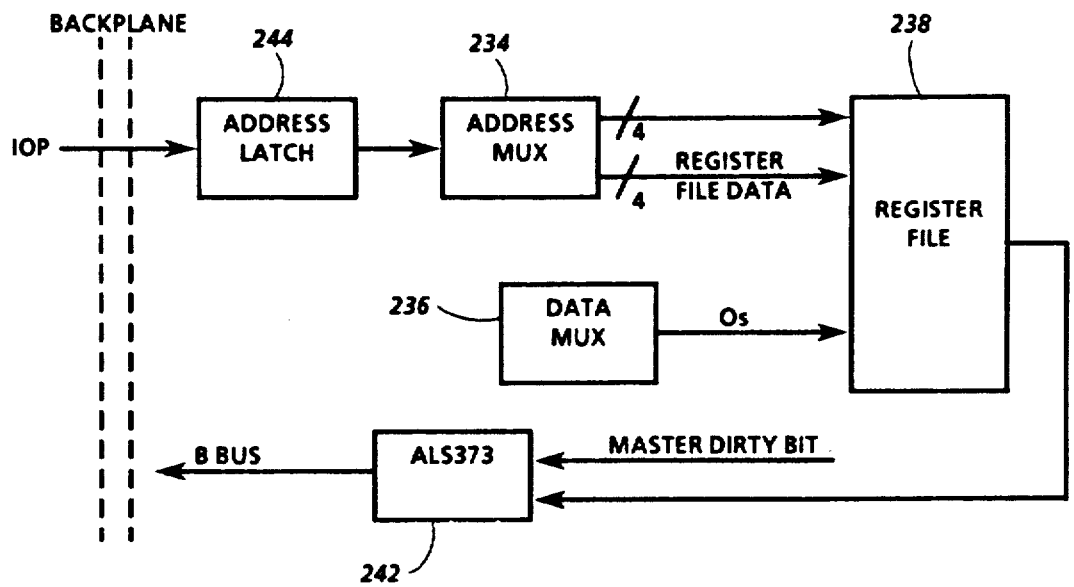
FIG. 16 is an information flow diagram showing the operation of reading the contents of the display trapper of FIG. 12.

Operation of display trapper 230 can be more fully understood from FIGS. 15 and 16, each of which shows the information flow during a respective operation. FIG. 15 shows the writing of dirty bits to RAM 238a, while FIG. 16 shows the reading of dirty bits by IOP 160.

The operation in FIG. 15 begins with the receiving of a register bank selection signal by address MUX 234, which, in turn addresses the selected bank. The register bank select signal is derived from a signal sent by PCE CPU 210 in accessing its display banks in system memory 126. PCE CPU 210 also sends an address to its display banks, bits PCE AA 13–06 of which are received by file map 232, resulting in an address and a dirty bit as described above in relation to FIG. 14. The address is applied to register file 238 to select the register to be written. The dirty bits in that register are read out and applied to data MUX 236, together with the dirty bit from file map 232. The data MUX 236 performs a logical OR, latching the result until it may be written into register file 238, completing the operation.

The operation in FIG. 16 begins when IOP 160 provides a display trapper register address on IOP bus 140. This address is received and held in address latch 244 on the PCE option board 200. Address MUX 234 receives this address, decoding it to obtain a register bank select signal and a register select address, which are applied to register file 238. The data output from the selected register in register file 238 is then held in latch 242, which applies them to IOP bus 140 to be received by IOP 160.

Meanwhile, data MUX 236 applies output zeroes which are written into the selected register, and master dirty bit store 240 is also reset.

Based on the dirty bits provided by display trapper 230, IOP 160 provides signals to Mesa CPU 112 indicating the display area to be updated. The operations of IOP 160 are described in greater detail below.

B. I/O Trapper

I/O trapper 250 monitors I/O requests by PCE CPU 210 and stores its I/O control signals for subsequent retrieval by IOP 160.

Figure 17:
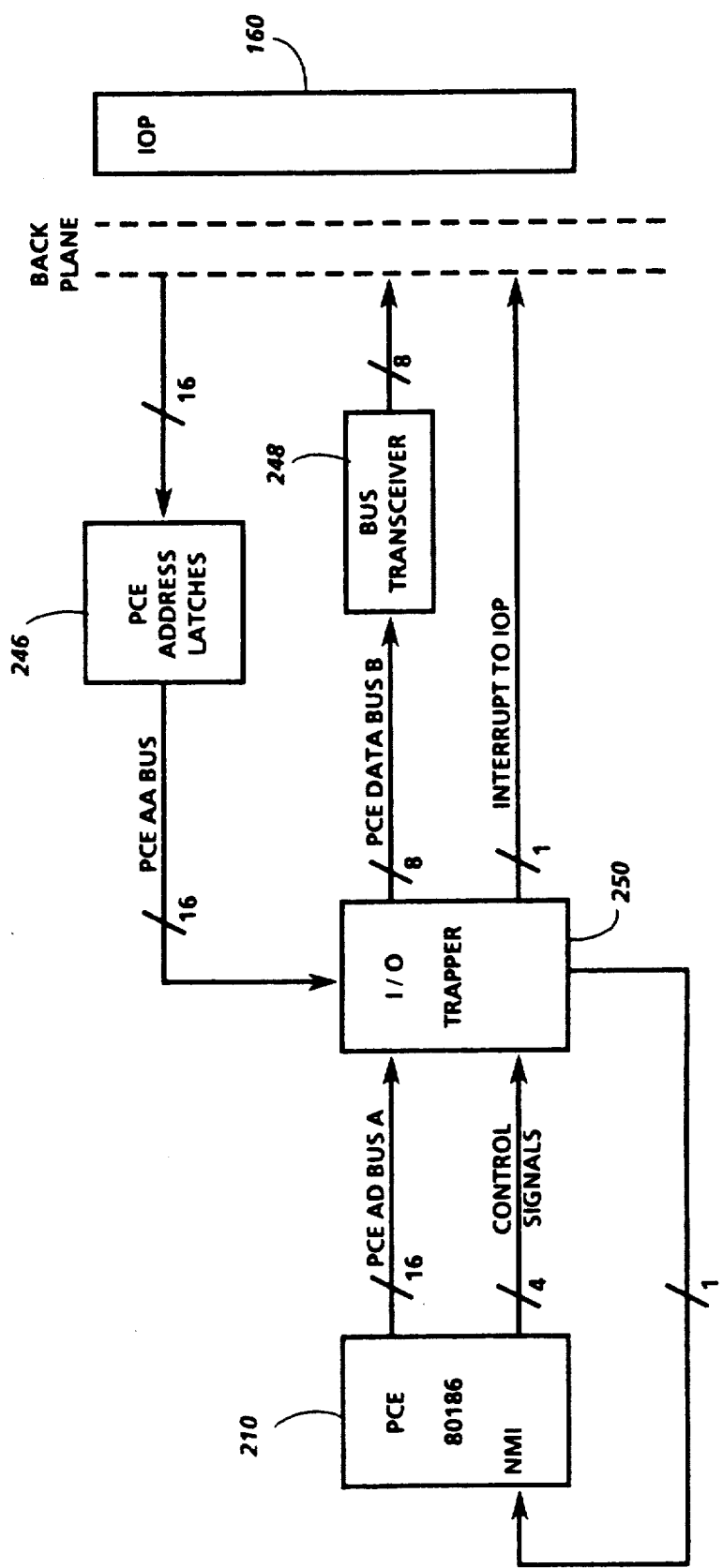
FIG. 17 is a block diagram showing the I/O trapper of FIG. 11 in relation to other components.

FIG. 17 shows the flow of signals to and from I/O trapper 250. Upon receiving signals from PCE CPU 210 indicating an I/O read or write operation, I/O trapper 250 receives and stores address, data and control signals from PCE CPU 210. If a read operation, I/O trapper 250 then provides a non-maskable interrupt (NMI) to PCE CPU 210, the servicing of which is discussed below in relation to IOP operations. I/O trapper 250 also sends an interrupt to IOP 160, via IOP bus 140. IOP 160 will service this as the lowest priority interrupt, as discussed above, sending addresses to PCE address latches 246 which cause I/O trapper 250 to provide the stored address, data and control signals to bus transceiver 248 for transmission on IOP bus 140. In this manner, IOP 160 obtains the information needed to emulate the appropriate I/O device.

Figure 19:
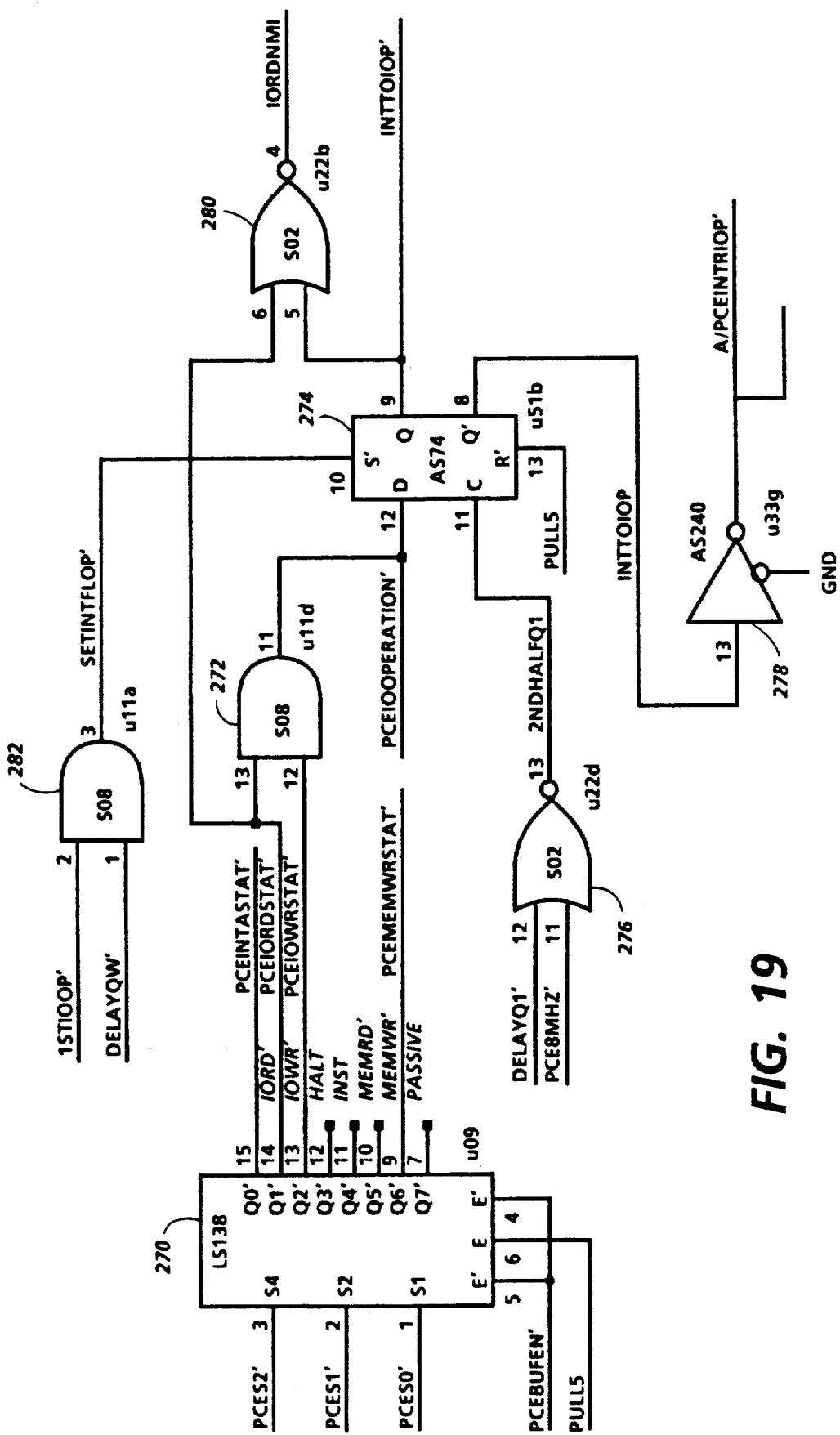
FIG. 19 shows interrupt generating circuitry in the I/O trapper of FIG. 17.
Figure 20:
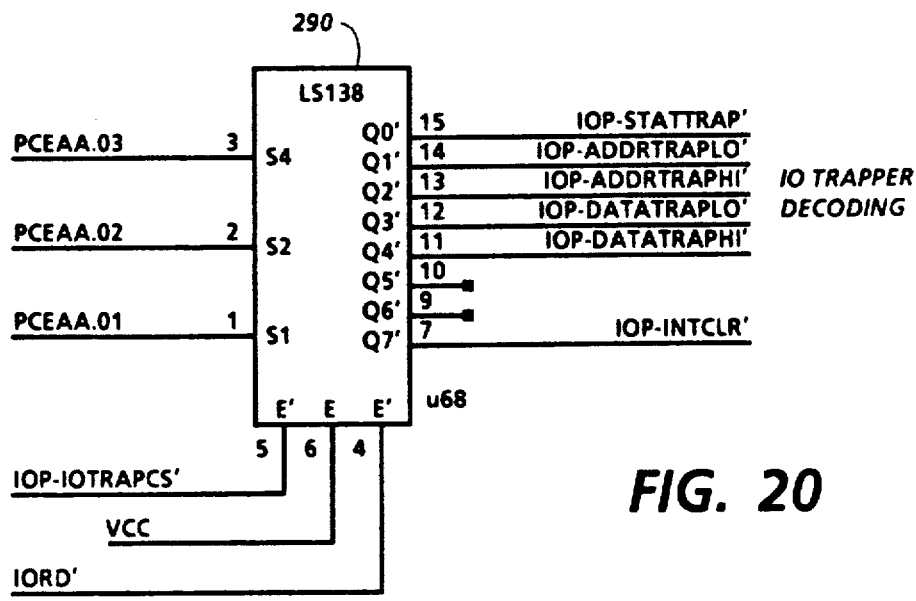
FIG. 20 shows a decoder in the I/O trapper of FIG. 17.

FIGS. 18A–18E show the five trapping registers of I/O trapper 250—address registers 252 and 254, status register 256 and data registers 266 and 268. FIGS. 19 and 20 show other circuit in I/O trapper 250 which provide control signals for IOP 160, PCE CPU 210 and the trapping registers.

Figure 18A:
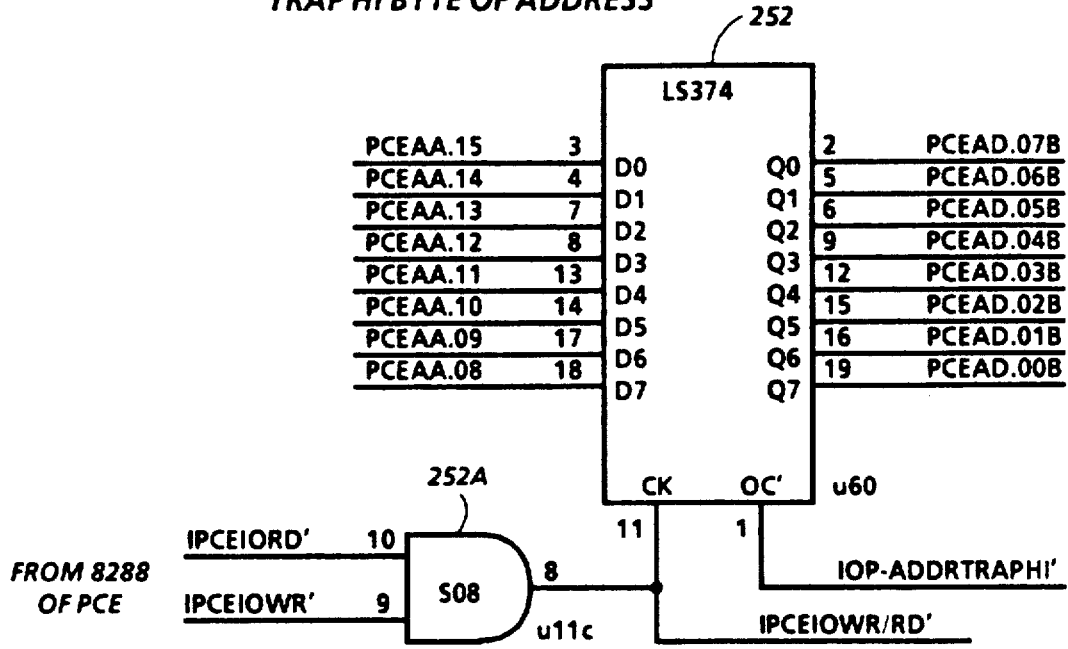
FIGS. 18A-18E show, respectively, the high byte address register, the low byte address register, the status register, the low byte data register and the high byte data register of the I/O trapper of FIG. 17.
Figure 18B:
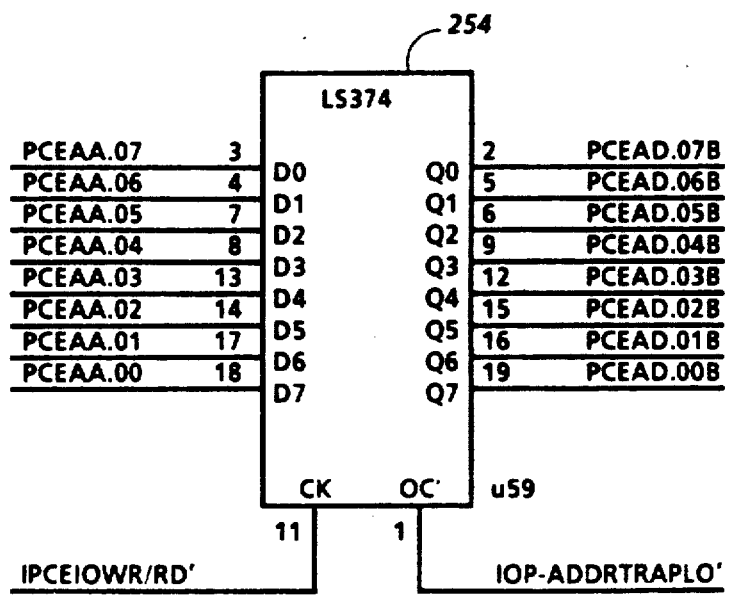

FIGS. 18A and 18B show address registers 252 and 254, respectively. As shown, register 252 stores the high byte of an address, while register 254 stores the low byte of an address on the PCE address bus. Registers 252 and 254 both store the address at their inputs in response to a clocking signal which is provided by AND gate 252a at the end of a read or write signal from PCE CPU 210.

Figure 18C:
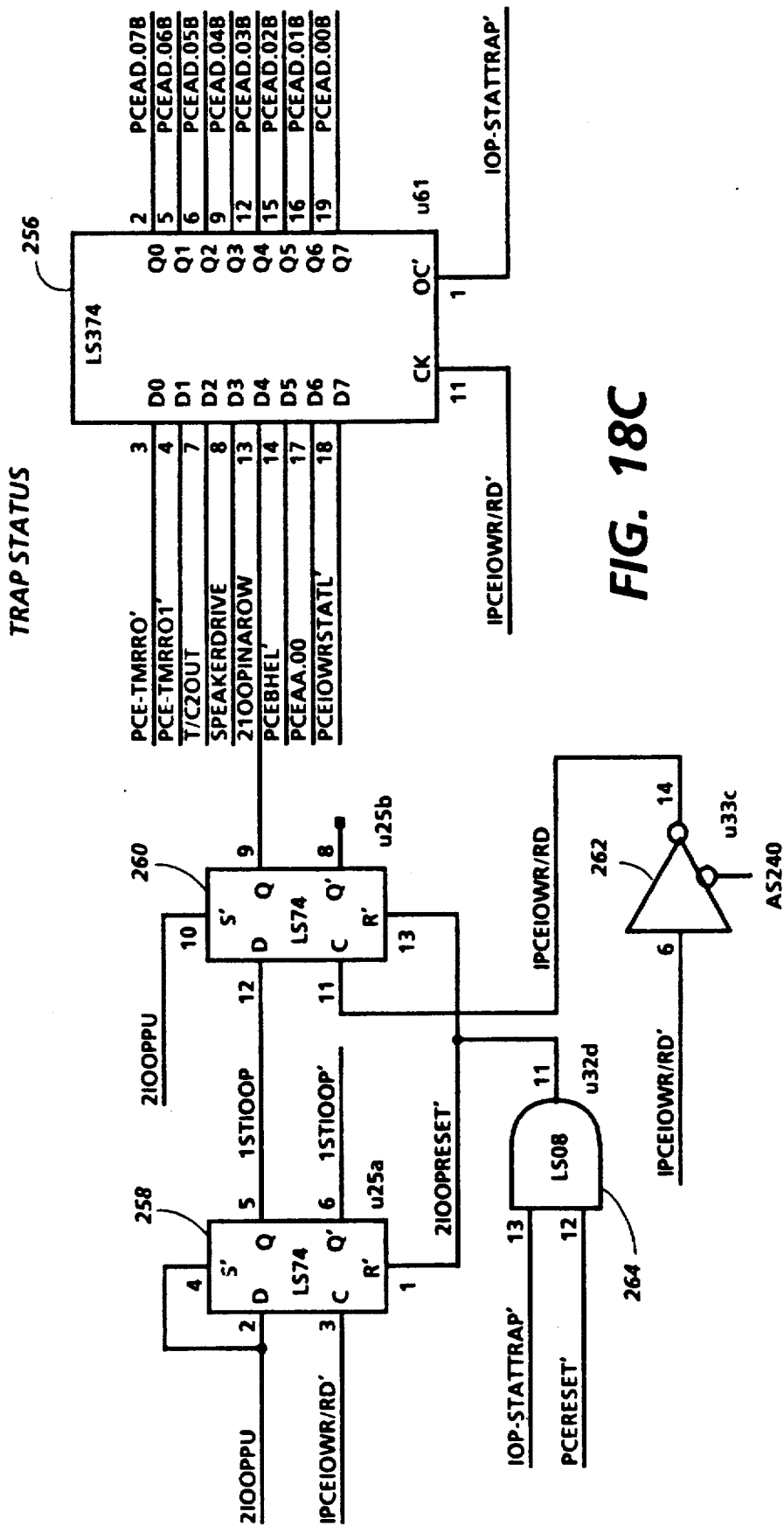

FIG. 18C shows status register 256, which stores a number of status signals relating to the operation of PCE CPU 210. Of these signals, one is of particular interest to I/O operations, 2IOOPINAROW, which, when two I/O bus cycles have occurred in a row, has a value of 1. Two consecutive I/O bus cycles occur only when PCE CPU 210 executes a wordwide I/O operation to an odd address, and the signal 1IOOPINAROW indicates that the high byte and low byte are reversed. Flip-flops 258 and 260 serve as a counter of I/O bus cycles, with flip-flop 258 clocked by the output high signal from AND gate 252a, which also clocks status register 256 and address registers 252 and 254, discussed above. Flip-flop 260, which receives the high signal from flip-flop 258 after it has been clocked, is then clocked when the inverted signal from AND gate 252a goes high, which will occur when the next I/O bus cycle begins. If the subsequent bus cycle within the same instruction is not an I/O bus cycle, the signal from IOP 160 which reads the status register 256 after that instruction is completed will also reset flip-flops 258 and 260. Therefore, flip-flop 260 will only provide a high output after two consecutive I/O bus cycles within a single instruction.

Figure 18D:
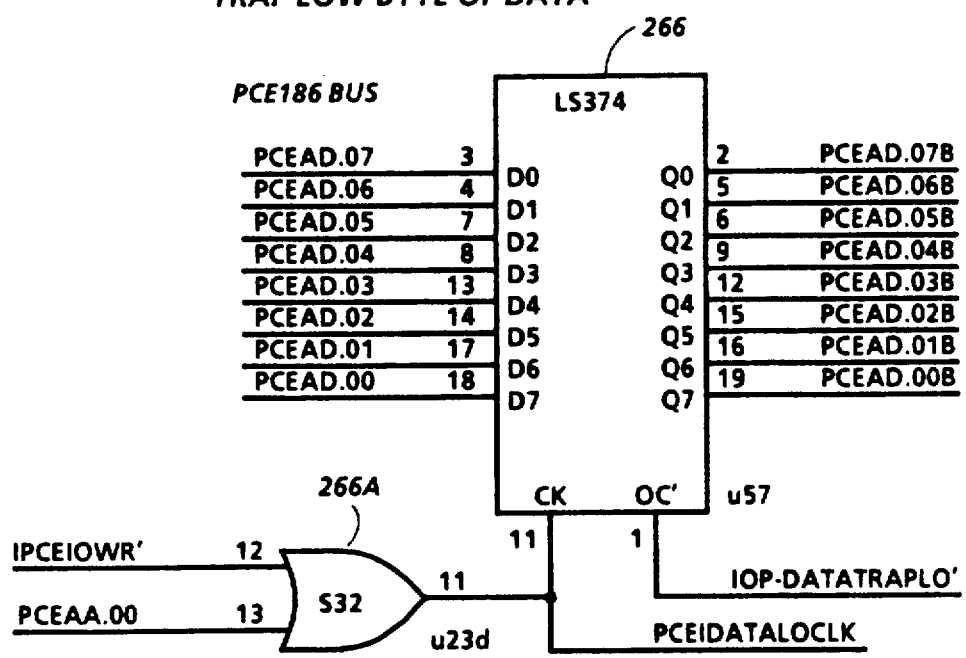
Figure 18E:
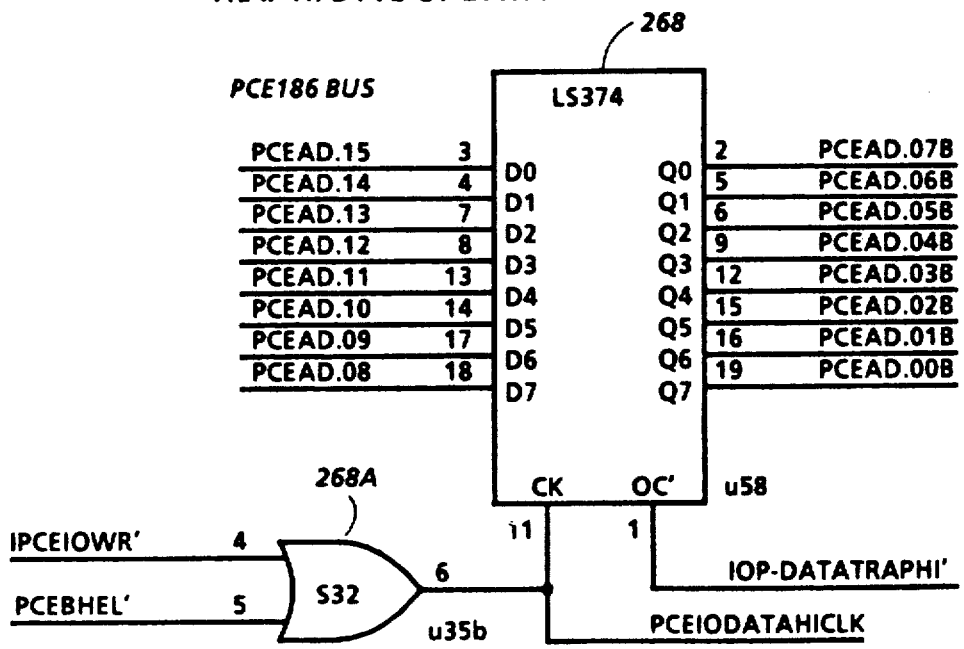

FIGS. 18D and 18E show data registers 266 and 268, which are used only during I/O write operations. Each is clocked by a signal which goes high only at the end of a write operation by PCE CPU 210 onto the respective part of the data bus, as determined by OR gates 266a and 268a. The signals PCEAA.00' and PCEBHEL', when low, indicate selection of the low and high data bytes, respectively.

FIG. 19 shows circuitry in I/O trapper 250 which generates the interrupt signals, both the NMI to PCE CPU 210 and the PCE interrupt to IOP 160. Decoder 270 receives three signals from PCE CPU 210 which indicate the type of operation it is performing. Decoder 270 provides two signals indicating whether I/O read and I/O write, respectively, are being performed, and AND gate 272 provides a high signal only when neither is being performed. The signal from AND gate 272 is clocked into flip-flop 274 when the signal from NOR gate 276 goes high during an appropriate part of an instruction cycle. If the clocked-in signal is low, the Q' output of flip-flop 274, inverted by inverter 278, will go high, providing an interrupt to IOP 160. If an I/O read is being performed, NOR gate 280 will also provide the NMI to PCE CPU 210. After I/O trapper status register 256 has been read by IOP 160, flip-flop 274 will be set by a signal from AND gate 282, so that both interrupt signals will end.

FIG. 20 shows decoder 290 which receives three bits of an address from IOP 160 via latches 246 and which also receives control signals indicating that IOP 160 is reading the I/O trapping registers. In response to three bits, decoder 290 provides one of several output signals indicating which of the registers is to be read. As can be seen from FIGS. 18A–18E, all of the registers are read over the same lines, so that only one register can be read at a time.

Figure 21:
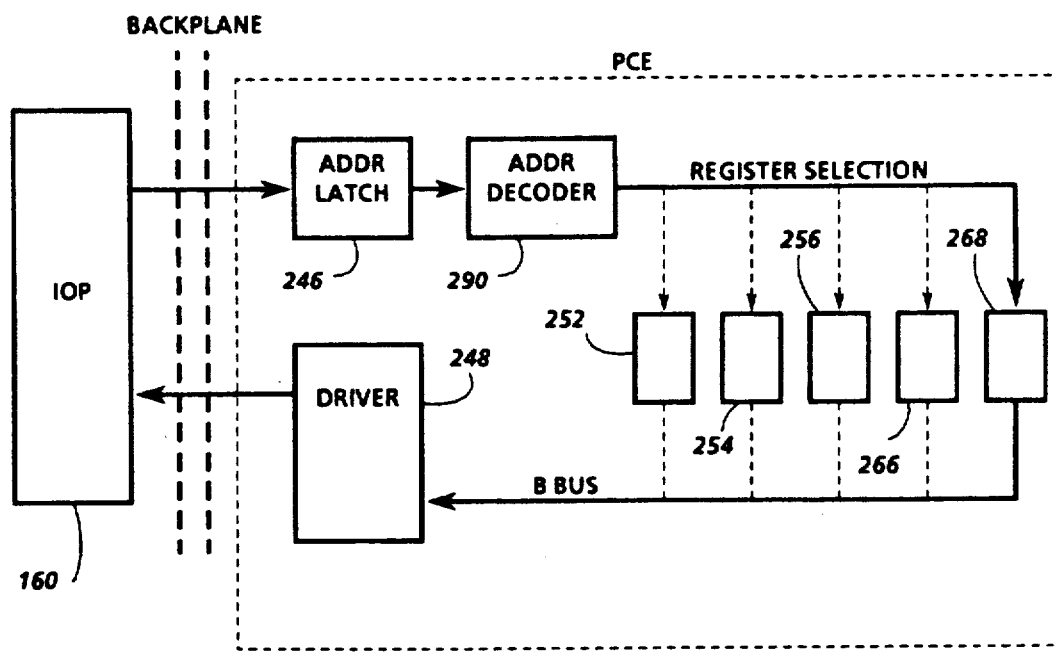
FIG. 21 is an information flow diagram showing the operation of reading the contents of the I/O trapper of FIG. 17.

FIG. 21 shows how IOP 160 performs an I/O trapping register read operation. IOP 160 will have received a PCE interrupt via master interrupt controller 166b, and will have received control of IOP bus 140 from arbiter/mode control 170, also acting in response to the PCE interrupt. IOP 160 then sends an address to address latch 246, which is decoded by decoder 290. The decoded address selects one of the trapping registers 252, 254, 256, 266 or 268, whose contents are sent to transceiver 248 for transmission to IOP 160.

Although display trapper 230 and I/O trapper 250 provide necessary information to IOP 160 to permit emulation of the environment of PCE CPU 210 and of the user interface of a PC, a number of other components are on PCE option board 200, including some dedicated I/O devices 300.

C. Dedicated I/O Devices

IOP 160 emulates several of the I/O devices using its own actual I/O devices. Some devices which would be part of the environment of PCE CPU 210 if it were in an IBM PC, however, may conveniently be emulated using additional components on the PCE option board 200. The manner in which IOP 160 manages these devices will be discussed in greater detail below, but the circuitry is described here.

Figure 22:
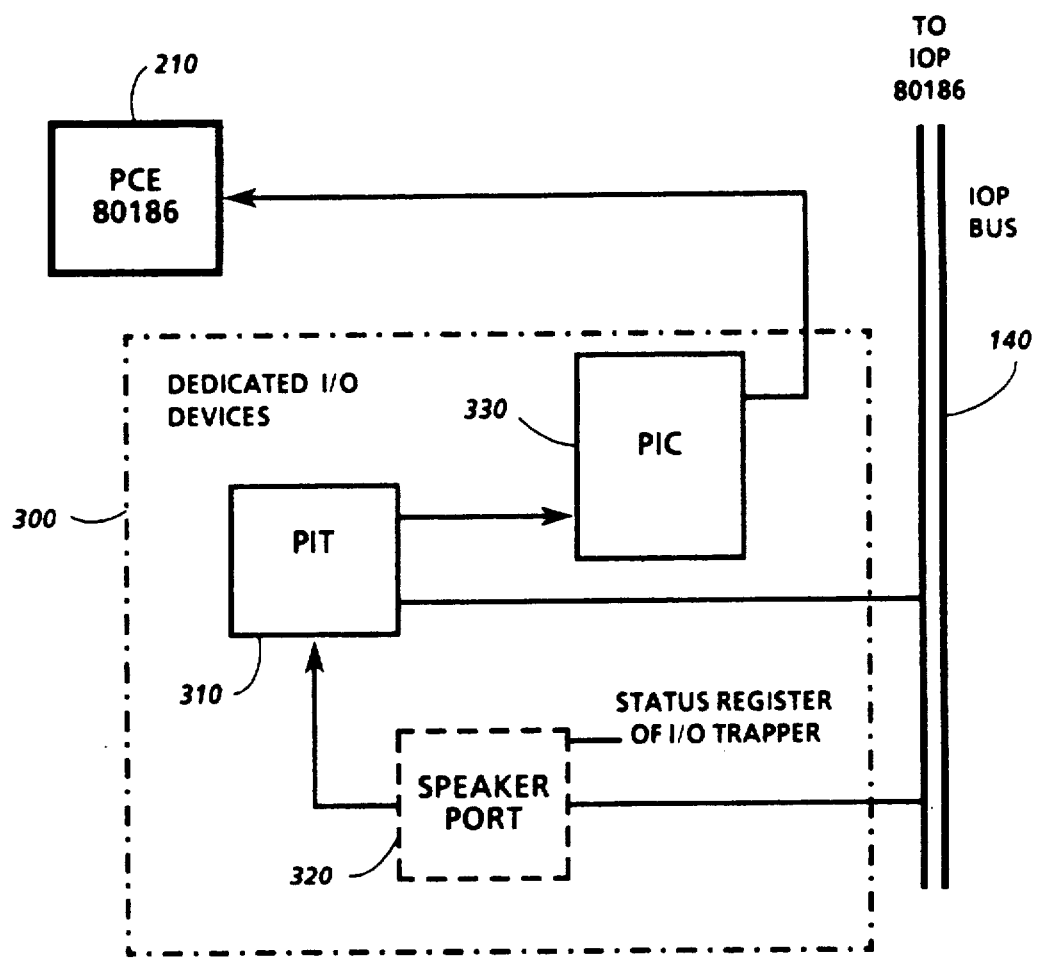
FIG. 22 is a block diagram showing the dedicated I/O devices of FIG. 11.

FIG. 22 shows dedicated I/O devices 30 in relation to PCE CPU 210 and IOP bus 140. The devices shown include programmable interval time (PIT) 310, speaker port emulator 320 and programmable interrupt controller (PIC) 330. These devices are programmed by IOP 160, and are not accessible to PCE CPU 210, except that it can read interrupt vectors from PIC 330. PIT 310 keeps track of time and date for PCE CPU 210, and generates frequencies for the speaker. Speaker port 320 takes the place of the speaker-related part of a programmable peripheral interface (PPI) which would be in an IBM PC, and sends specific speaker control signals. PIC 330 handles and prioritizes interrupt requests to PCE CPU 210 for various devices. Except for interrupts from PIT 310, however, all interrupts come from IOP 160, not from devices. PIC 330 sends interrupt vectors directly to PCE CPU 210 during interrupt acknowledge cycles.

Figure 23A:
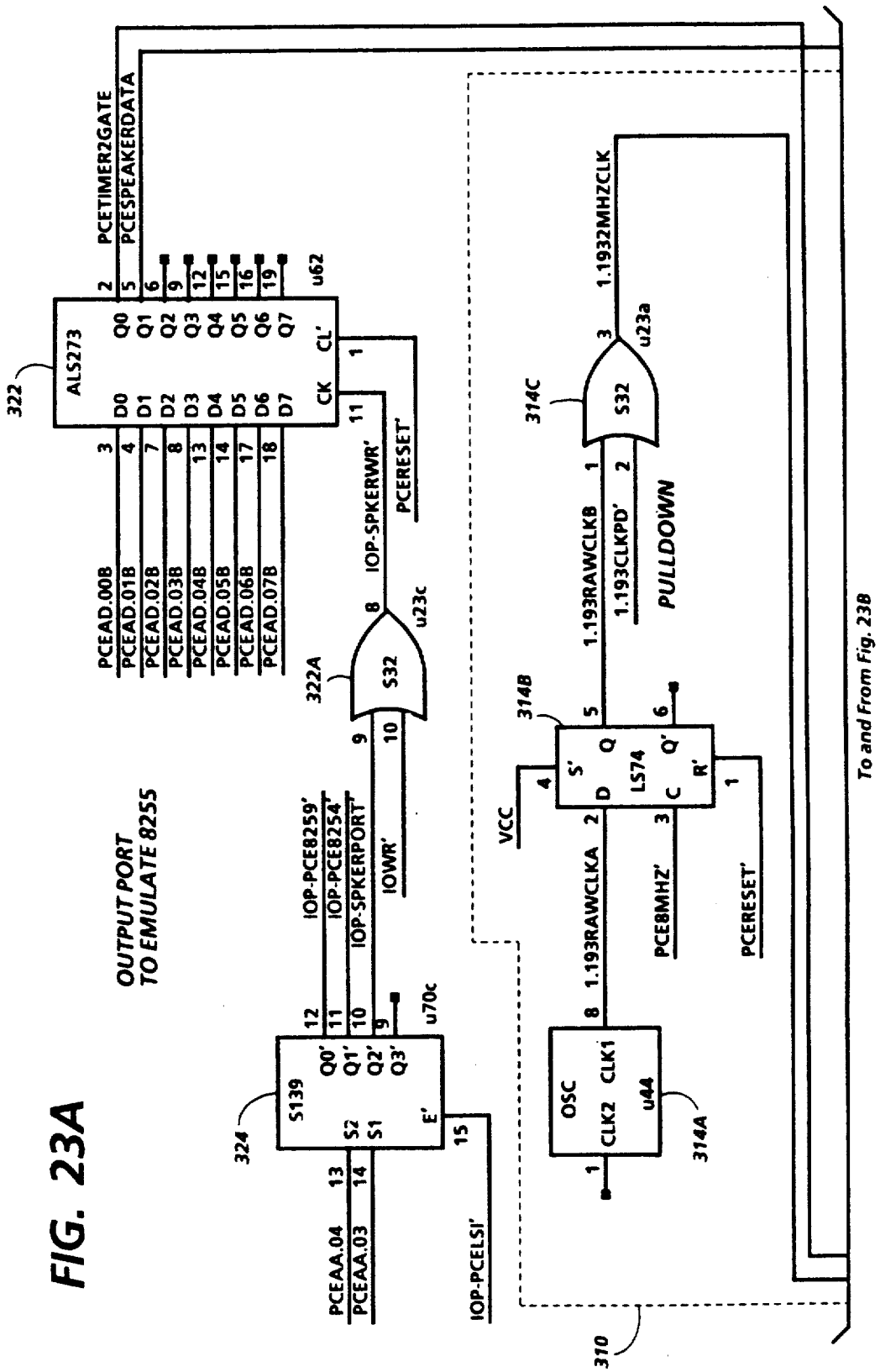
FIGS. 23A and 23B are a detailed circuit diagram showing the programmable interval timer and speaker port of FIG. 22.
Figure 23B:
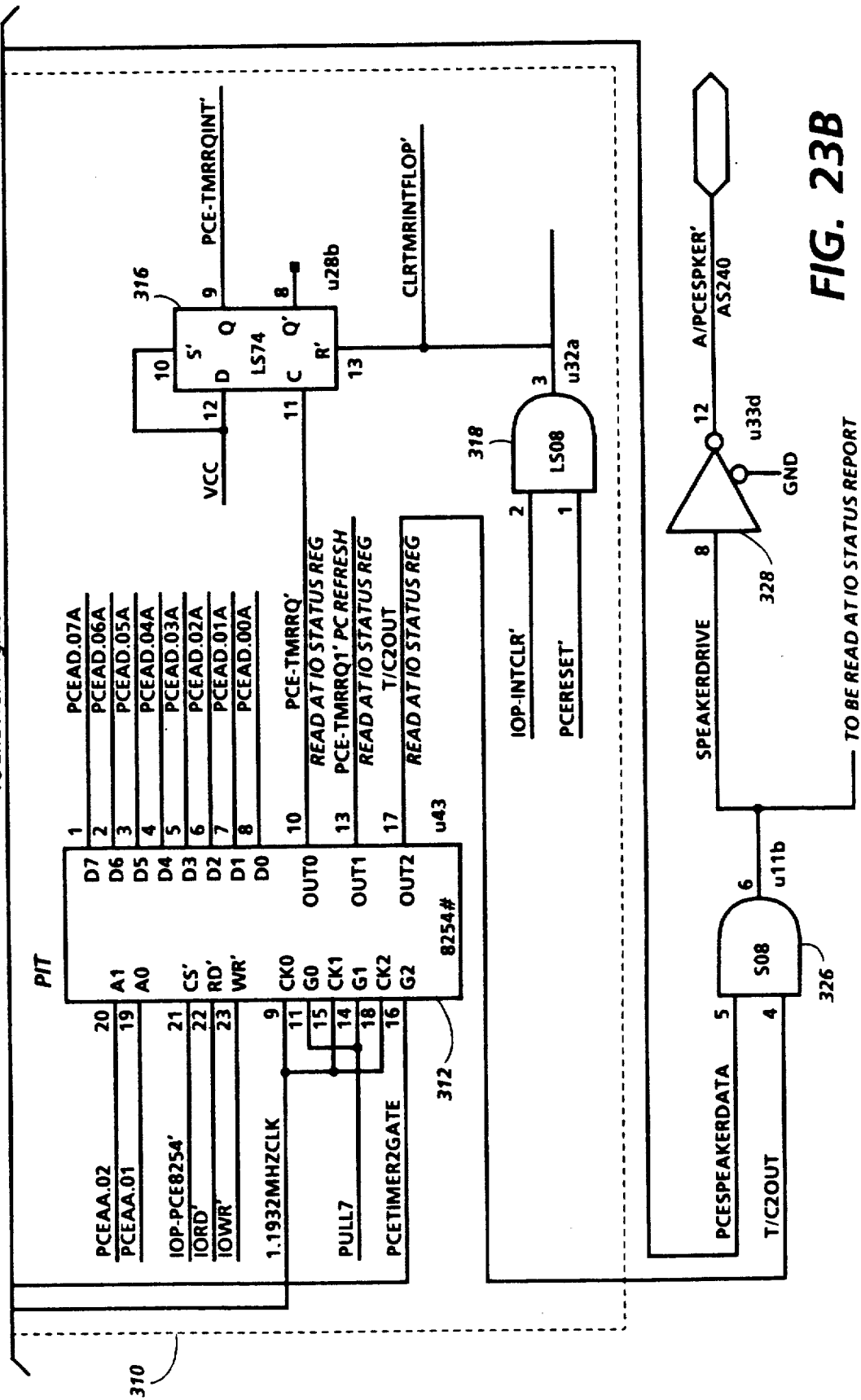

FIGS. 23A and 23B show the circuitry of PIT 310 and speaker port 320. PIT 310 includes primarily counter/timer chip 312, which is an Intel 8254. Its input clock frequency is very close to that supplied to the 8254 in an IBM PC, and is derived from a generic K1114A oscillator 314a at 1.1932 MHz, via flip-flop 314b and OR gate 314c.

Within chip 312, counter 0 keeps track of time and date, and its output goes to PIC 330, which interrupts PCE CPU 210 approximately 19.5 times per second. Flip-flop 316 ensures that only one of these timed interrupts will be provided after periods in which PCE CPU 210 is held, and flip-flop 316 is reset by the output from AND gate 318 after the servicing of the interrupt. The other timed interrupts which would have been received while PCE CPU 210 was held will be lost, but no information other than time has been lost since the interrupts are only based on time. In general, the operation of PCE CPU 210 does not preserve real-time accuracy, which is not a problem for the execution of most sequences of instruction written for the IBM PC.

Counter 2 on chip 312 generates the speaker frequency, under the control of speaker port 320, which also conveys the speaker frequency back to IOP 160. Speaker port 320 includes latch 322 which is clocked by signals from decoder 324 via OR gate 332a. When clocked, latch 332 enables operation of counter 2 on chip 312, and also enables AND gate 326 to pass the frequency from counter 2 to inverter 328 and thence to IOP bus 140.

Figure 24:
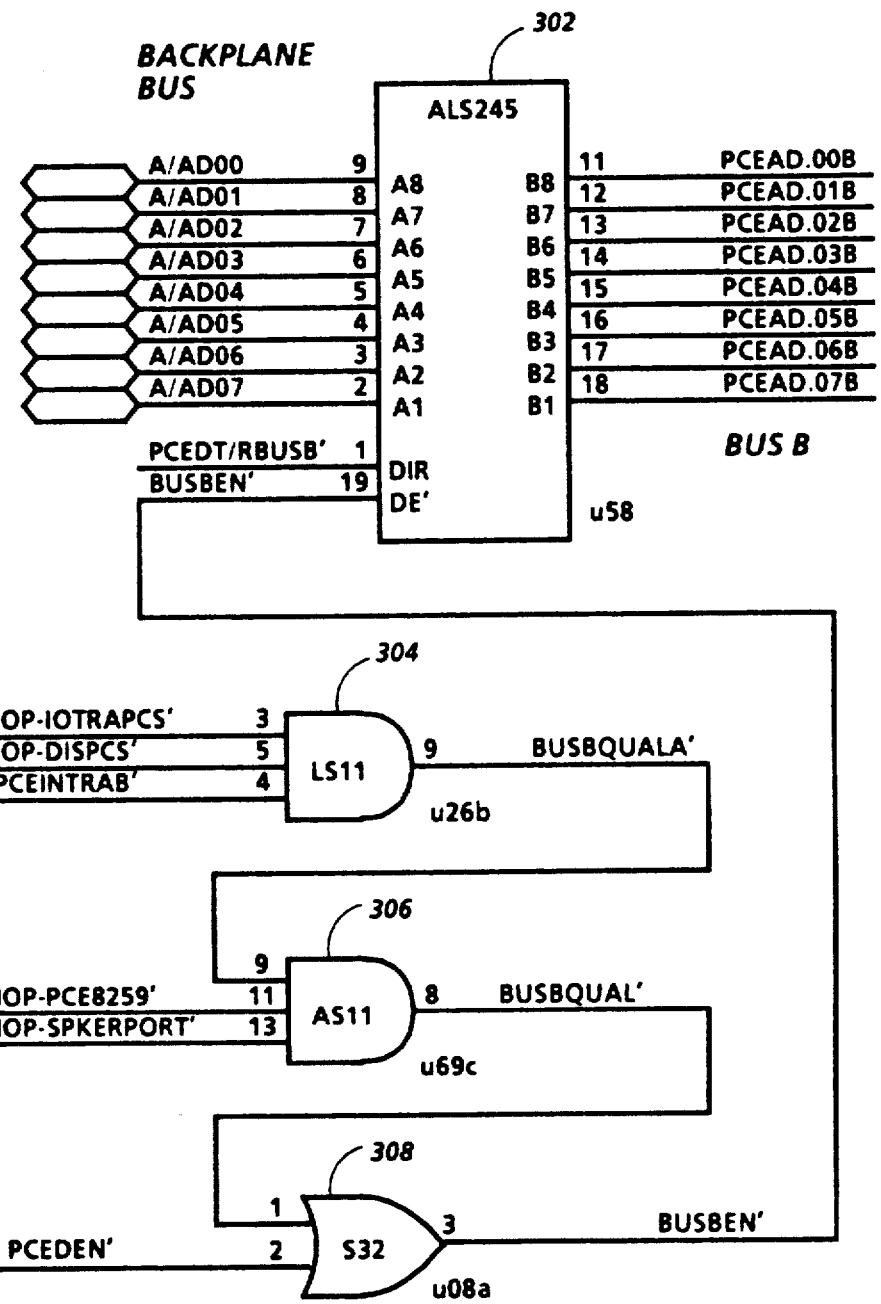
FIG. 24 is a detailed circuit diagram showing driving circuitry which serves the speaker port of FIGS. 23A and 23B.

FIG. 24 shows the circuitry which drives the lines of IOP bus 140 which provide signals from IOP 160 to latch 322 and to other devices on PCE option board 200 through bus B. The selection of any of several devices including speaker port 320, will result in a low output from AND gate 304 and 306. When a data enable signal from PCE CPU 210 goes low, OR gate 308 will have a low output, enabling driver 302.

Figure 25A:
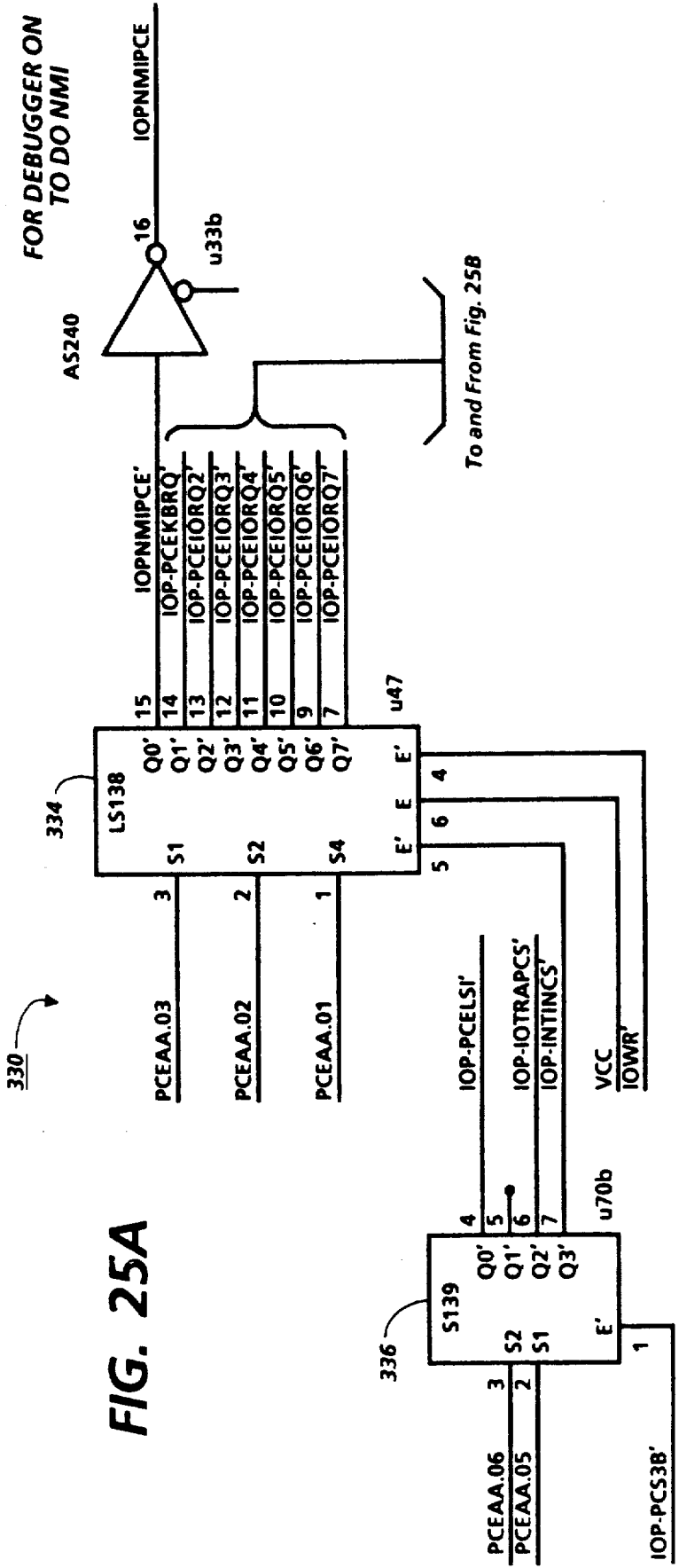
FIGS. 25A and 25B are a detailed circuit diagram showing the programmable interrupt controller of FIG. 22.
Figure 25B:
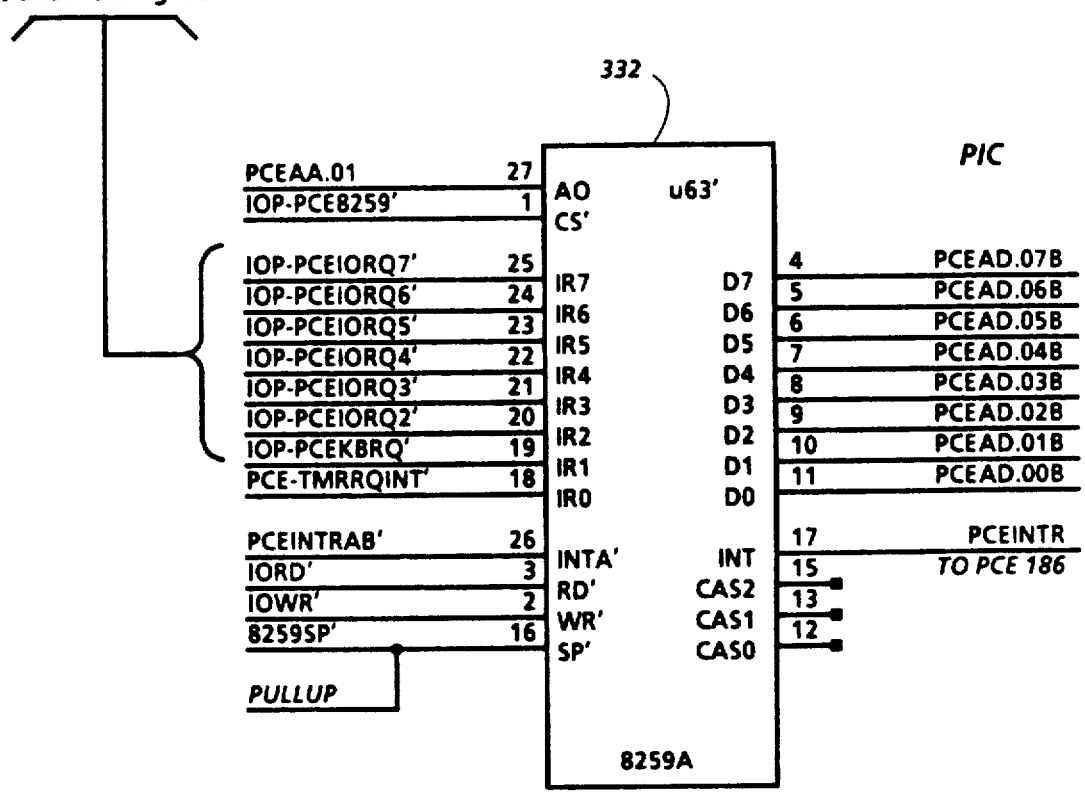

FIGS. 25A and 25B show PIC 330, including Intel 8259A chip 332, which may be used in edge-triggered mode. As with the other dedicated I/O devices 300, chip 332 is connected to bus B, but chip 332 has bidirectional communication over bus B. Chip 332 receives interrupt requests decoded by decoder 34 from an address provided by IOP 160. Decoder 34 is enabled, in turn, by a signal from decoder 36 which also decodes a part of an IOP address to determine that an interrupt is being provided. When PCE CPU 210 receives an interrupt request from chip 332, it returns an interrupt acknowledge signal and, during the same cycle reads an interrupt vector. Chip 332 provides the interrupt vector of highest priority which is awaiting service on bus B, and IOP bus 140 provides that vector to PCE CPU 210.

D. Additional PCE Circuits

Figure 26A:
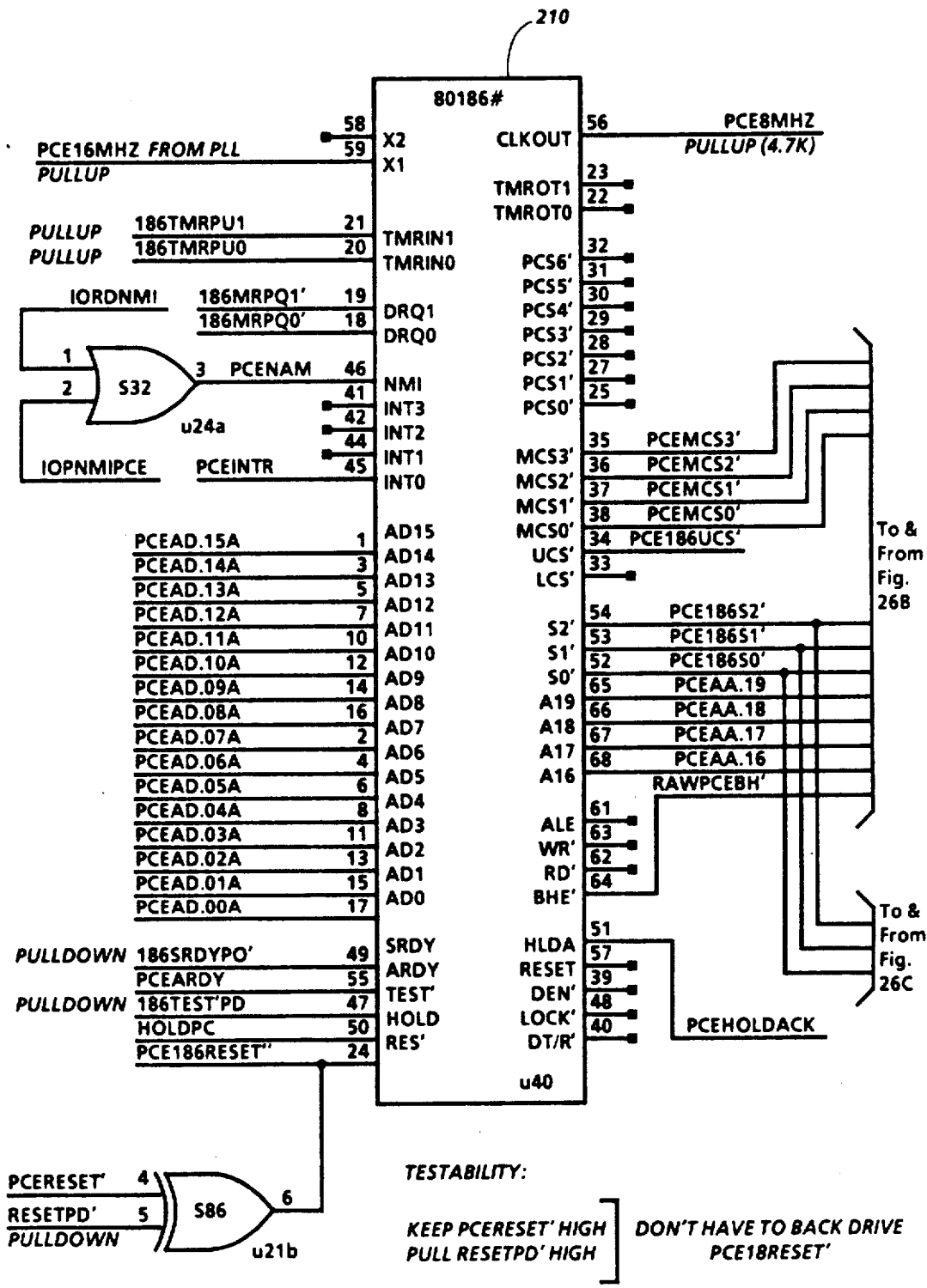
FIGS. 26A, 26B, and 26C are a detailed circuit diagram showing the PCE CPU of FIG. 11.
Figure 26B:
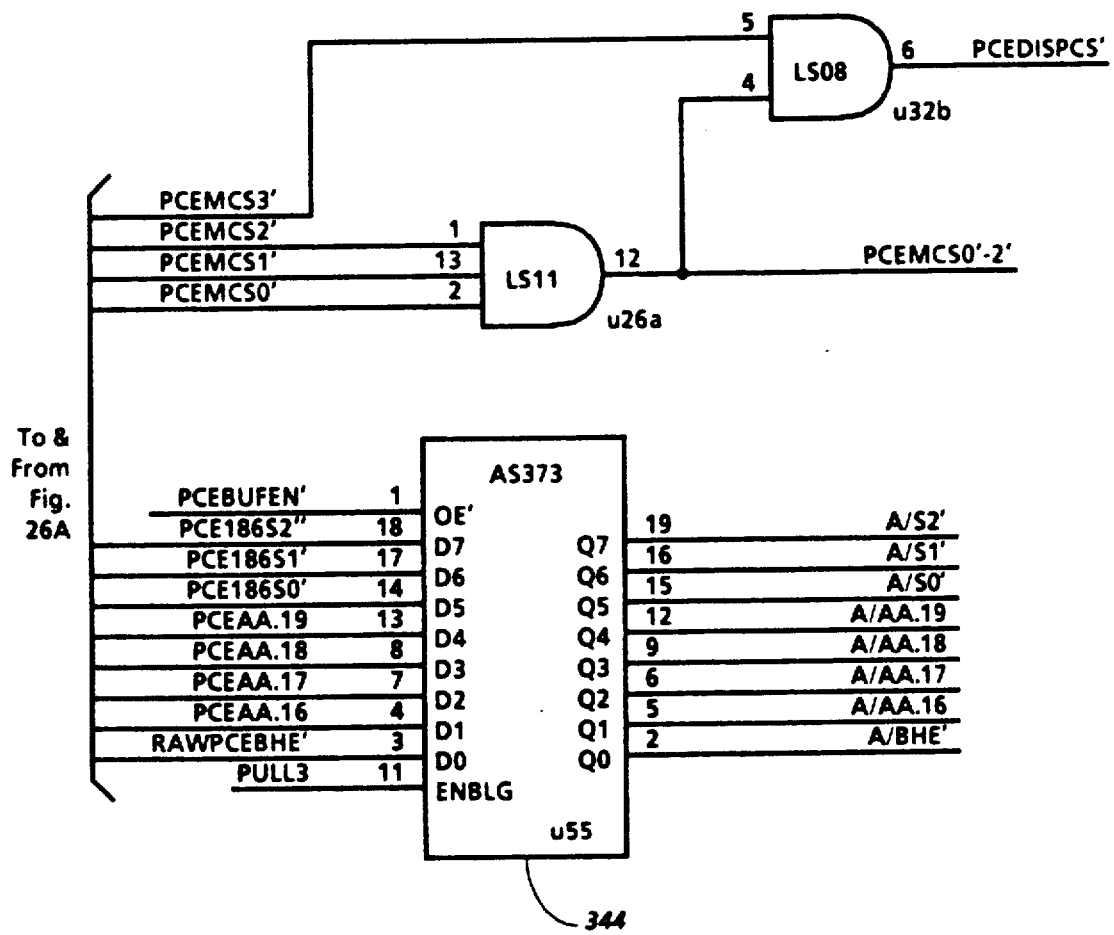
Figure 26C:
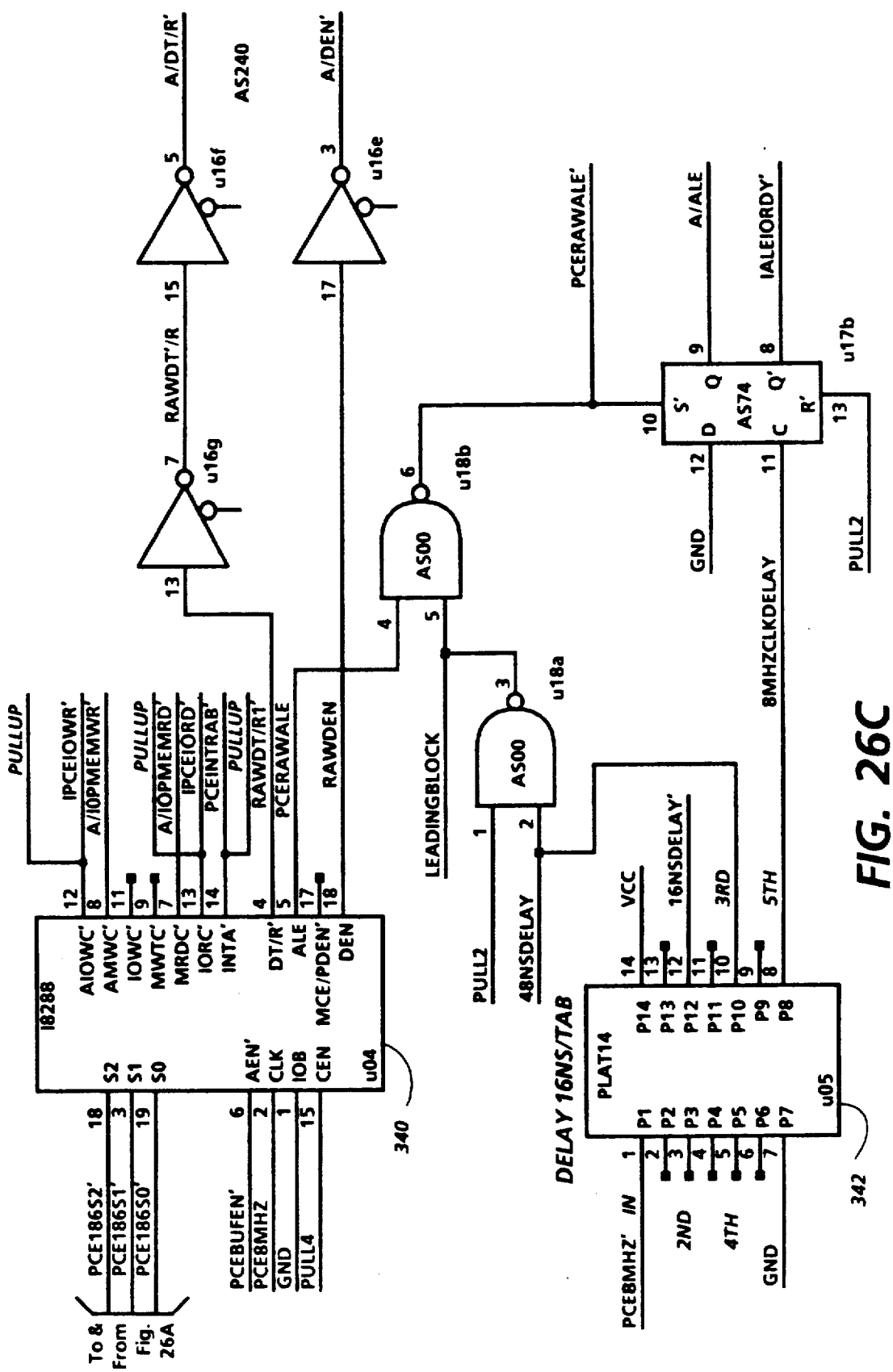
Figure 27:
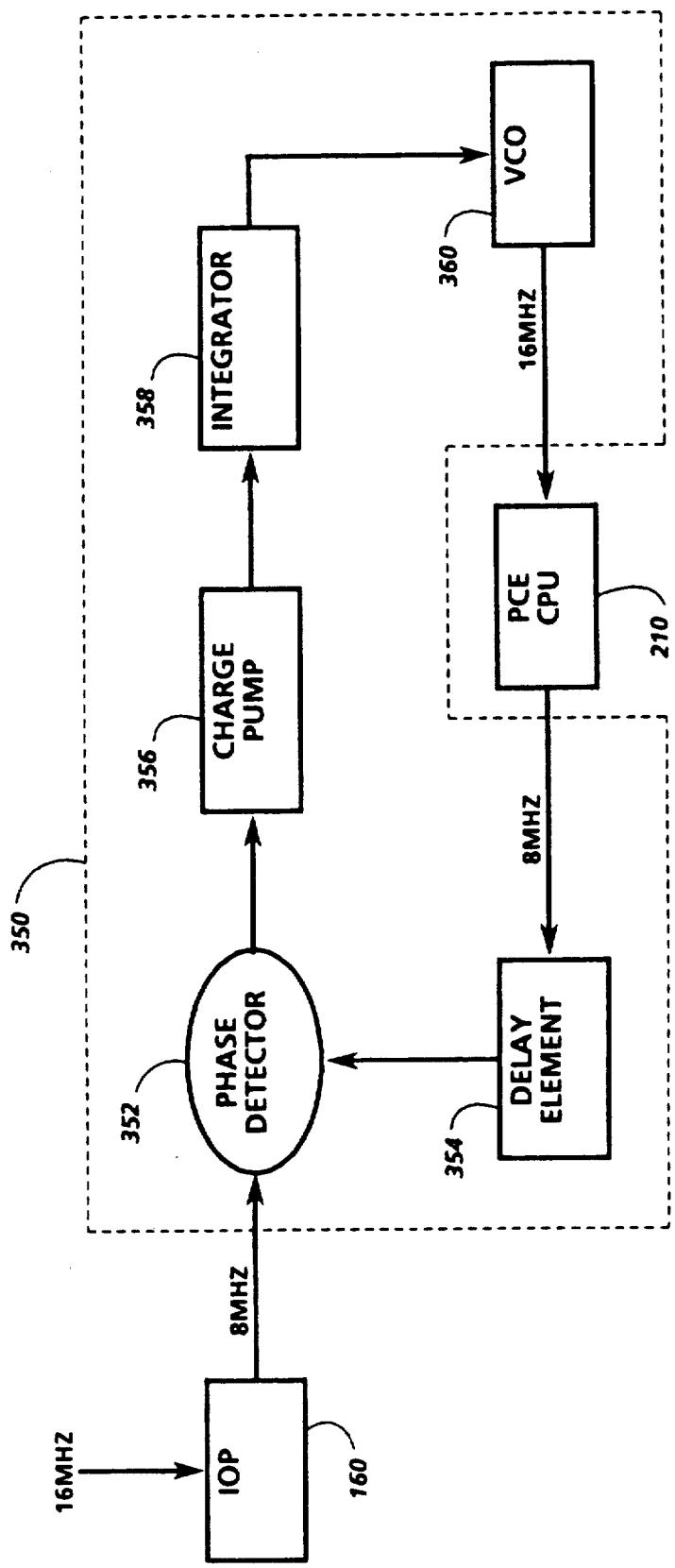
FIG. 27 is a detailed circuit diagram of phase locked loop circuitry which is part of the PC option of FIG. 11.

Up to now we have focused on the PCE board circuitry which relates most directly to emulation of the environment of PCE CPU 210, but a number of other components are included on PCE option board 200. FIGS. 26A, 26B, and 26C show PCE CPU 210 itself, with signal names at its input and output lines and with some of its supporting circuitry. FIG. 27 shows phase locked loop (PLL) circuitry which maintains a timing relationship between PCE CPU 210 and IOP 160. FIGS. 28A–28L show various supporting components for PCE CPU 210. FIG. 29 shows circuitry which generates a ready signal and FIG. 30 shows circuitry which generates an EPROM control signal.

FIGS. 26A, 26B, and 26C show that some of the output signals from PCE CPU 210 go to bus controller 340, an Intel 8288 chip. Bus controller 340 decodes lines PCE186S0'–S2' and generates command and control signals at appropriate times, according to Table 1:

TABLE I

| CPU Lines | | | |
| --- | --- | --- | --- |
| S2' | S1' | S0' | 8288 Command |
| 0 | 0 | 0 | Interrupt Acknowledge |
| 0 | 0 | 1 | Read I/O |
| 0 | 1 | 0 | Write I/O |
| 0 | 1 | 1 | Halt |
| 1 | 0 | 0 | Instruction Fetch |
| 1 | 0 | 1 | Read Data from Memory |
| 1 | 1 | 0 | Write Data to Memory |
| 1 | 1 | 1 | Passive (no bus cycle) |

Some of the output signals from bus controller 340 appear in the schematic drawings discussed above. In general, bus controller 340 acts by providing signals on the control lines of IOP bus 140 and by enabling or disabling the components which may transmit or receive on the bus. The timing of the signals from bus controller 340 is controlled in part by delay chip 342. Signals from delay chip 342 control logic which times the application of an address latch enable signal.

FIGS. 26A, 26B, and 26C also show buffer 344 which holds a number of signals from PCE CPU 210. These signals are latched to other buffers or to the IOP bus 140.

FIG. 27 shows the phase-locked loop (PLL) 350 which synchronizes the backplane clock provided by IOP 160 with the clock from PCE CPU 210. Synchronization is necessary to permit either IOP 160 or PCE CPU 210 to control the IOP bus 140 through its respective bus controller. PLL 350 synchronizes the clock signals by maintaining the phase difference between them within a narrow range.

PLL 350 receives the 8 MHz clock from IOP 160 through a backplane connection. Phase detector 352, which may be a conventional phase/frequency detector, receives the 8 MHz clock from IOP 160 and also receives an 8 MHz clock from PCE CPU 210 through delay element 354. Delay element 354 is selected to cancel the difference in time between the two 8 MHz signals resulting from the greater propagation distance from IOP 160 and PLL 350. Phase detector 352 provides an output signal which, if the phase difference is outside the narrow permitted range, drives charge pump 356 according to which signal is leading the other. Charge pump 356 thus generates a current dependent on the phase difference between the signals. This current is integrated by integrator 358, which provides the integrated current as a voltage to voltage controlled oscillator (VCO) 360. VCO 360 operates at approximately 16 MHz, but if the clock from IOP 160 leads the clock from PCE CPU 210, VCO 360 increases in frequency, and if the IOP clock lags the PCE clock, VCO decreases in frequency. The 16 MHz output from VCO 364 goes directly to PCE CPU 210 which divides it by two to obtain its 8 MHZ clock, which passes through delay element 354 to phase detector 352.

When PCE board 200 is powered up, VCO 360 runs free, ramping up to a frequency in the locking range of the loop, so that the phase lock is obtained. Thereafter, phase detector 352, charge pump 356 and integrator 358 cause adjustment of the VCO 364 frequency whenever the phase difference exceeds the permitted range.

Figure 28A:
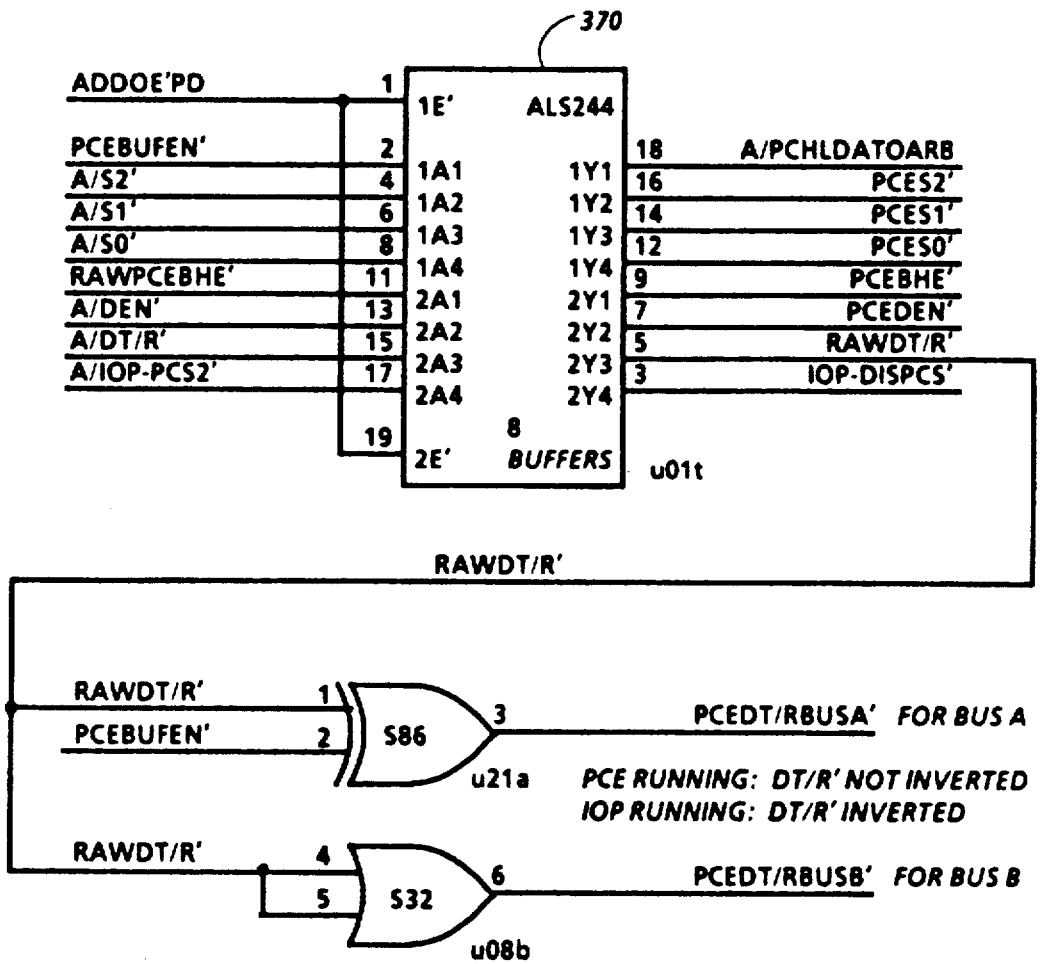
FIGS. 28A-28L are detailed circuit diagrams of various circuits in the PCE option of FIG. 11, including, respectively, a buffer bank for PCE CPU signals; a buffer bank for IOP signals; gated inverter banks; high byte address latch; low byte address latch; high byte address driver and data transceiver; low byte address driver; low byte data transceiver; high address bit drivers; a delay circuit with flip-flop; a PCE resetting an buffer enable delay circuit; and a delay element.
Figure 28B:
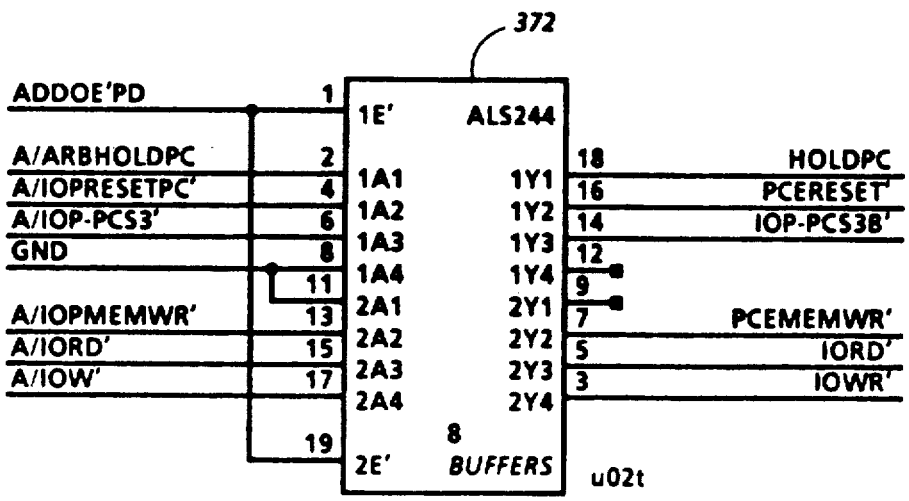
Figure 28C:
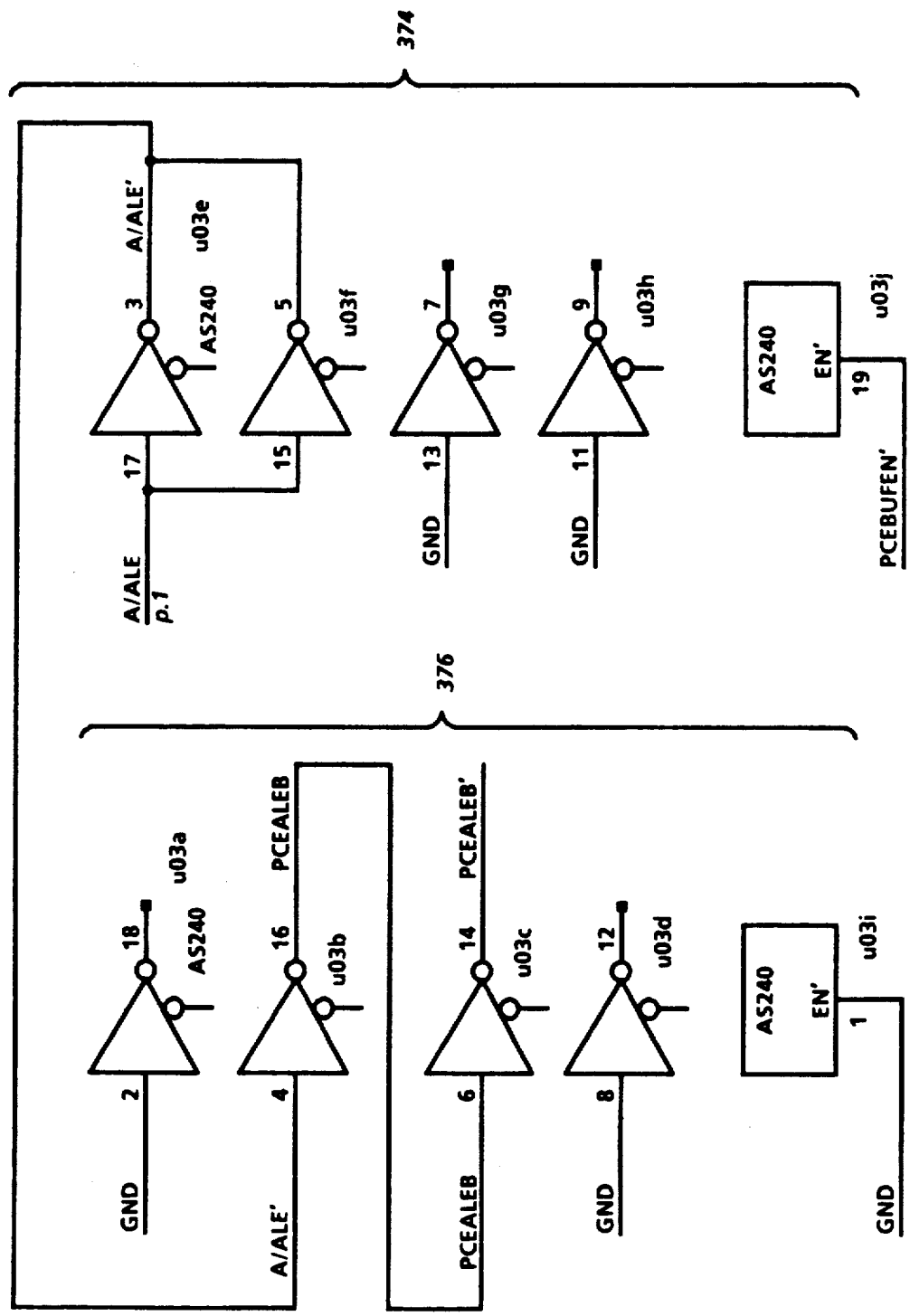
Figure 28D:
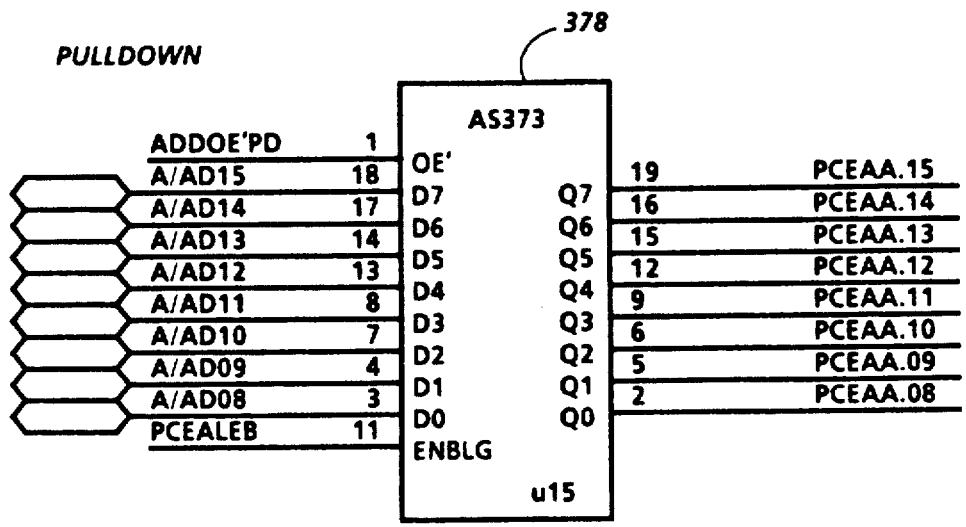
Figure 28E:
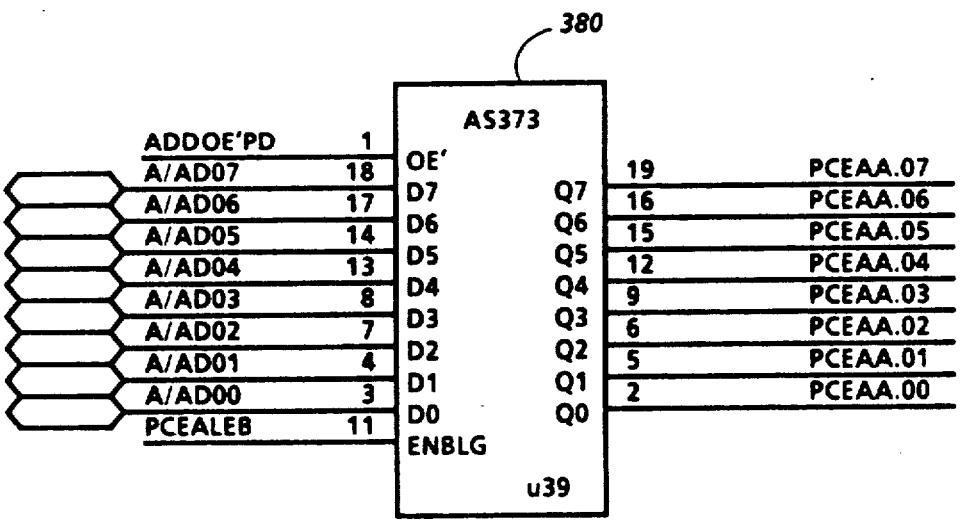
Figure 28F:
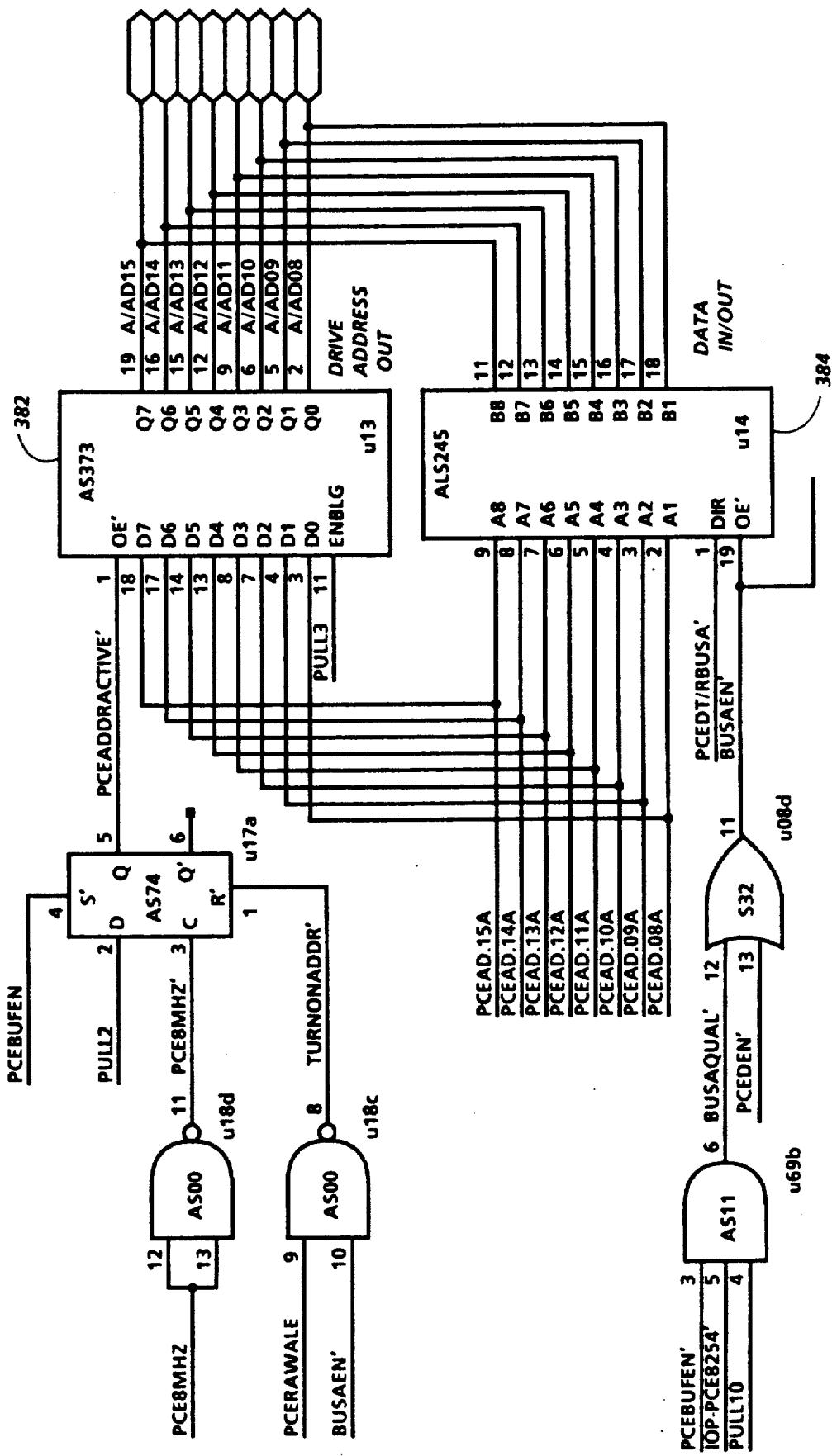
Figure 28G:
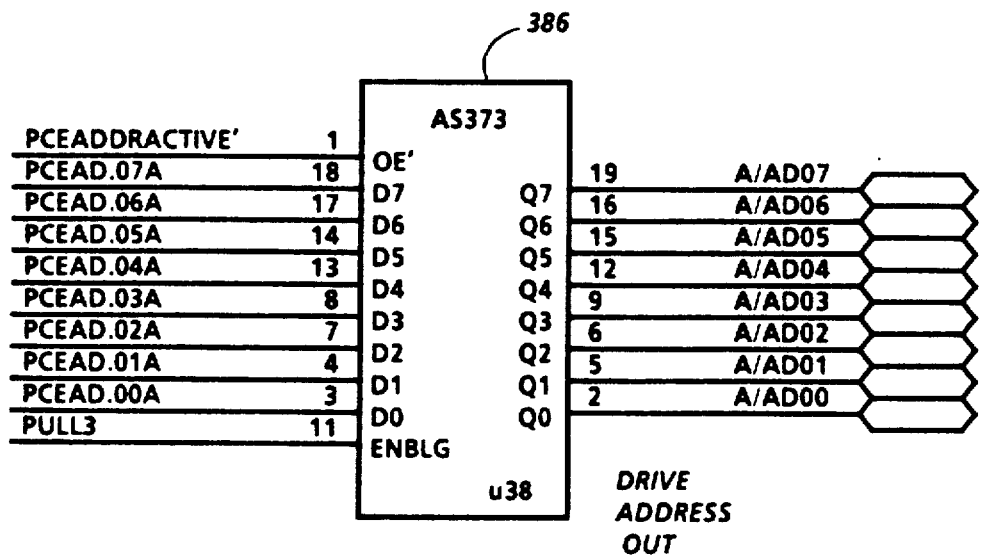
Figure 28H:
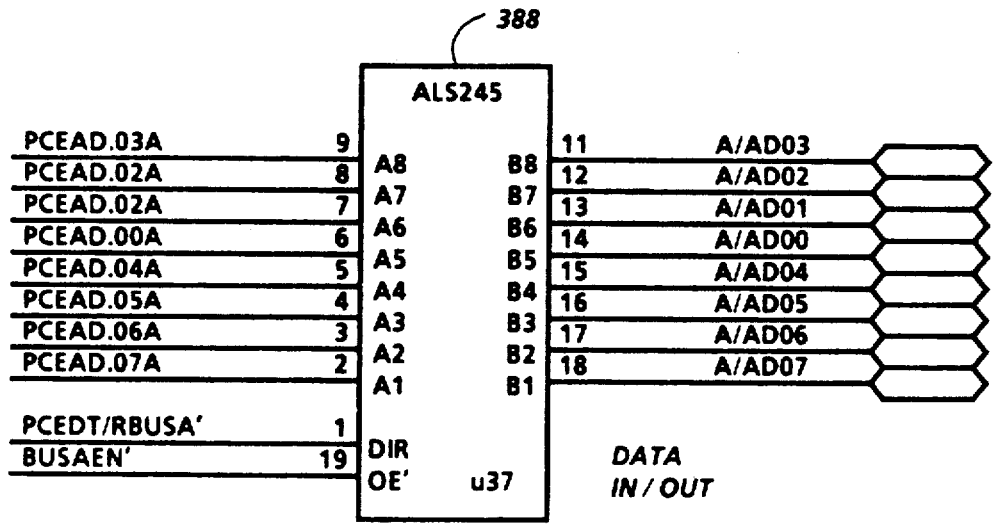
Figure 28I:
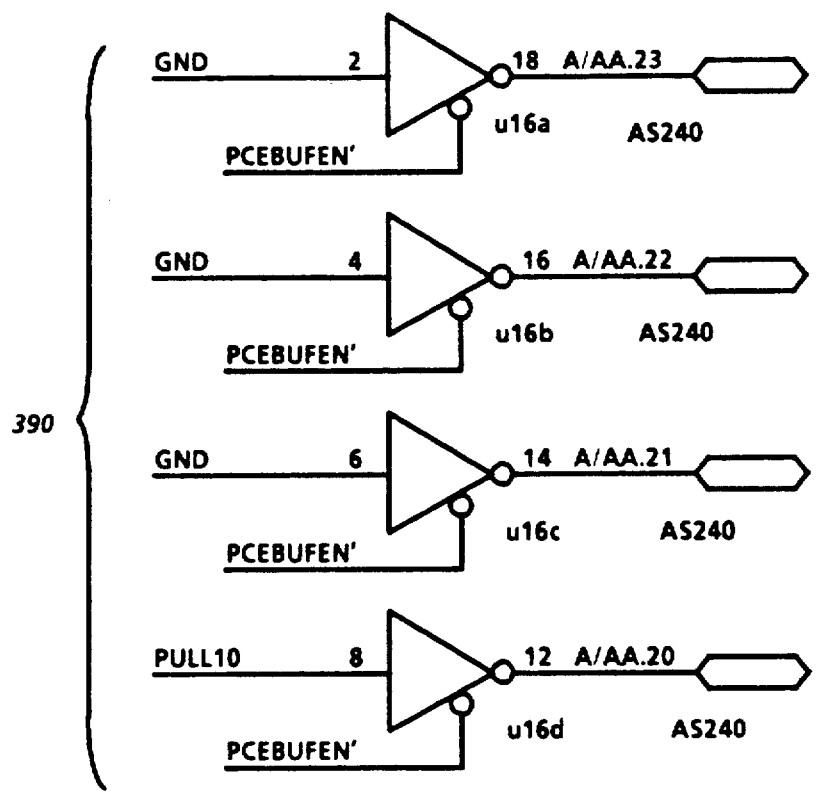
Figure 28J:
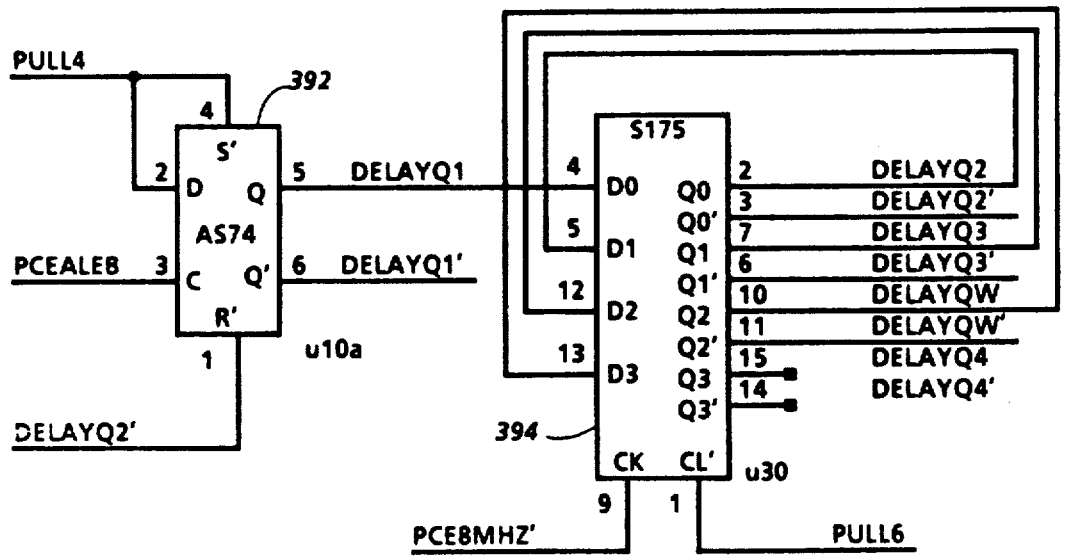
Figure 28K:
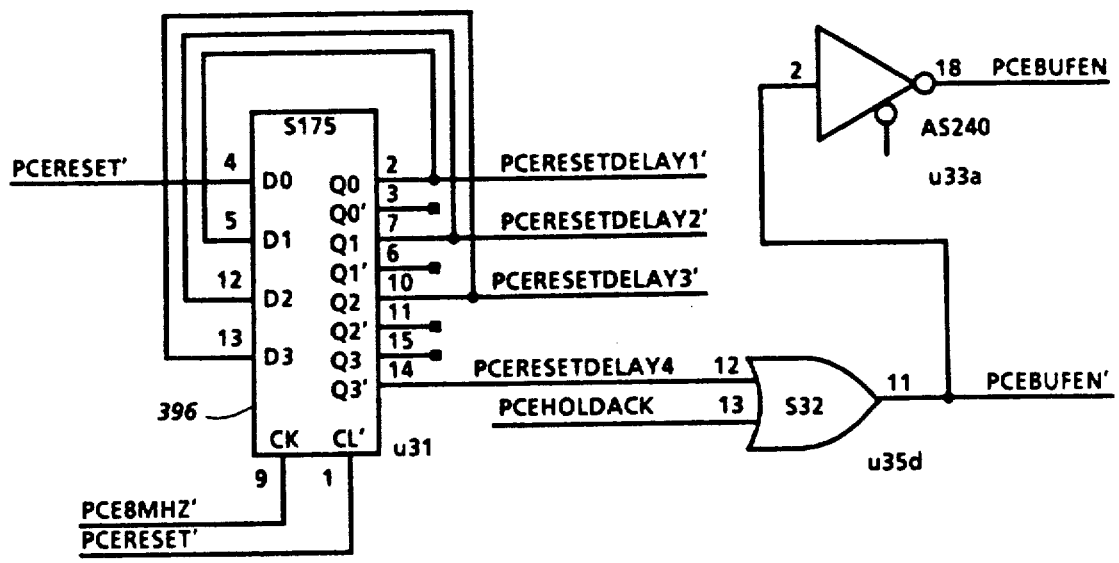
Figure 28L:
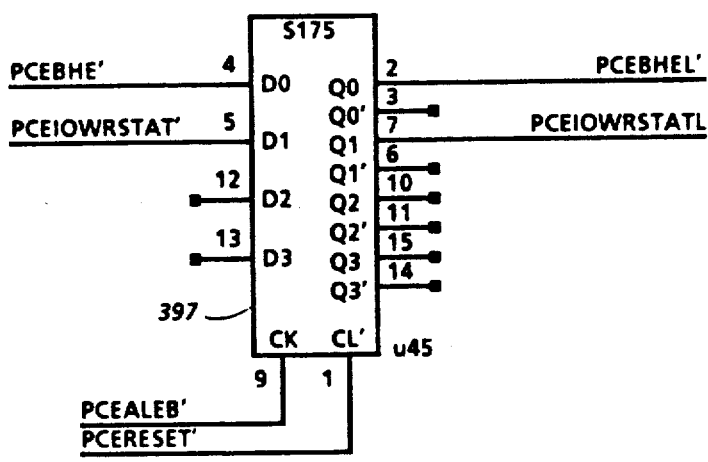

FIGS. 28A-28L show various components, most of which are conventional. FIG. 28A shows a bank of buffers 370 for a number of signals from PCE CPU 210, together with some logic. FIG. 28B shows a similar bank of buffers 372 for a number of signals from IOP 160. FIG. 28C shows two banks of gated inverters 374 and 376 which provide the signals shown according to the gating signals. FIGS. 28D and 28E show high and low byte address latches 378 and 380, respectively. FIG. 28F show high byte address driver 382 and high byte data transceiver 384, together with some logic. FIG. 28G shows low byte address driver 386, while FIG. 28H shows low byte data transceiver 388. FIG. 28I shows a bank of inverters 390 which maintain the highest four address bits at the values necessary to select the mapping register for PCE CPU 210, as discussed below in relation to address mapping. FIG. 28J shows a delay circuit including flip-flop 392 and delay element 394, providing a number of delay signals including some discussed above. FIG. 28K shows another delay circuit, centered around delay element 396, providing delay signals relating to PCE resetting and to buffer enable signals. FIG. 28L shows another delay element 397.

FIG. 29 shows logic circuit 398 which provides a ready signal to PCE CPU 210, indicating an asynchronous ready. FIG. 30 shows logic circuit 399 which provides an EPROM control signal based on the upper memory chip select PCE186UCS signal from PCE CPU 210. As described above for the PCEMCS signals which are used in display trapping, a routine which is part of the implementation of the invention causes PCE CPU 210 to provide PCEUCS whenever PCE CPU 210 is addressing the part of its memory containing the ROMBIOS, which would be stored in an EPROM in an IBM PC. If PCE CPU 210 also provides a memory write signal, logic circuit 399 provides a signal which prevents the memory access from proceeding, thereby protecting the ROMBIOS stored in main memory 126 from being overwritten.

Based on the above description of host system 16 and PCE option board 200, it is now possible to describe in more detail how host system 16 emulates the environment of PCE CPU 210.

IV. Emulated Environment

The emulation of the environment of PCE CPU 210 requires the emulation of several distinct components which would be available to the CPU of an IBM PC, including memory and I/O devices. In most instances, host system 16 has an analogous component to the component being emulated, but the analogous component operates differently than the emulated component, so that PCE CPU 210 cannot simply treat the analogous component at if it were the emulated component.

A related problem in emulating the environment is that host system 16 cannot provide the responses of some of the emulated devices as quickly as the devices themselves could. In the particular architecture of the Xerox 6085, as described above, emulation by IOP 140 may not in fact be slower than the actual devices would be, but PCE CPU 210 will be stopped by IOP 140 during I/O device emulation, so that the responses are provided more slowly than by the actual devices. Therefore, PCE CPU 210 must be controlled so that it will continue to execute an instruction sequence properly even though some emulated devices in its environment respond more slowly than actual devices would respond.

In addition, during emulation, host system 16 may also emulate the user interface of the target system, in this case an IBM PC. This requires that host system 16 be capable of deriving the information necessary to emulate the user interface from PCE CPU 210.

In order to solve these problems, emulation according to the present invention may be implemented by combining two distinct techniques. The first technique is to emulate the memory of PCE CPU 210 in such a manner that it can execute memory read and write operations in the same number of instruction cycles as the IBM PC; execution of instructions requiring only memory read and write will proceed much as if PCE CPU 210 were in an IBM PC. The second technique is to emulate I/O devices with a separate processor, IOP 160, which controls PCE CPU 210 so that it continues to execute an instruction sequence properly, even though some of the instructions result in device emulation which responds more slowly than the corresponding actual devices in an IBM PC. If appropriate information is provided to hose system 16 to enable it to emulate both the environment and the user interface of the target IBM PC, the two techniques can be combined to solve all of the problems set forth above.

A. Memory Emulation

A number of important considerations apply to memory emulation. Unless PCE CPU 210 interacts with memory much as it would in an IBM PC, emulation will be difficult, since most IBM PC instructions executed will involve at least one memory access, either to read or to write. At the same time, however, some information stored in memory by PCE CPU 210 must be available to host system 16 to permit it to emulate the user interface, especially the display. Furthermore, the processor emulating I/O devices, IOP 160, must control PCE CPU 210, and this may advantageously be done in part by accessing PCE memory. Finally, if PCE CPU 210 should fail or "crash" during execution, for whatever reason, host system 16 should continue to operate normally.

Memory emulation according to the present invention may be implemented in a manner which addresses all of the above considerations. The architecture of system 100 shown in FIG. 8 illustrates such an implementation. PCE CPU 210, in PCE option 200, may address memory directly over IOP bus 140, and its memory requests may be handled in much the same manner as those requests would be handled by the memory in an IBM PC. Mesa CPU 112 may obtain information necessary to emulate the user interface, especially the display, by accessing the portion of memory allocated to PCE CPU 210. Similarly, when PCE CPU 210 does not have control of IOP bus 140, IOP 160 may exercise some control over PCE CPU 210 by accessing its space in memory. Means may be provided for protecting host system 16 from failure of PCE CPU 210.

Figure 31:
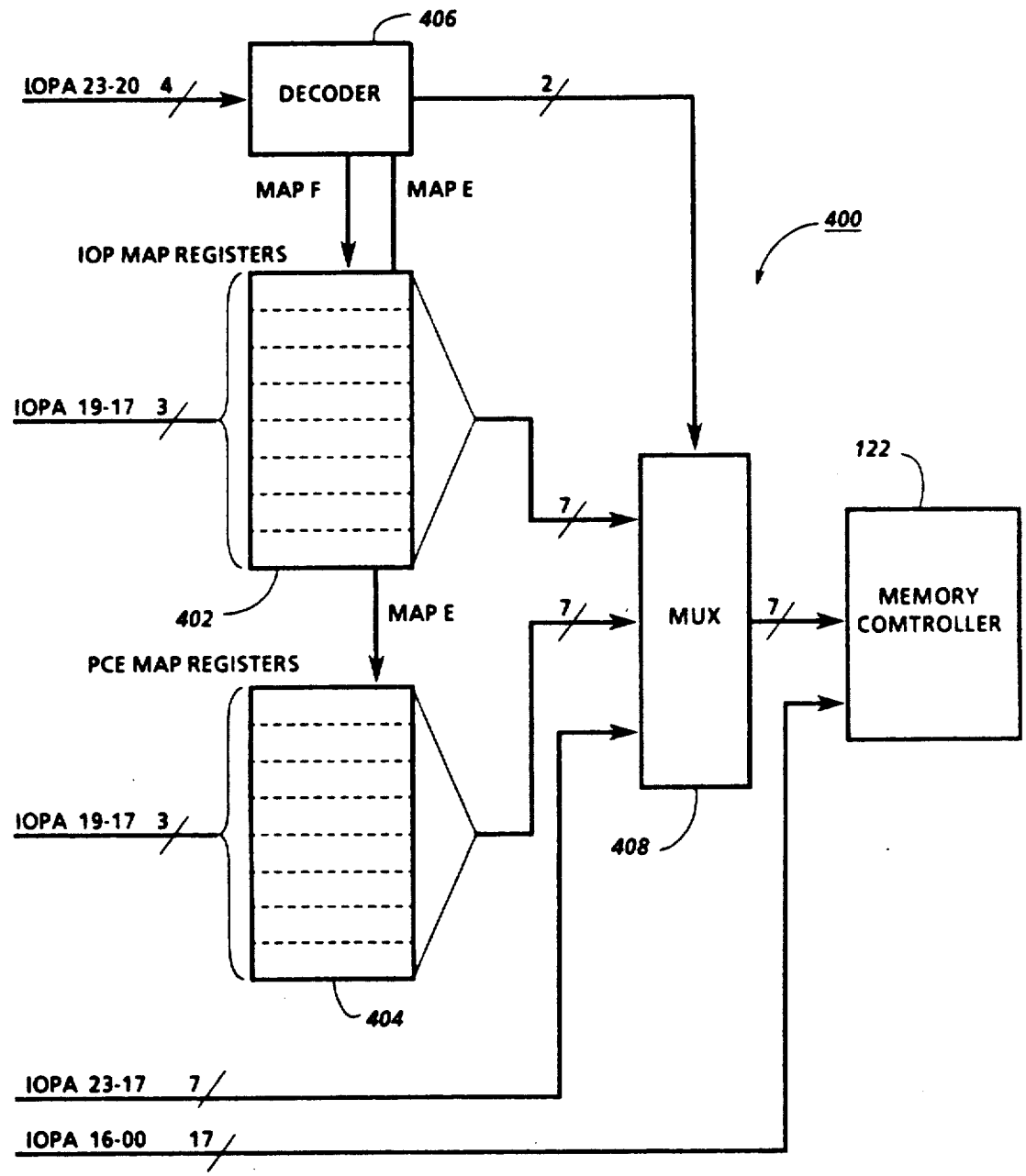
FIG. 31 is a block diagram of the memory mapper of FIG. 11.

As discussed above, the architecture of system 100 in FIG. 8 is that of a conventional Xerox 6085 workstation, but one feature of that architecture is particularly useful to protect host system 16 from failure of PCE CPU 210. FIG. 31 shows mapper 400 which permits the mapping of the PCE memory space in such a manner that host system 16 will be unaffected by such a failure.

Mapper 400 includes map register files 402 and 404 which store values necessary for mapping memory addresses. IOP map registers 402 store values necessary for mapping memory addresses from IOP 140, while PCE map registers 404 store values necessary for mapping memory addresses from PCE CPU 210. Map register files 402 and 404 are selectable by the signals MapF and MapE, respectively, from address decoder 406, as shown. Selection of the register within the selected file will be made by the three bits IOPA 19-17 from IOP bus 140. Decoder 406 also provides a signal to multiplexer (MUX) 408 which determines which of the signals at its input is provided at its output to memory controller 122.

Decoder 406 receives four bits, IOPA23-20 which control its operation. If those four bits take the hexadecimal values E or F (1110b, 1111b), decoder 406 provides the appropriate signal MapE or MapF to register files 402 and 404 and provides a corresponding signal to MUX 408. The result is that the contents of the register selected by IOPA19-17 are provided to MUX 408 and thence to memory controller 122. But if the four bits IOPA23-20 take any value other than E or F, decoder 406 provides a signal to MUX 408, so that it provides bits IOPA23-17 from IOP bus 140 to memory controller 122. IOPA16-00 are provided directly to memory controller 122 to complete the address.

The values on lines IOPA23-20 are provided by some of the circuitry already discussed in relation to FIGS. 28I and 28K. All four lines are pulled up by appropriate circuitry associated with IOP 160, but, as shown in FIG. 28I, line IOPA20, corresponding to A/AA.20, is pulled down to a low signal by a gated inverter when the signal PCEBUFENM' goes low. As shown in FIG. 28K, PCEBUFEN' will go low when PCE CPU 210 stops acknowledging a hold and reset has been released. In other words, after reset has been released, PCE-BUFEN' will go low whenever PCE CPU 210 is released from a hold and takes over IOP bus 140.

The contents of the registers in map register files 402 and 404 will determine the actual mapping which is performed. These registers may be addressable as I/O devices within the IOP address space, so that IOP 160 may load them, but PCE CPU 210 cannot access them. As IOP 160 is loading the registers, it can also clear the corresponding actual memory locations by addressing and zeroing the contents stored at all values of IOPA 16-00.

The map register files 402 and 404 may each contain eight registers, to permit each processor to address eight memory blocks of 128KBytes each. Due to a feature of the IBM PC, however, PCE CPU 210 may need only six of those blocks. In one targeted IBM PC, 384KBytes of specialized memory for system specific data beginning at A0000h contain only the following B0000-B3FFFh contain the monochrome display memory; B8000-BBFFFh contain the color/graphics display memory; C8000-CBFFFh contain the fixed disk control memory; F0000-FDFFFh contain the ROM BASIC, not necessary for emulation; and FE00-0-FFFFFh contain the ROMBIOS. The remainder of memory for general purpose applications is addressable in five blocks of 128KBytes each from 0000-9FFFFh. Therefore, the 384KBytes of specialized memory can be mapped into a single 128KBytes block. On the other hand, if it is desired to run software which makes full use of all eight blocks of 128KBytes of addressable memory, sharing of blocks is undesirable, because the blocks sharing memory space will be in conflict.

One mapping which is especially convenient takes advantage of the omission of ROM BASIC at F0000-FDFFFh in the allocation of specialized memory set forth above. If bits 19-17 of the addresses of the remaining contents of the specialized memory are ignored, there will nonetheless be no conflict between those contents, i.e. each location allocated to store data will have only one item of data in it. Therefore, the same value for address bits 23-17 can be stored in each register which corresponds to one of those three 128KByte blocks without conflict. In effect, all three 128KByte blocks are stored in one 128KByte block, saving 256KBytes.

The mapping of memory in the manner described above protects host system 16 from failure by PCE CPU 210, because failure will only effect the part of memory allocated to PCE CPU 210. Furthermore, PCE CPU 210 will be able to treat system memory 126 as if it were its own memory, just as the CPU of an IBM PC would. Therefore, mapping is an effective technique for memory emulation.

B. I/O device emulation—IOP controlled

Emulation of most of the device which provide the processor environment differs from emulation of memory in that operation of PCE CPU 210 stops during emulation. While PCE CPU 210 is stopped, means within host system 16 performs the sequence of steps discussed above in relation to FIG. 5, emulating the appropriate I/O device. Then, when emulation is completed, PCE CPU 210 is permitted to resume operation.

Figure 32:
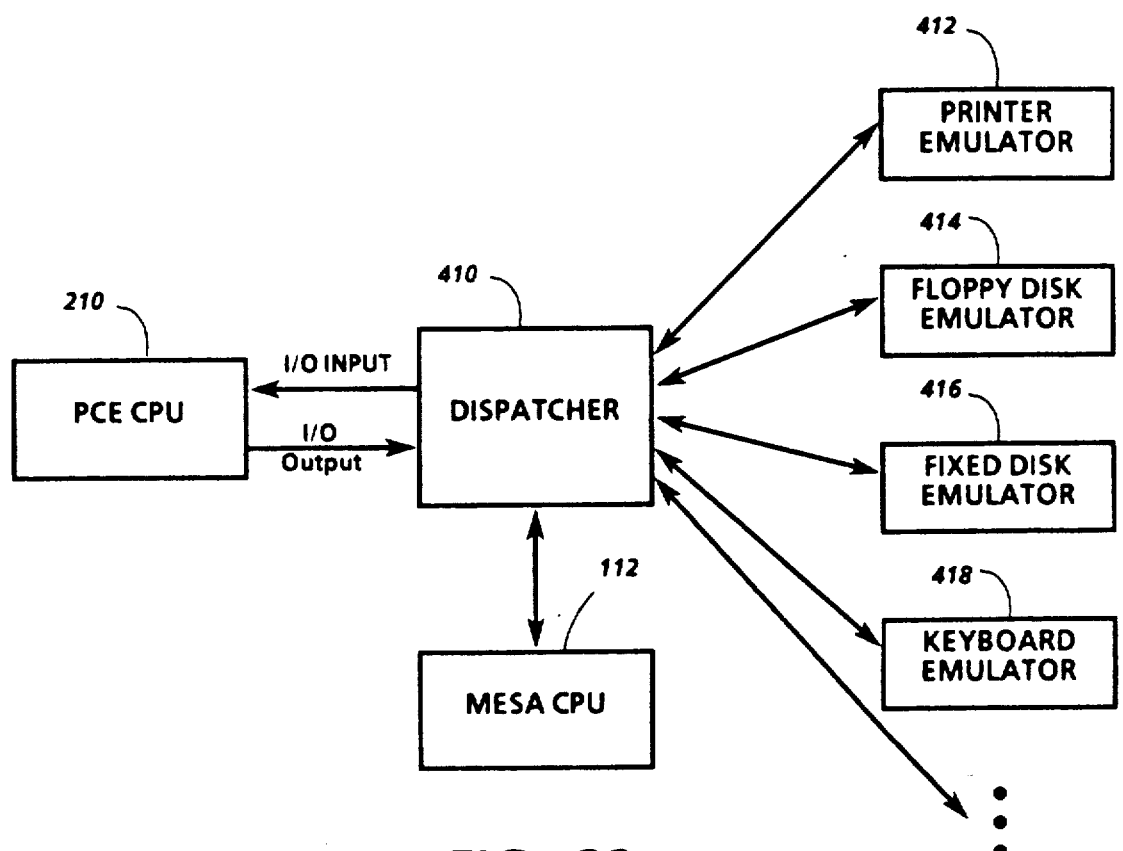
FIG. 32 is a block diagram showing the relationships between other components and the Dispatcher run on the IOP of FIG. 8 and which controls I/O device emulation.

The means for emulating the I/O devices includes IOP 160 as well as Mesa CPU 112. Although both processors participate, IOP 160 manages the emulation, primarily by executing software referred to as Dispatcher. FIG. 32 illustrates the relationships between Dispatcher 410 and other components. Dispatcher 410 handles communication between PCE CPU 210 and the various means which perform each of the specific I/O device emulations, examples of which include printer emulator 412, floppy disk emulator 414, fixed disk emulator 416 and keyboard emulator 418. In addition, Dispatcher 410 communicates with Mesa CPU 112. Dispatcher 410 therefore manages the performance of the steps shown in FIG. 5, with each of the device emulators being called when needed by Dispatcher 410.

1. Dispatcher. Because its task is to provide communication between a number of components, Dispatcher 410 could be implemented in many ways. An implementation which is especially appropriate for the host system architecture described above relies on a specialized operating system for IOP 160. That specialized operating system performs some basic Dispatcher functions, and also supports a multitasking queue which may hold tasks which perform other Dispatcher functions, some device emulator functions and a number of other functions.

a. IOP operating system. The operating system for IOP 160 could similarly be implemented in many ways, but, as noted above, can be a specialized operating system which performs only I/O operations. As a result, this operating system is more powerful than a general operating system which also performs other operations. The specialized operating system is possible because the architecture of host system 16 as shown in FIG. 8 permits true parallel operation, with Mesa CPU 112 performing other operations while IOP 160 performs I/O operations.

Figure 33:
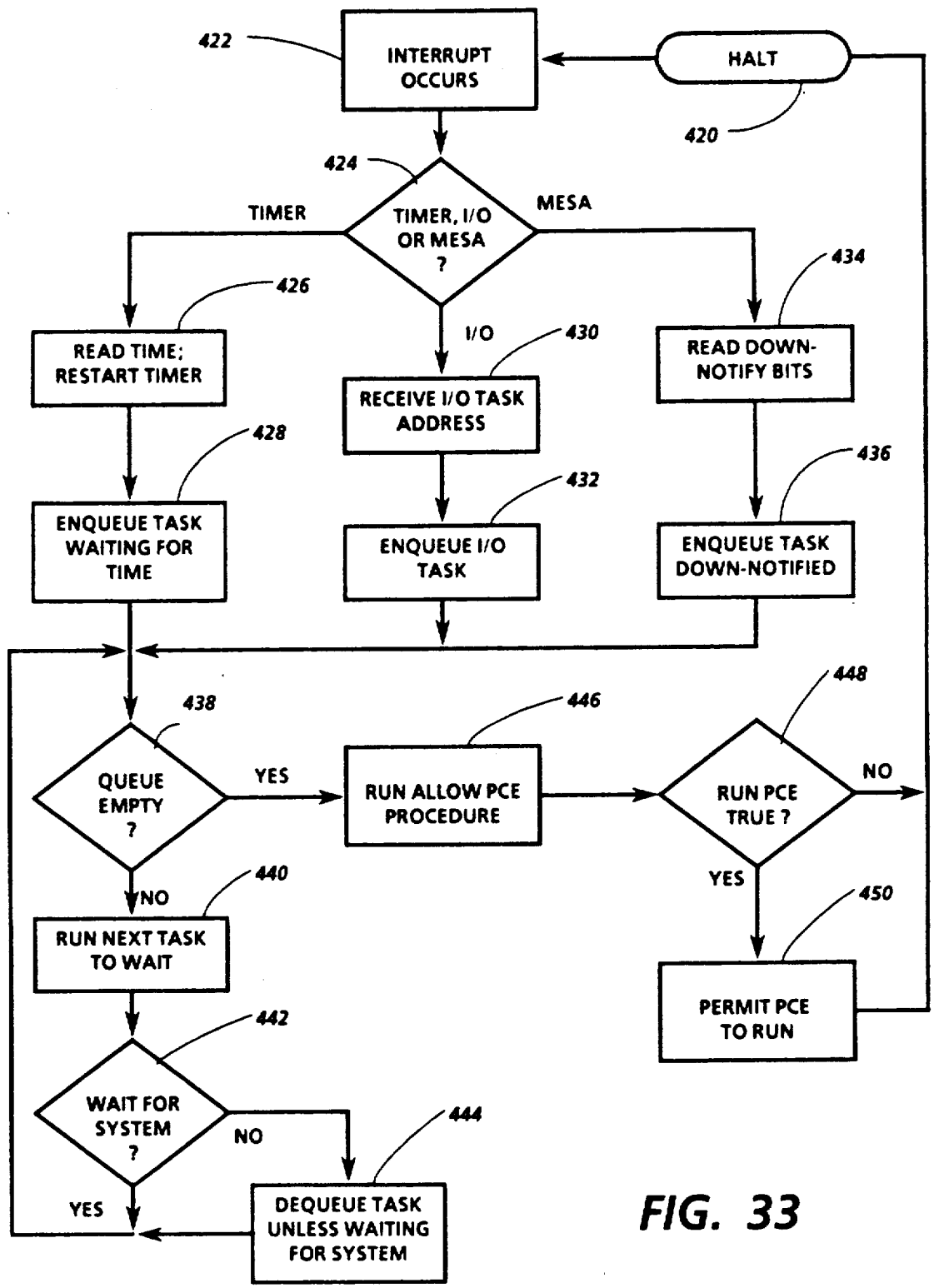
FIG. 33 is a flowchart showing relevant features of the operating system of the IOP of FIG. 8.

The relevant features of the specialized IOP operating system are shown in FIG. 33, which is a partial operating system flowchart. When IOP 160 is powered up, the operating system is automatically booted, and continues to run as long as IOP 160 operates, coming to rest in a halt state, as shown in box 420, during periods of inactivity. When an interrupt occurs, as in box 422, IOP 160 in effect wakes up, and a number of hardware functions are performed in the conventional manner for an Intel 80186 microprocessor. The hardware automatically stores the contents of certain registers and loads an address for servicing the interrupt. This address calls the specialized IOP operating system described above and it begins to execute.

The operating system first tests the type of interrupt, in box 424, with the three relevant types being an interrupt from the onboard timer of the 80186, an interrupt from the master interrupt controller 166b calling for an I/O operation, or an interrupt called a downnotify from the Mesa CPU 112. If the interrupt is from the timer, the IOP 160 reads its timer and restarts it, in box 426; then it adds to its multitasking queue any tasks which were waiting for the timer interrupt, in box 428. Similarly, if the interrupt is an I/O interrupt, IOP 160 receives the address from master interrupt controller 166b, in box 430, and adds the I/O task found at the address to the multitasking queue, in box 432. If the interrupt is from the Mesa CPU 112, IOP 160 reads a number of bytes from system memory 126 containing downnotify bits, in box 434, and enqueues the task indicated by the downnotify bits onto the multitasking queue in box 436.

The process described above in relation to boxes 422–436 occurs whenever IOP 160 receives an interrupt, whether or not it is in a halt state at the time. But if IOP 160 is executing another task when interrupted, the response to the interrupt in box 422 includes storing the necessary data to resume that task when the interrupting task has returned to a wait state. In effect, the IOP 160 maintains an additional interrupt queue of tasks which have been interrupted and are waiting to be completed, but this interrupt queue is managed by conventional Intel 80186 techniques, without the operating system. The multitasking queue maintained by the operating system, on the other hand, is in effect a linked list of data structures, each data structure containing the information necessary to execute a corresponding task. Tasks may be added to this multitasking queue during the steps shown in boxes 428, 432 and 436 or during other steps by the operating system.

IOP 160 next checks whether the multitasking queue is empty, in box 438 if not, the next task on the queue is run until it reaches a wait state, in box 440. If the wait state is a wait for system, as tested in box 442, the task is left in the queue, and IOP 160 again tests whether the multitasking queue is empty in box 438. If the wait state is not a wait for system, the task is first dequeued in box 444, and will remain dequeued until the operating system again enqueues it.

If the test in box 438 determines that the multitasking queue is empty, on the other hand, a special procedure called Allow PCE, which is part of Dispatcher 410, is run, in box 446. This procedure, therefore, is not strictly speaking a part of the operating system, but it is called by the operating system and is not an independent task like the Dispatcher tasks discussed below. Allow PCE tests whether a flag called RunPCE in system memory 126 is true, in box 448. This flag may be set either by Mesa CPU 112 or by IOP 160, and indicates whether PCE CPU 210 may be permitted to have control of IOP bus 140. If not, IOP 160 returns to its halt state in box 420. But if RunPCE is true, AllowPCE sends out signals which have the effect of permitting the PCE CPU 210 to run, because they release it from being held, and may lead to a change of state in accordance with FIG. 10, discussed above.

Figure 34:
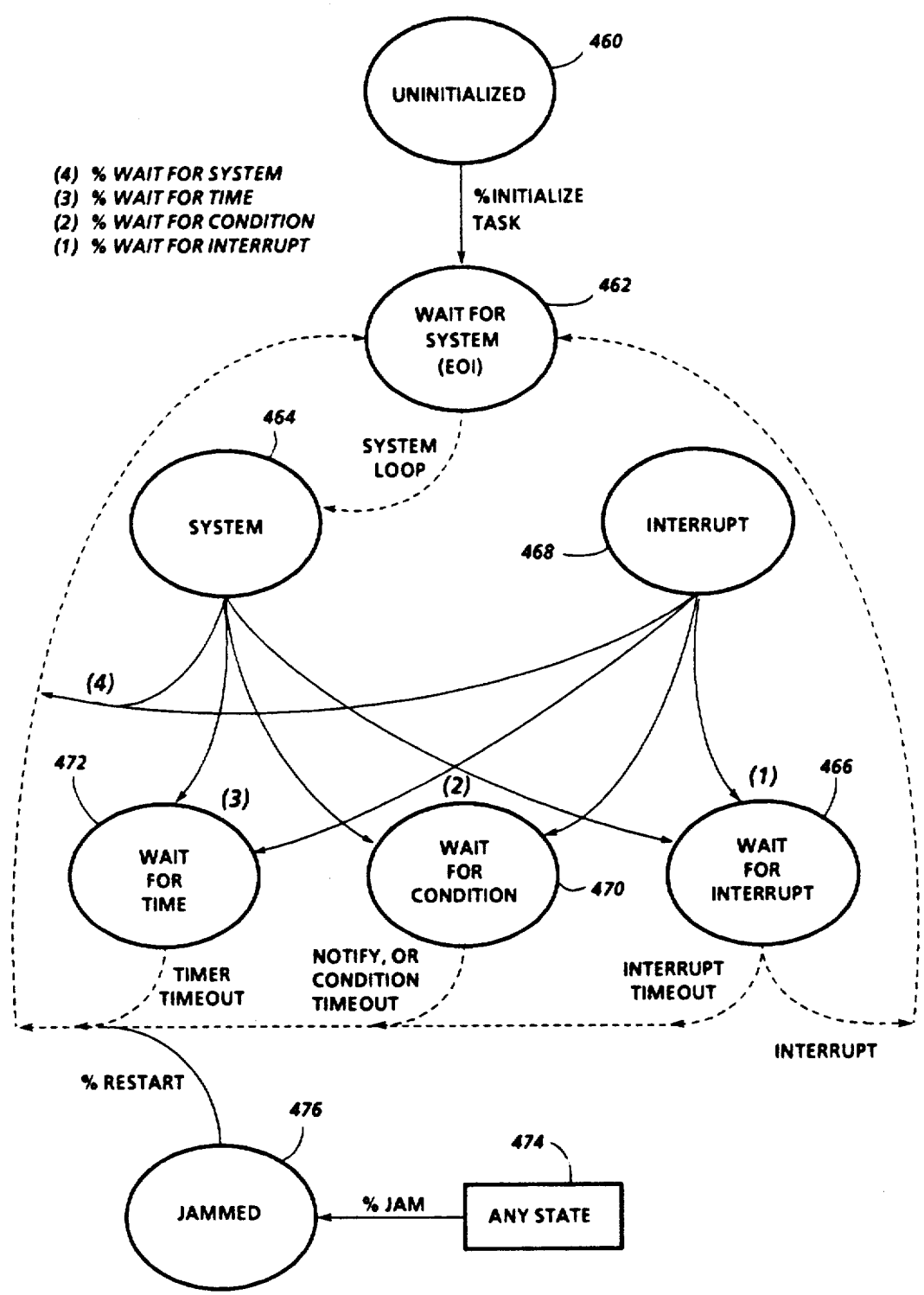
FIG. 34 is a state and transition diagram for a task managed by the operating system of FIG. 8.

FIG. 34 is a state and transition diagram followed by any task which may be on the multitasking queue managed by the operating system. The state of a task could be represented, for example, by a byte in the task data structure, the byte being changed to the value corresponding to a new state whenever the operating system or that task performs a routine corresponding to a transition from the previous state. Each task begins in unInitialized state 460, and leaves that state only when the operating system calls it and causes it to perform a routine called InitializeTask. InitializeTask prepares the task by initializing certain variables and taking other steps preparatory to running the task. When the task is ready to be run, it enters waitFor System state 462, in which it is merely waiting for the operating system to place it on the multitasking queue to be run.

When the operating system reaches a task on the multitasking queue, it sends that task's priority to master interrupt controller 166b as a mask to prevent lower priority tasks from interrupting. Then the operating system, in box 440 of FIG. 33, gives system control of IOP 160 to that task, so that the task enters System state 464 in FIG. 34, and the task has exclusive use of IOP 160 until it enters one of its wait states. At that time, the task returns control of IOP 160 to the operating system, which goes through boxes 442 and 438 in FIG. 33 to find the next task waiting in the multitasking queue, and gives control to it.

A task may enter waitForInterrupt state 466 in which that task waits for one of the interrupts from master interrupt controller 166b. If so, the task also has an interrupt entry point, whose address is provided by interrupt controller 166b when it asserts the corresponding interrupt. That interrupt is only asserted, of course, it its priority is higher than the currently executing task and after all waiting higher priority interrupts have been asserted; interrupt controller 166b compares priorities to determine when to assert each interrupt. In any task is executing at the time an interrupt occurs, that task is pushed onto the interrupt queue, discussed above. Then the operating system beings servicing the interrupt, as described above in relation to box 422 in FIG. 33. Since the interrupt is an I/O interrupt, the operating system reaches box 432 in FIG. 33, and places the task waiting for the interrupt as the top of the queue. Then the operating system passes control of IOP 160 to the task in box 440 of FIG. 33, and the task runs in its Interrupt state 468 in FIG. 34 until it enters a wait state.

In addition to waiForInterrupt state 466, a task may enter other wait states, including waitForCondition state 470, waitForTime state 472 and waitForSystem state 462, described above.

If a task is in waitForCondition state 470, that task has identified a specific event, called a wait condition, the occurrence of which moves that task into waitForSystem state 462. The wait condition is fulfilled when another task provides a notification or notify specific to that wait condition. When the other executing task provides the notify, the operating system adds the task which was in waitForCondition state 470 to the multitasking queue after the other task has reached a wait state in box 440 in FIG. 33.

Similarly, if a task is in waitForTime state 472, that task has identified a period of time after which it is moved into waitForSystem state 462. Time periods are measured by the timer on IOP 160, which provides an interrupt at the end of a measured time period. Then, as described above in relation to box 426 in FIG. 33, IOP 160 reads the time and restarts the timer, and, in box 428, adds the task waiting for the time to the multitasking queue. As indicated in FIG. 34, waitForCondition state 470 and waitForInterrupt state 466 may also end after a period of time if the corresponding notify or interrupt is not received within that time, in which case a value indicating an error condition is stored and the task is placed on the multitasking queue at the end of the timeout to run again.

FIG. 34 also shows a state 474 which represents any state in which a task may be. From any state 474, a task may be moved to a jammed state 476 by the execution of its Jam procedure, after which its Restart procedure must be performed to place it back on the multitasking queue. The Restart procedure is similar to initializing, but some variables need not be initialized because they are already available. Jamming is useful when it is desired to hold a task off the queue for a period of time, and each task's Jam procedure goes through the multitasking queue, removing each occurrence of that task in the queue and changing its state to jammed state 476.

Figure 35:
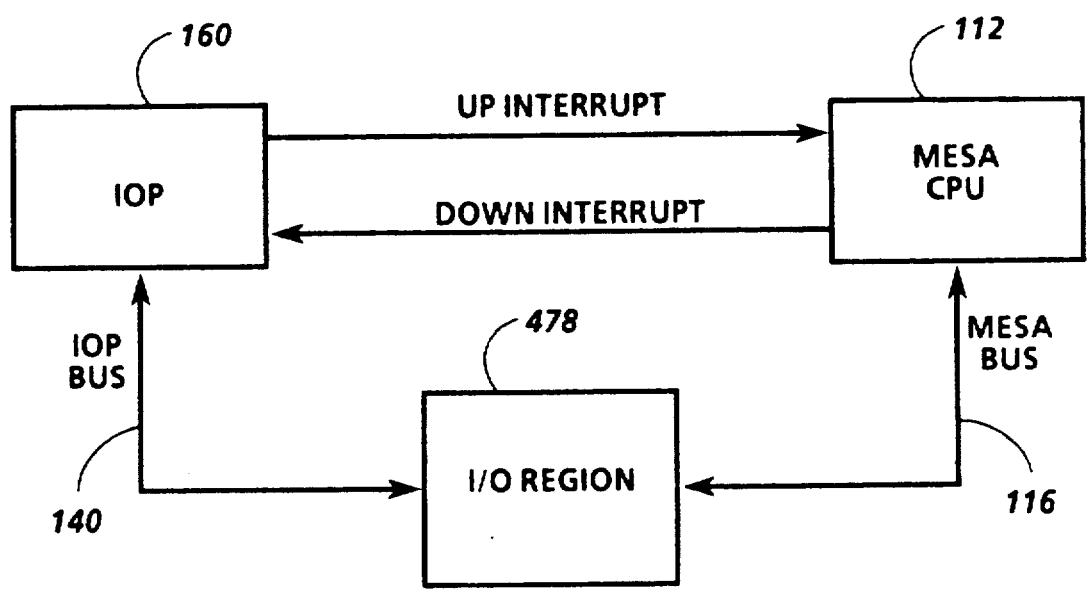
FIG. 35 is a block diagram showing communication between the IOP and Mesa CPU of FIG. 7.

FIG. 35 illustrates how downnotify, discussed above, occurs. As shown, Mesa CPU 112 has a direct down interrupt line for interrupting IOP 160. Prior to interrupting IOP 160, however, Mesa CPU 112 sets a bit in memory indicating which of a number of tasks is being downnotified. The downnotify bits or flags are in I/O region 478 in system memory 126, a region which Mesa CPU 112 and IOP 160 use to communicate to each other in relation to the I/O operations of PCE CPU 210. Therefore, IOP 160 may also use I/O region 478 to don an upnotify, in which case it sets an upnotify flag indicating which Mesa task is being upnotified and then signals Mesa CPU 112 on its direct up interruptline.

Figure 36:
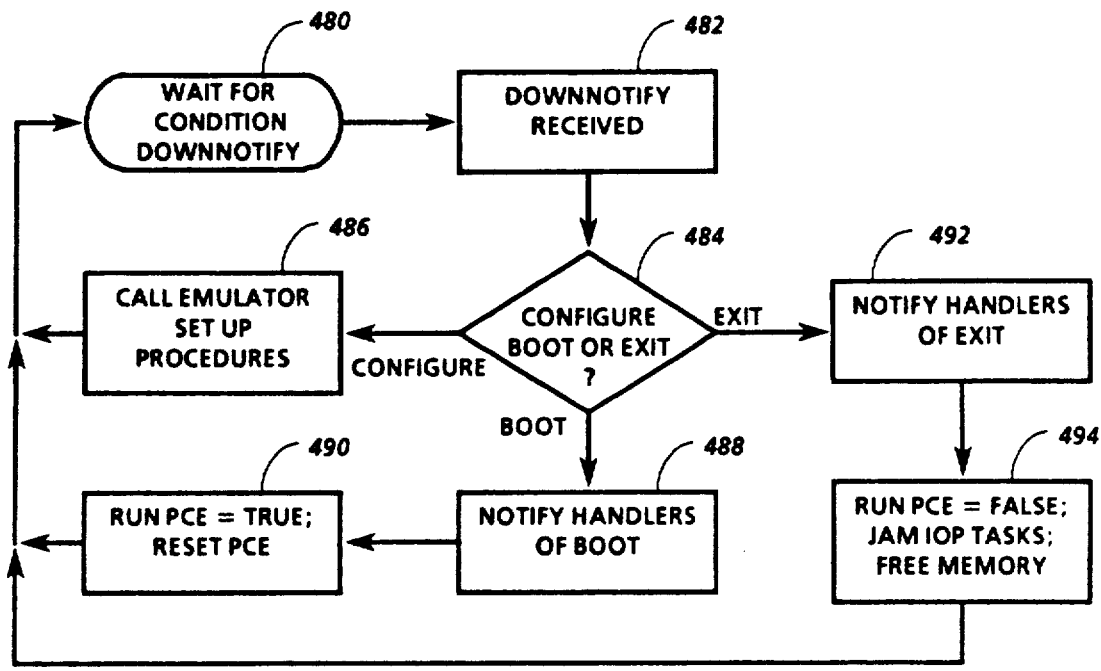
FIG. 36 is a flowchart showing the downnotify task of the Dispatcher of FIG. 32.

Many tasks may be managed by the operating system in the manner described above, including two tasks within Dispatcher 410. One of these tasks has a waitForCondition state 470 in which it waits for a downnotify from Mesa CPU 112, while the other has a waitForInterrupt state 466 in which it waits for an interrupt from PCE CPU 210, after which it enters Interrupt state 468.

b. Dispatcher downnotify task. FIG. 36 illustrates the Dispatcher downnotify task beginning in a waitForCondition state as in box 470 in FIG. 34, in which it awaits a downnotify from Mesa CPU 112. mesa CPU 112 issues a downnotify to Dipatcher 410 when it receives a command from the user relative to configuration of, booting of or exiting from emulation, commands which the user may provide in the manner discussed in coassigned application Ser. No. 856,525, now U.S. Pat. No. 899,136 incorporated herein by reference. When a downnotify for Dispatcher 410 is received in box 482, the Dispatcher downnotify task determines which Dispatcher procedure the downnotify calls for—configures, boot or exit—in box 484. Mesa CPU 112 previously determines which produce is appropriate based on user commands and stores a value in I/O region 478 indicating the appropriate procedure prior to providing the downnotify.

If the configure procedure is called for, the downnotify task calls the set up procedure for each of the emulator handlers, in box 486, there being one emulator handler for each of the I/O devices being emulated. The set up procedure of each emulator handler initializes any task which is part of that handler and otherwise prepares for emulation based on values stored in I/O region 478 indicating the configuration of the system to be emulated by PCE CPU 210. For example, if the user has selected a given number of floppy disk drives, the set up routine for the floppy emulator handler prepares to emulate that number of drives. The configure procedure also includes setting up the mapping of memory for PCE CPU 210, which is done by the memory emulator handler; it does so by programming the bank of register used in PCE memory mapping, as discussed above, so that only those registers corresponding to the number of blocks of memory required have valid addresses, the other registers having a default value indicating an invalid memory access. After setting up the device emulator handlers, the configure procedure reenters the waitForCondition state in box 480, from which it will again be roused by a Dispatcher downnotify from Mesa CPU 112.

If the boot procedure is called for, as determined in box 484, the downnotify task notifies the emulator handlers of the boot command from Mesa CPU 112, in box 488. Some emulator handlers which are waiting for this notify are put on the multitasking queue. Others simply store an indication that boot has occurred. The boot procedure also sets RunPCE in I/O region 478 to its true value, and resets PCE CPU 210 by applying a master reset signal, in box 490. Then the boot procedure reenters the waitForCondition state in box 480, awaiting a Dispatcher downnotify from Mesa CPU 112.

If the exit procedure is called for, as determined in box 484, the downnotify task notifies the emulator handlers of the exit command from Mesa CPU 112, in box 492. As with the boot command, the emulator handlers respond according to their own procedures. The exit procedure sets RunPCE false, starts the Jam procedure of all of the tasks relating to operation of PCE CPU 210, and frees the memory space allocated to PCE memory, in box 494. The exit procedure then reenters the waitForCondition state in box 480, awaiting a Dispatcher downnotify.

Figure 37:
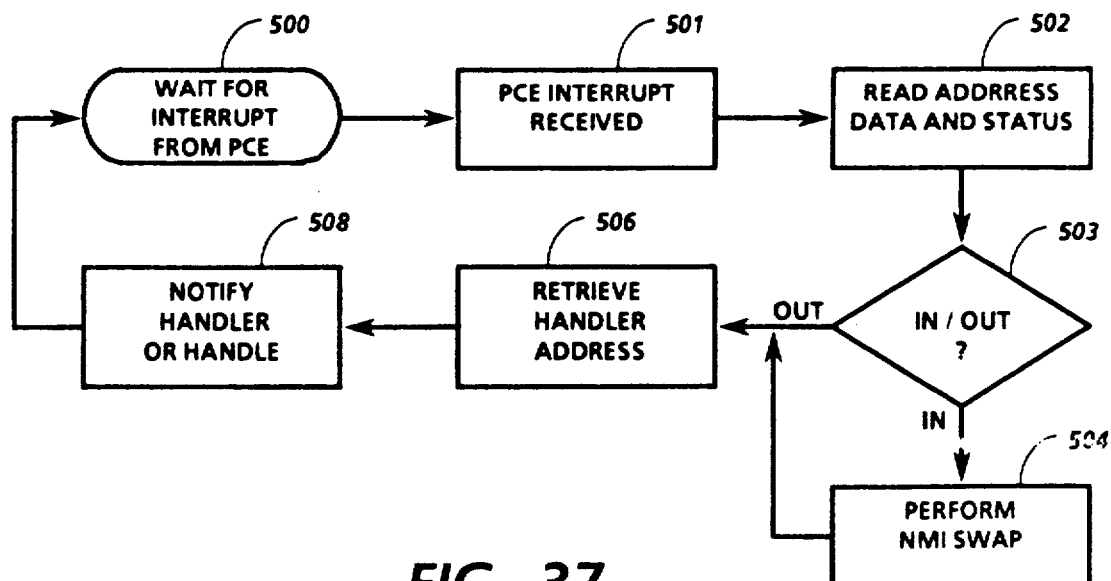
FIG. 37 is a flowchart showing the interrupt task of the Dispatcher of FIG. 32.

The Dispatcher downnotify task in FIG. 36 handles the starting and stopping of PCE CPU 210 with its configure, boot and exit procedures. During operation of PCE CPU 210, however, the Dispatcher interrupt task assists in the emulation of its I/O environment.

c. Dispatcher interrupt task. FIG. 37 illustrates the Dispatcher interrupt task which responds when PCE CPU 210 request an I/O operation. As discussed above, I/O trapper 250 sends an interrupt to master interrupt controller 166b. If no interrupt of higher priority is awaiting servicing, interrupt controller 166b sends an interrupt to IOP 160, and provides the address of the routine for handling that interrupt, in this case an address within the interrupt task of Dispatcher 410. At this point, the interrupt task will execute from tis Interrupt state 468 in FIG. 34, following the sequence shown in FIG. 37.

The interrupt task beings in its waitForInterrupt state, awaiting an interrupt from I/O trapper 250 indicating that PCE 210 has requested an I/O operation, in box 500. When an interrupt is received, in box 501, the interrupt task reads and stores the address, data and status bytes stored by I/O trapper 250, int eh manner discussed above in relation to FIG. 21, in box 502.

The status byte may be tested in box 503 to determine whether the requested I/O operation is an input (IN) or an output (OUT) operation. In an IN operation, the interrupt task may perform an NMI swap in box 504. This step may be necessary if the sequence of instructions being executed by PCE CPU 210 includes NMI operations other than an NMI correction routine discussed below as a technique for providing inputs to the PCE CPU 210 in response to an I/O IN request. The NMI swap, if used, changes an address in PCE memory at which PCE CPU 210 will find its routing for servicing the NMI interrupt. The address is changed from whatever it was prior to the NMI swap to the location of the NMI correction routine, so that when PCE CPU 210 again starts to execute, it will begin with the NMI correction routine. The previous address is stored, however, during the swap, and may then be restored to provide the other NMI operations from I/O trapper 250. The NMI correction routine is a part of Dispatcher 410 which causes PCE CPU 210 to retrieve a value stored in PCE memory by the emulator handler and to treat that value as if it were an input, as discussed in more detail in relation to FIG. 39 below.

In box 506, the interrupt task uses the address from I/O trapper 250 to access a jump table in which is stored the address of the emulator handler routine corresponding to each valid address from I/O trapper 250. If the address is below 400H, it may refer to one of the I/O devices found in an IBM PC which is present int he configuration of PCE CPU 210; if so, the interrupt routing calls the emulator handler for that device, but if not, the interrupt routine treats the I/O request as a no op. If the address is above FF00H, it would relate to the internal register map of the PCE CPU 210, a feature not present on the CPU of an IBM PC, so that an error is generated If the address is between 400h and FF00h, it is a non-supported value, and the I/O request is treated as a no op.

If the address of an emulator handler is retrieved from the jump table in box 506, the interrupt task proceeds to notify a task at that address within the handler or to handle the emulation itself by calling procedure from that handler, in box 508. The emulator handlers, both those which have independent tasks and those which are called within Dispatcher 410, are described below.

When the interrupt task completes the handling of the I/O request in box 508, it returns to its waitForInterrupt state in box 500. When another I/O request is received from PCE CPU 210, the interrupt routine will again follow the sequence shown in FIG. 37.

d. Additional Dispatcher features. As discussed above in relation to FIG. 32, Dispatcher 410 handles communication between the emulators and both PCE CPU 210 and Mesa CPU 112. Therefore, Dispatcher 410 includes a number of procedures other than its downnotify and interrupt tasks. Some of those procedures have been mentioned above, including the procedures which program the PCE mapping registers for the PCE CPU 210 memory space, both at boot into and exit from PC emulation. Other Dispatcher procedures assist in providing communication between the emulator handlers and the processors.

Communication between the emulator handlers and the Mesa CPU 112 is similar to communication between Dispatcher 410 itself and Mesa CPU 112. I/O region 478 provides the communication path, and is defined by the Dispatcher FCB interface which includes two procedures, one executed by IOP 160 and one by mesa CPU 112. Each of these procedures defines I/O region 478 from the point of view of the respective processor. In addition, the Dispatcher procedure PCEMesaClienNotify can be called by any of the emulator handlers to provide an upnotify to Mesa CP U 112 for that emulator using an appropriate device notify mask to set an upnotify bit in I/O region 478. Mesa CPU 112 executes the procedure PCEUpNotifyWatcher which waits for upnotifies and reads the bit set by the mask to determine which Mesa procedure is called, much as Dispatcher 410 does for downnotifies. As noted above, Mesa CPU 112 also contains a procedure for generating a downnotify to IOP 160 upon receiving a configure, boot or exit command relating to PCE CPU 210.

Mesa CPU 112 executes a number of other procedures which are part of Dispatcher 410. An Init procedure is executed upon boot of a machine on which the PC emulator is available, and Init sets up the pointer to the Dispatcher FCB interface and initializes several variable in I/O region 478. Then, when the user opens an icon on the display representing the PC emulator, Mesa CPU 112 executes Establish, which initializes the upnotification scheme by forking off the PCEUpNotifyWatcher procedure and setting controlling variables which indicate that the individual device tasks on IOP 160 and Mesa CPU 112 are not yet active and that upnotifies from IOP 160 should not be processed. At this point, a number of procedures will typically be used which relate to Dispatcher operations on IOP 160, discussed above.

When the user selects a configuration of the PC emulator, Mesa CPU 112 executes Configure, which allocates the needed memory for the PCE CPU 210 and configured devices, initializes a number of values in I/O region 478 serving as configuration switches, calls the configuration procedure for each of the devices in the selected configuration, and sends a downnotify to IOP 160 which is handled as discussed above.

When the user selects a boot of the PC emulator, Mesa CPU 112 executes BootPC, which loads the ROMBIOS (which on an IBM PC would be the Basic Input/Output System stored as firmware on ROM) into the PCE memory, calls the booting procedure for each of the configured devices, and sends a downnotify to IOP 160 which is handled as discussed above. At boot time, BootPC also calls ForkTasks, which forks off for each device a separate process which waits for an upnotify from IOP 160 directed to that device. ForkTasks also changes the controlling variables to indicate that the individual device tasks on Mesa CPU 112 are active and that upnotifies from IOP 160 can be processed.

If the user reconfigures or reboots the PC emulator, Mesa CPU 112 executes Exit, which aborts the processes waiting for upnotifications and the PCEUpNotifyWatcher and rests the controlling variables changed by ForkTasks. Exit also sends a downnotify to IOP 160 which is handled as discussed above. Exit is then followed by Configure or BootPC, discussed above, but memory is only reallocated to PC emulation if the size of memory required has been changed. Similarly, when the user ends PC emulation, Mesa CPU 112 executes Terminate which deallocates the memory allocated to PC emulation, sets the RunPCE flag to 0 and calls Exit.

If pause or resume is selected by the user or an emulated device during PC emulation, Mesa CPU 112 executes Freeze or Resume, respectively, each of which operates on the RunPCE flag in I/O region 478. RunPCE contains one bit for each emulated device, so that each device emulator handler can use a mask to set its bit in RunPCE to 1 or true. As noted above, Terminate sets all bits in RunPCE to 0 or false, preventing all devices from stopping and resuming operation of PCE CPU 210. Each device which can stop and resume operation, including the user interface, can call Freeze to perform an Exclusive-OR operation between RunPCE and that device's mask, setting that device's bit to 0. Each device can also call Resume to perform an OR operation between RunPCE and its mask to reset its bit to 1. If one device's bit is 0, no other device can resume emulation, so that the devices can set RunPCE to stop emulation independently. As discussed above in relation to box 448 in FIG. 33, IOP 160 checks RunPCE to ensure that all its bits are 1 during the AllowPCE procedure. If all bits are 1, PCE CPU 210 is allowed to run.

In addition to its communication functions set forth above, Dispatcher 410 performs a number of miscellaneous functions which are most conveniently included in it. Dispatcher 410 includes a device emulator handler which emulates the programmable interrupt controller (PIC), programmable interval timer (PIT), programmable peripheral interface (PPI) and three switches which are found in the IBM PC. The PIC, PIT and PPI are emulated using components on PCE option board 200. The dispatcher handler also provides IOP debugging support.

The device emulator handler emulates the PIC when an interrupt is received which indicates an I/O request to the PIC, as determined in box 506 in FIG. 37. The device emulator handler is notified in box 508, and checks whether the status indicates an IN or OUT operation. If IN, the device emulator handler reads the outputs of PIC 330, discussed above in relation to FIGS. 25A and 25B and calls the routine LoadMagic, discussed in more detail below, to provide those outputs to PCE CPU 210. If OUT, the device emulator handler provides the outputs from PCE CPU 210 to PIC 330 and then checks the outputs of PIC 330 for the occurrence of an end of interrupt (EOI), upon which it enables PIT 312, discussed above in relation to FIG. 23B. Note that PIC 330 can directly interrupt PCE CPU 210 according to the conventional 80186-8259 interrupt handshake.

The device emulator handler similarly emulates the PIT when an interrupt is received indicating an I/O request to the PIT, as determined in box 506. The device emulator handler is notified, and checks whether the status indicates an IN or OUT operation. If IN, the device emulator handler reads the resulting outputs of PIT 312, FIG. 23B, using LoadMagic to provide them to PCE CPU 210. If OUT, the device emulator handler provides the outputs from PCE CPU 210 to PIT 312.

On an IBM PC, the PPI has three parallel ports 60$h$, 61$h$ and 62$h$, the port number being the address from the CPU which activates that port. Port 60$h$ relates to keyboard input, which is emulated by the keyboard emulator handler. Port 62$h$ relates to inputs which can be ignored for emulation purposes. Port 61$h$ has four bits which can be ignored and two bits relating to keyboard output, again involving the keyboard emulator handler. Therefore, only two bits of port 61$h$ which relate to speaker output remain to be emulated by hardware on the PCE option board 200. When an interrupt is received indicating an I/O request to the PPI, the device emulator handler is notified, and checks whether the status indicates an IN or OUT operation. If IN, the device emulator handler calls LoadMagic to provide inputs mimicking the PPI to PCE CPU 210, unless the IN request is directed to the keyboard input port 60$h$, in which case the device emulator handler will call LoadMagic to provide inputs from the keyboard emulator handler. If OUT, the device emulator handler will provide the outputs to the keyboard emulator handler if the OUT request relates to keyboard overflows, keyboard clears, or keyboard resets, storing the output data in I/O region 478. But if the OUT request relates to speaker control, the device emulator handler will provide the outputs to the speaker hardware as discussed above in relation to FIG. 23B.

Although Dispatcher 410 handles some of the emulators, as described above, those are relatively simple examples in comparison to printer emulator 412, floppy drive emulator 414, fixed disk emulator 416 and keyboard emulator 418, shown in FIG. 32, as well as DMA emulator and display emulator discussed below. Therefore, we turn to a discussion in more detail of emulation of these I/O devices.

2. Emulation—general features. The brief descriptions above of how the dispatcher handler emulates some I/O devices suggests that the I/O device emulator handlers share certain general features. Those general features correspond to the functions performed in box 84 in FIG. 5, described above.

Figure 38:
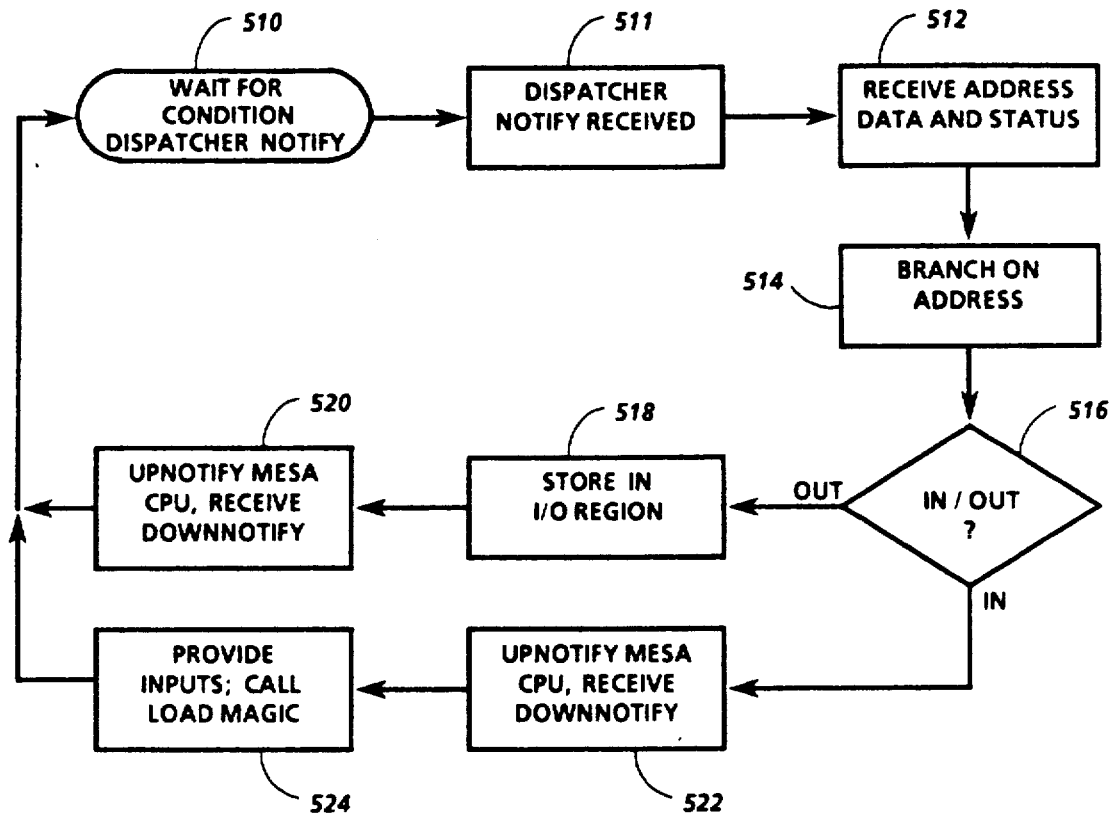
FIG. 38 is a flowchart showing steps which typify the I/O device emulators of FIG. 32.

FIG. 38 illustrates general features which typify the remaining device emulator handlers according to the invention. The emulation of memory and part of the display emulator, however, are somewhat different, as discussed above in relation to FIGS. 4 and 6, respectively. Those emulations do not, strictly speaking, emulate I/O devices, but rather emulate main memory itself and features of the IBM PC display which result from the reading of the main memory's display buffer directly by the display controller.

The features shown in FIG. 38 are ordinarily implemented as part of a task which may be on the multitasking queue of IOP 160. This task, generally referred to as a handler task or a handler, will begin, in box 510 as a waitForCondition state, awaiting a notify from Dispatcher 410. Upon receiving a notify, in box 511, the handler task is placed on the multitasking queue and executes as shown in the remainder of FIG. 38.

The handler task begins by receiving the address, data and status, if relevant, from Dispatcher 410, in box 512. These values will typically have been stored in I/O region 478 by Dispatcher 410. For some handler tasks, the address may take any of several values, depending on the operation requested by PCE CPU 210. Therefore, those handler tasks will branch to an appropriate subroutine based on the address, in box 514. The status is then typically tested in box 516 to determine whether an IN or an OUT operation is requested.

If an OUT operation is requested, the task handler will typically store any appropriate information derived from that provided by PCE CPU 210 in a corresponding location in I/O region 478, in box 518. If servicing by an actual I/O device is required or if the OUT operation requested has any other implications for the operation of host system 16, an upnotify may be issued to Mesa CPU 112 and the handler task may wait for a downnotify from Mesa CPU 112, in box 520. Upon completing any processing pursuant to the downnotify, the handler task reenters its waitForCondition state in box 510.

If an IN operation is requested, the task handler may similarly upnotify Mesa CPU 112, in box 522, commonly to obtain information to be input to PCE CPU 210. Then, the input information is provided and the procedure LoadMagic is called to store that information in a special data structure in PCE memory which serves as a communication link between IOP 160 and PCE CPU 210. That data structure, called MagicDataStructure, includes a flag indicating whether it contains a word or a byte; the word or byte itself, MagicWord or MagicByte; and a value called OldNMI-Vector which may serve as the location of the NMI servicing routine which PCE CPU 210 would have executed if it had received an NMI other than as the result of an IN I/O operation request, as discussed above in relation to box 504 in FIG. 37. LoadMagic loads the MagicWorld or MagicByte into MagicDataStructure, if necessary moves the value which the PCE CPU 210 would have accessed as the NMI vector into OldNMIVector, and, again if necessary, places the location of an NMI correction routine into the NMI vector location, in box 524. Then the handler task reenters its waitForCondition state in box 510.

Although not all the handler tasks include all the steps in FIG. 38, most follow a similar set of steps in responding to an I/O request. Even the more complex handler tasks, despite their complexity, include some of these general features.

Figure 39:
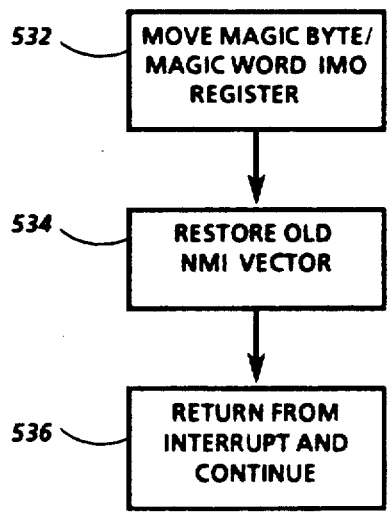
FIG. 39 is a flowchart showing the NMI correction routine by which the PCE CPU of FIG. 11 receives information from one of the device emulators.

FIG. 39 shows the NMI correction routine, discussed above in relation to Dispatcher 410, which PCE CPU 210 executes in order to receive the information in MagicDataStructure. This routine will be executed by PCE CPU 210 when it is permitted to run at a time when its NMI line has received a high signal. The NMI correction routine begins in box 532 by moving the MagicByte or MagicWord into the appropriate register (AX or AL) in PCE CPU 210 as if it had been received as input from an I/O device. If necessary, the value stored as OldNMIVector may then be returned so that PCE CPU 210 would retrieve it as the NMI vector, in box 534. PCE CPU 210 then returns from serving the NMI interrupt and continues to execute a sequence of instructions, in box 536.

The sequence of FIG. 39 provides a solution to the problem of how to provide input information when PCE CPU 210 provides an I/O IN request. One technique would be to interrupt the currently executing instruction at the time it provides the I/O IN request, providing the appropriate input on the data bus before permitting it to continue. Another technique would be to use some sort of memory device to store the appropriate input data obtained previously by using IOP 160 to work ahead, so that when PCE CPU 210 provided an I/O IN request, the input data would be provided immediately without stopping PCE CPU 210. The technique of which the routine of FIG. 39 is a part, however, permits PCE CPU 210 to execute the instruction to completion, reading erroneous data from its data bus into its AX or AL register. Then, at the completion of the instruction, PCE CPU 210 is stopped and while it is inactive, the correct data is loaded by LoadMagic into MagicDataStructure. Then, when PCE CPU resumes, its first act is to load the data in MagicDataStructure into its AX or AL register, correcting the erroneous data stored there, after which it continues the sequence of instructions it had been executing.

Each of the emulator handlers is tailored to the corresponding emulated I/O device. Therefore, we will begin with a fairly representative emulator, the printer emulator, and proceed to describe each of the other emulators.

3. Printer emulator. In general, each I/O device in the IBM PC has a controller or adapter through which the CPU communicates with that device. The printer is representative in that it has a controller, referred to as a parallel printer adapter (PPA), with which the CPU can perform three kinds of operations. On the IBM PC, the CPU controls a system bus to which a PPA card may be attached. The CPU initiates each of the three operations by providing the corresponding port address value on its address bus to select a port on the PPA card. The CPU may receive a byte from the PPA status port and may send or receive a byte to the PPA data and control ports.

The three kinds of operations, each of which corresponds to one of the PPA ports, are read status ("status"), in which the CPU reads a control line on which the PPA status port indicates that the printer is ready or not ready (not ready if the printer buffer is full, the printer is out of paper, the printer is turned off, etc.); read or write character ("char"), in which the CPU reads or writes a character through the PPA data port from or to a single character buffer in the PPA; and send control signal ("strobe"), in which the CPU provides a control signal telling the PPA to strobe the printer, causing it to retrieve the contents of the PPA single character buffer and store those contents in the printer buffer for subsequent printing. As a practical matter, the three operations usually occur together, with the strobe following the status and char operations. During initialization, these operations may be used to test whether a PPA card is installed on the system bus, by writing a character byte to the PPA buffer and reading that value. During execution of a program, characters will be sent to the printer via the PPA while executing the print command, the print screen command, or the control-P command.

The general technique of I/O device emulation according to the invention is to emulate the controller or adapter through which the CPU of the IBM PC communicates with the device being emulated. Therefore, the PPA is emulated in order to emulate the printer. To emulate the single character buffer in the PPA, a single character buffer similar to the PPA buffer is provided in I/O region 478 of main memory 126 at a location represented by the variable PrinterDataByte.

As noted above, the printer emulator handler on the IOP 160 emulates the PPA, but, unlike the PPA, the emulator handler does not communicate directly with a printer. The emulator handler instead communicates the character to be printed to a procedure which runs on Mesa CPU 112, and that procedure in turn eventually may send the character to a printer. If the emulator handler waited for that procedure to send each character to a printer, its performance would be slowed down. Therefore a multi-character buffer is used to speed up the printer emulator handler, and this multi-character buffer is defined in I/O region 478, accessible to both IOP 160 and Mesa CPU 112. The multi-character printer buffer is treated as a ring buffer, so that when a pointer reaches the last location in the buffer, it is changed to the first location in the buffer. For accessing the printer buffer, the I/O region contains an In pointer to the location where a character is added, incremented by IOP 160, and an Out pointer to the location where a character is removed, incremented by Mesa CPU 112.

The I/O region also contains a variable Count accessible to both IOP 160 and Mesa CPU 112. Count indicates the number of characters in the multi-character printer buffer. If Count is equal to the size of the buffer, the buffer is full. As discussed below, IOP 160 increments Count when it increments the In pointer, and Mesa CPU 112 decrements Count when it increments the Out pointer. A locking mechanism prevents both processors from attempting to change the value of Count at the same instant in time, which could lead to erroneous results. This locking mechanism in effect provides a lock which, when obtained by one of the processors, permits it to increment or decrement Count, and prevents the other processor from doing so. Then, when the first processor releases the lock, the other processor can obtain it and increment or decrement Count.

When the multi-character printer buffer is full, a not ready signal will be provided to PCE CPU 210 in response to the status read operation, but otherwise a ready signal will be provided. During the char operation, a character byte will be read from or written to PrinterDateByte, corresponding to the PPA single character buffer. During the strobe operation, PrinterDataByte will be written into the next available position in the multi-character printer buffer and the Mesa CPU 112 will be upnotified to begin emptying the printer buffer. IOP 160 provides the upnotify signal only at the request of Mesa CPU 112. Once Mesa CPU 112 has received an upnotify signal, it will not request another until it has emptied the printer buffer or stopped emptying the buffer for some reason.

A number of other data items are stored in I/O region 478 to assist in emulation, including the flags PCESetCntrlPortSignal, indicating PCE CPU 210 is providing a high value in the strobe operation, and NeedUNFlag, meaning Mesa CPU 112 is waiting for an upnotify signal from IOP 160.

The printer emulator handler task will generally follow the steps in FIG. 38 up through box 514. In branching on the address in box 514, the task will test the address to determine whether it requests the status, char or strobe operation. The task will then branch to a routine to service the requested operation, and the three operation servicing routines are shown in FIGS. 40–42.

Figure 40:
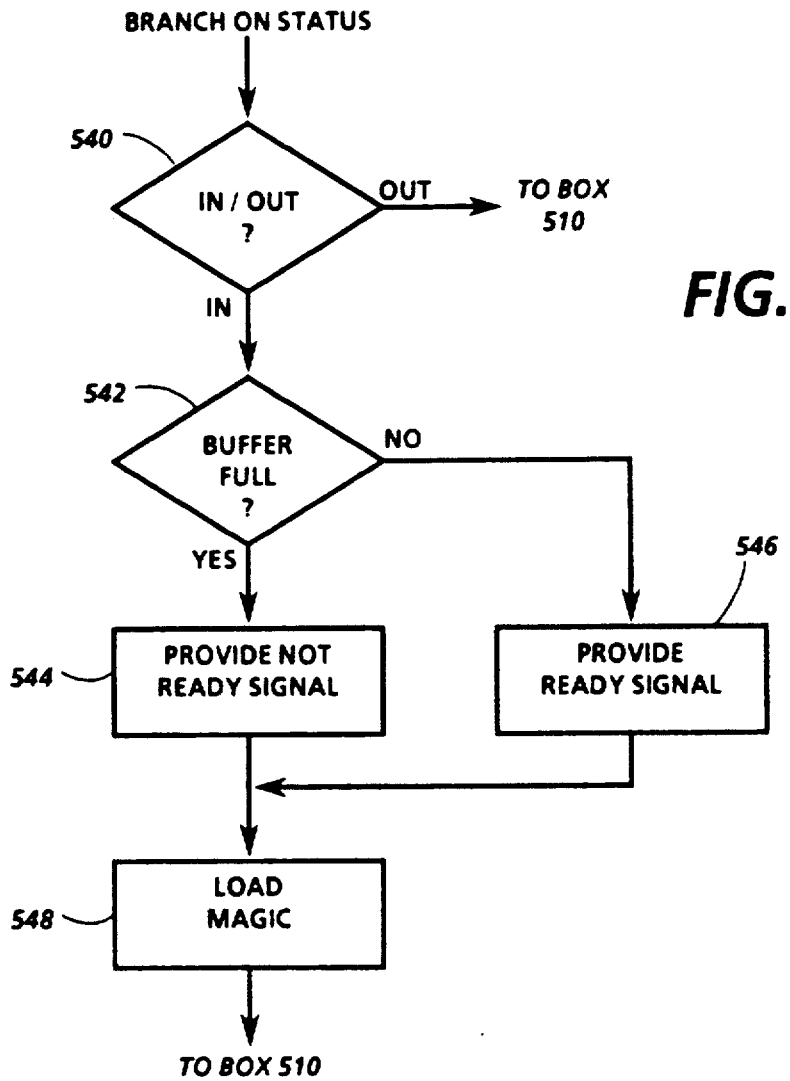
FIG. 40 is a flowchart of the status operation of the IOP task within the printer emulator of FIG. 32.

FIG. 40 shows the status operation. If status is requested, the routine in FIG. 40 first tests the control bit from PCE CPU 210 which indicates whether an IN or OUT operation is requested, in box 540. If OUT, a status operation is inappropriate, and this is treated as a no op, so that the system routine returns to box 510 in FIG. 38, awaiting a notify PCEPrinterIO from Dispatcher 410. If IN, the routine tests in box 542 whether the printer buffer in I/O region 478 is full, by comparing Count with the size of the buffer. If the two are equal, the buffer is full, and the routine provides a not ready input signal, in box 544, but if not full, a ready input signal is provided, in box 546. LoadMagic is then called in box 548 to load the input signal provided into MagicDataStructure in PCE memory, after which the routine returns to box 510, awaiting PCEPrinterIO.

Figure 41:
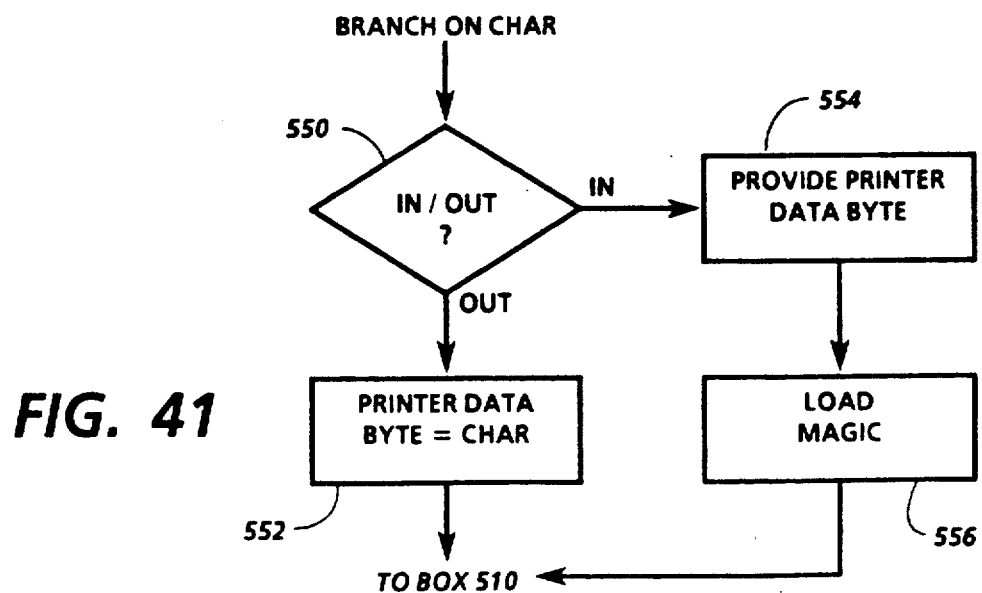
FIG. 41 is a flowchart of the char operation of the printer emulator task.

If char is requested, the routine in FIG. 41 similarly tests IN or OUT in box 550, neither of which will be treated as a no op. If OUT, the routine sets PrinterDataByte equal to the character byte provided by PCE PCPU 210 on its data bus, in box 552. Then the routine returns to box 510, awaiting PCEPrinterIO. If IN, the routine provides PrinterDataByte as an input signal, in box 554. LoadMagic is then called in box 556 to load the input signal into the MagicDataStructure in PCE memory, after which the routine returns to box 510, awaiting PCEPRinterIO.

Figure 42:
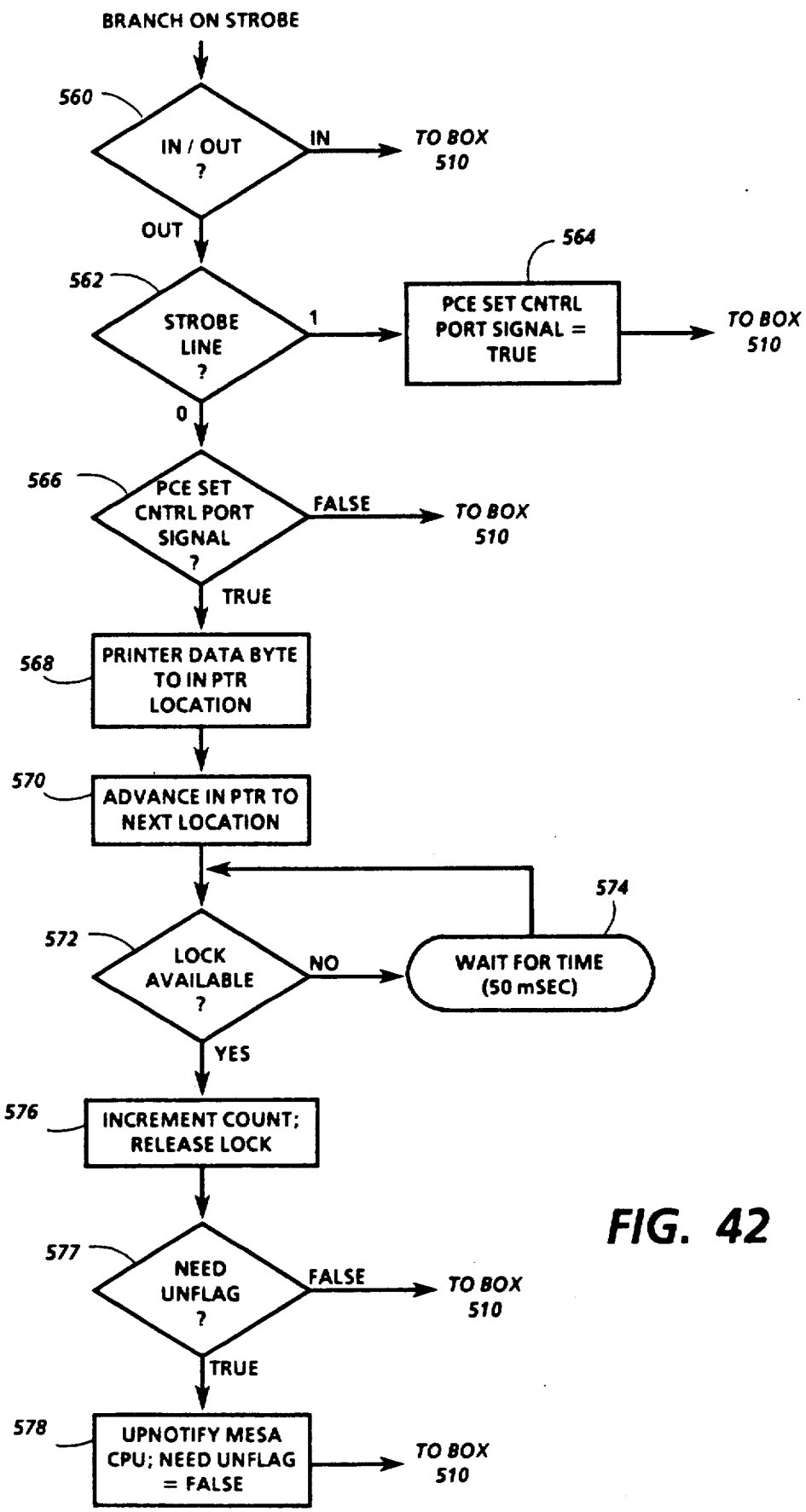
FIG. 42 is a flowchart of the strobe operation of the printer emulator task.

If strobe is requested, the routine in FIG. 42 similarly tests IN or OUT in box 560, but IN would be inappropriate, so that it results in a no op, returning to box 510 to await PCEPrinterIO. If OUT, the routine first tests the value of the status bit received from PCE CPU 210 corresponding to the strobe control line, in box 562. In an IBM PC, the strobe operation is requested twice, with the strobe control line high or 1 during the first request and low or 0 during the second. Therefore, the transition down from 1 to 0 causes the PPA to send the strobe to the printer, after which the printer retrieves the contents of the PPA buffer. Similarly, if the test in box 562 detects that the strobe line is at 1, the transition has not yet occurred, so that the routine sets the flag PCESetCntrlSignal to true in box 564 and returns to box 510, awaiting PCEPrinterIO. But if the test in box 562 detects 0 on the strobe line, the transition may have occurred. The test in box 566 determines whether PCESetCntrlSignal has previously been set true, which would confirm that a transition occurred. If not, the routine returns to box 510, awaiting PCEPrinterIO. If PCESetCntrlSignal is true, however, the routine proceeds to emulate the strobing of the printer.

In box 568, PrinterDayaByte is stored at the location In pointer in the multi-character printer buffer, and In pointer is advanced to the next location in the buffer in box 570, in readiness for the loading of the next character into the buffer. If In pointer is at the last location in the buffer, it is advanced by setting it equal to the first location, but otherwise it is advanced by incrementing it.

At this point a character has been added to the printer buffer, so that it is appropriate to increment Count, the variable which keeps track of the number of characters in the buffer. Before doing so, the test in box 572 determines whether the lock is available. If not, the routine waits for time for an arbitrary period such as 50 msec, in box 574, before repeating the test in box 572. When the lock becomes available, meaning it has been released by Mesa CPU 112, the strobe routine proceeds to increment Count and release the lock in box 576.

It may be necessary to notify Mesa CPU 112 that it should handle the printer buffer contents. The test in box 577 determines whether the flag NeedUNFlag is true, indicating an upnotify is necessary because Mesa CPU 112 has no current request to handle the printer buffer contents. If so, the upnotify is provided in box 578 and NeedUNFlag is set to false. The routine then returns to box 510, awaiting PCEPrinterIO.

Figure 43:
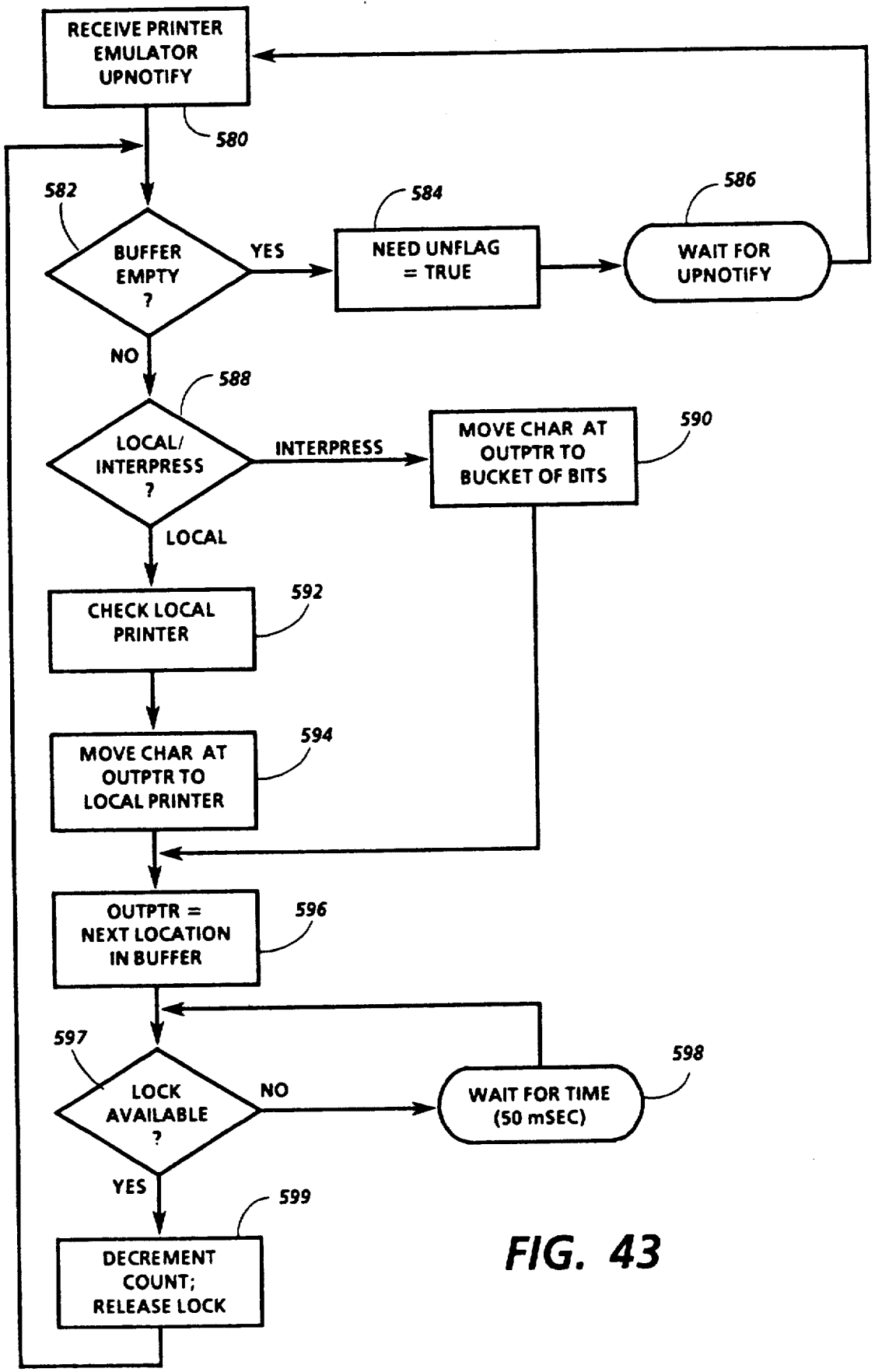
FIG. 43 is a flowchart of steps taken by the Mesa CPU as part of the printer emulator of FIG. 32.

The effect of the upnotify in box 578 is to prompt Mesa CPU 112 to perform the routine shown in FIG. 43. At the booting of the PCE CPU 210, a Mesa printer emulator procedure NotifyProcedure which waits for this upnotify is forked off, in effect waiting for a notify that NeedUNFlag in I/O region 478 has been set true. NeedUNFlag is checked in box 577 in FIG. 42, as described above, and when true, an upnotify is sent in box 578, which is received by PCEUpNotifyWatcher in the Mesa Dispatcher. PCEUpNotifyWatcher calls a printer emulator procedure NotifyPrinter, which, in turn, calls NotifyProcedure, in box 580 in FIG. 43. NotifyProcedure begins to transfer the character data out of the multi-character printer buffer in I/O region 478, as will be seen below.

NotifyProcedure begins with a test in box 582 to determine whether the printer buffer is empty, which will be true if Count is equal to zero. If the buffer is empty, it is not necessary to proceed further. Since NotifyProcedure will need an upnotify to begin operating again, NeedUNFlag in I/O region 478 is set to true in box 584 before NotifyProcedure begins to wait again for an upnotify in box 586. Upon receiving the next upnotify, the procedure will begin again in box 580.

If, on the other hand, there is at least one character in the printer buffer, NotifyProcedure next tests whether the current printer selection is for a local printer or for Interpress printing, in box 588. If Interpress is currently selected, NotifyProcedure calls PCEPrinterProc in box 590 which moves the character at Out pointer to a file called BucketOfBits, which is simply a sequence of characters. The process of creating an Interpress master from BucketOfBits is described in coassigned application Ser. No. 856,525, now U.S. Pat. No. 4,899,136, incorporated herein by reference. If local, NotifyProcedure first confirms the status of the local printer in box 592 using a procedure GetLocalPrinterStatus, which will return a ready signal if the local printer is ready to receive a character. If GetLocalPrinterStatus returns a not ready signal, it is called again, up to ten times, at which time NotifyProcedure waits a second before calling it again for ten times. When the local printer is finally ready, NotifyProcedure calls PCEPrinterProc which in this case moves the character at Out pointer in the buffer to the local printer. This will typically be done by moving the character to a local printer buffer in I/O region 478 in box 594 and notifying a Mesa procedure for local printing, which in turn downnotifies IOP 160 to call for the actual I/O transfer to the local printer. PCEPrinterProc may preliminarily check the type of the local printer to determine whether to send a block of characters on a parallel port or one character at a time on a serial port. When PCEPrinterProc has completed the appropriate action, NotifyProcedure advances Out pointer to the next location in the printer buffer in box 596.

Since a character has been removed from the multi-character printer buffer, it is appropriate to decrement Count. The test in box 597 determines whether the lock is available. If not, the routine waits for an arbitrary time period, such as 50 msec, in box 598, before repeating the test in box 597. When the lock becomes available, due to being released by IOP 160, the routine decrements Count and releases the lock in box 599. Then it repeats the test in box 582 to determine whether further characters remain to be removed from the buffer.

Printer emulation as described above illustrates the technique of emulation according to the invention. The emulation of other devices, as described below, follows a similar pattern.

4. DMA emulator. The direct memory access (DMA) emulator handler emulates the DMA controller in an IBM PC. The DMA controller in an IBM PC works with the floppy and hard disk controllers during transfer of data between memory and a floppy disk or the hard disk. Four channels in the DMA controller may each be dedicated for a specific use, and the DMA controller receives signals from the CPU specifying the channel, specifying the address and byte count of a data transfer to be performed on that channel and specifying the mode in which the DMA controller performs the transfer. Emulation of the DMA controller is necessary in order to obtain some of these signals from PCE CPU 210, but since the DMA controller does not ordinarily provide any inputs to the CPU, only the output I/O requests are emulated.

Because of the simplicity of DMA emulation, it is handled somewhat differently than the printer emulator discussed above and most of the other emulators discussed below. Rather than providing an emulator handler task, the DMA emulator handler provides procedures which can be called by Dispatcher 410 when it determines that the address from PCE CPU 210 requests a DMA operation. These procedures sort data sent with OUT requests in one of three arrays in I/O region 478. The array pceDMAData stores data specifying the address and byte count of a data transfer; the array pceDMAControl stores DMA mode control data; and the array pceDMAPages stores the four high bits of a 20 bit address. The data stored in these arrays can then be accessed by other emulators. The pceDMAToggle, a flag in I/O region 478, may also be set by these procedures.

Since the DMA emulator handler procedures are called directly by Dispatcher 410, they are executed within its interrupt task, in box 508 of FIG. 37, discussed above. If the address from PCE CPU 210 requests an I/O operation transferring data specifying an address or byte count or the mode of a transfer, Dispatcher 410 calls a procedure DMAController, illustrated in FIG. 44. If the address requests an I/O operation specifying the four high address bits, Dispatcher 410 calls a procedure DMAPages, illustrated in FIG. 45.

Figure 44:
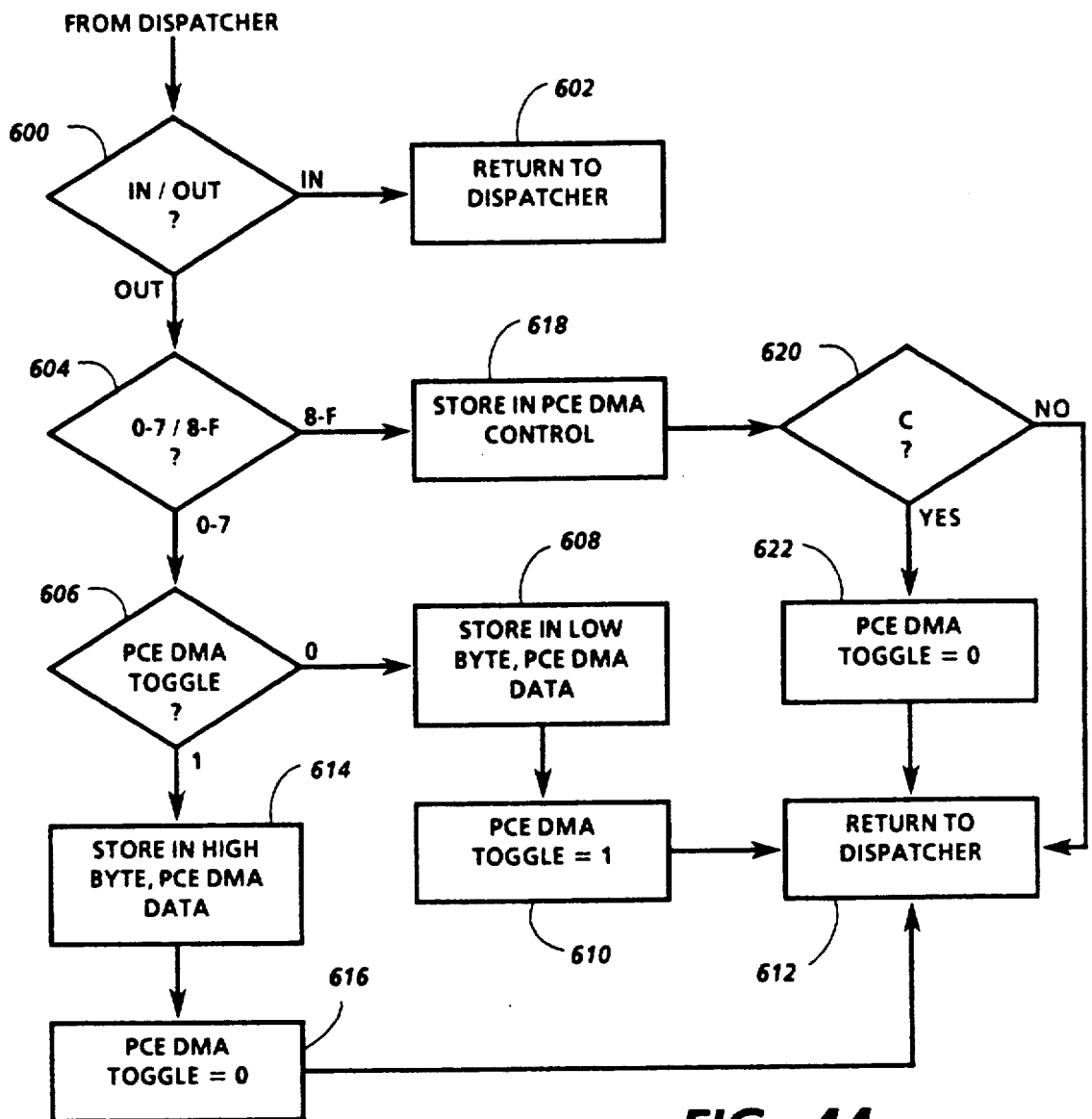
FIG. 44 is a flowchart of a procedure DMAController within the DMA emulator.

DMAController, as shown in FIG. 44, begins with a test of the status bits from PCE CPU 210 to determine whether an IN or OUT operation is requested, in box 600. If IN, control is returned to Dispatcher 410 in box 602, so that the request is treated as a no op, because the DMA emulator handler does not provide any input signals to PCE CPU 210. The DMA controller chip used in an IBM PC could provide such signals and such signals could be emulated, but the software written for the IBM PC does not, as a practical matter, read such signals from the DMA controller, so that PCE CPU 210 can execute sequences of instructions written for the IBM PC without receiving any such input signals.

DMAController continues, if an OUT request was received, by testing the address in box 604 to determine whether it is in the range 00–07h or in the range 08–0Fh. If 00–07h, the value to be stored will be received with two requests, each providing one byte, the low byte being provided first. Therefore, the test in box 606 determines whether the byte being received is the high byte by testing the flag pceDMAToggle which will have been set to 1 if a low byte has been previously received. If 1 pceDMAToggle is 0, the byte received is stored in the array pceDMAData as the low byte at a location corresponding to the address received, in box 608. Then, pceDMAToggle is set to 1 in box 610, and the control is returned to Dispatcher 410 in box 612. If pceDMAToggle is 1, the low byte has already been received, so that the byte received is stored in the array of pceDMAData as the high byte adjacent to the previously stored low byte, in box 614. Then pceDMAToggle is set to 0 in box 616 in readiness for the next low byte before control is returned to Dispatcher 410 in box 612.

If the test in box 604 determines that the address is in the range 08–0Fh, the received byte is stored in the array pceDMAControl at a location corresponding to the address received, in box 618. Then, in box 620, the address is tested to determine whether it is 0Ch, indicating that pceDMAToggle should be reset. If so, pceDMAToggle is set to 0 in box 622 before returning control to Dispatcher 410 in box 612.

Figure 45:
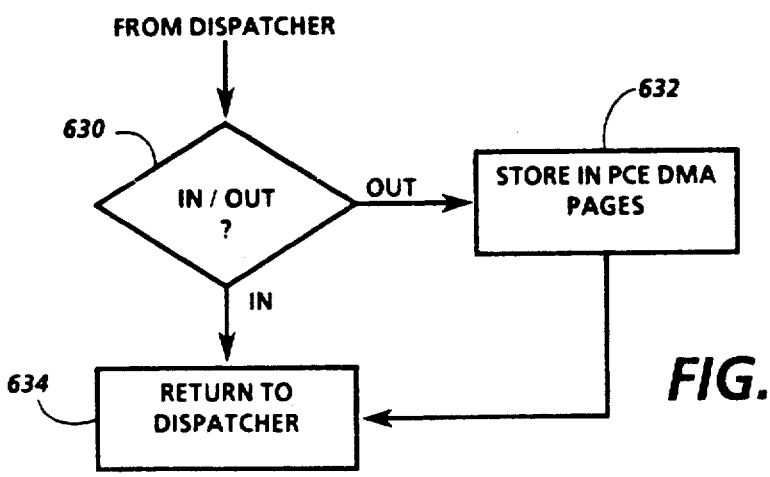
FIG. 45 is a flowchart of a procedure DMAPages within the DMA emulator.

DMAPages, shown in FIG. 45, tests the status received from PCE CPU 210 to determine whether an IN or OUT operation is requested, in box 630. If OUT, the data received is stored in the array pceDMAPages at a location corresponding to the address received, in box 632, before returning control to Dispatcher 410 in box 634.

As noted above, the DMA emulator handler does not provide any input signals to PCE CPU 210, because IBM PC software does not make use of that capability of the DMA controller chip, so that there is no need to attempt to emulate it. In addition, the DMA controller chip operates in several available transfer modes. The choice of modes is not relevant for the emulator, since IOP 160 is multitasked, making real time operation impossible. Therefore, the DMA emulator handler also dose not provide more than one transfer mode, and the bits indicating transfer mode, although stored, are not used.

Although the DMA emulator handler is simple, it is necessary for emulation of the floppy disk drive, which is somewhat more complicated.

5. Floppy disk drive emulator, In addition to emulating the operation of the floppy disk controller (FDC) in the IBM PC so that the PCE CPU 210 can continue to execute instructions, the floppy disk emulator also helps to emulate the user interface of an IBM PC by enabling the user to treat the floppy disk drive of host system 16 as if it were the floppy disk drive of an IBM PC. The floppy disk emulator also enables the user to transfer data between host system 16 and PCE CPU 210 using a novel data structure referred to as a virtual floppy. These latter features are discussed in additional detail in coassigned application Ser. No. 856,525, now U.S. Pat. No. 4,899,136, incorporated herein by reference in its entirety.

The CPU of an IBM PC operates its FDC by sending a sequence of IN and OUT I/O requests to the FDC which specify a floppy operation; waiting while the FDC performs the specified floppy operation; and receiving the results of the floppy operation using another sequence of IN and OUT I/O requests. The CPU may send I/O requests to the FDC using three addresses, 3F2h, 3F4h and 3F5h. 3F2h is used for an OUT request to load the digital output register (DOR), a hardware register in the IBM PC controlling the switching of the floppy drive motors on and certain other operations. 3F4h is used for an IN request for the contents of the FDC main status register. 3F5h is used for an IN or OUT request to receive from or send to the data register of the FDC. Typically, the CPU will send a 3F2h OUT request to start the appropriate motor, followed by a 3F4h IN request to check FDC status and a 3F5h OUT request to send a command, Then the necessary parameters for the performance of the command are provided by alternately checking the status and sending a parameter, until all the parameters necessary are sent. After the command is performed, the CPU will similarly alternate status checks with the reading of a result until all results are received.

In emulating the FDC, the floppy emulator handler receives a command and the parameters necessary to perform it from PCE CPU 210 and stores them in a block called an IOCB in I/O region 478. When the IOCB is complete, the floppy emulator handler tests whether the floppy disk to be accessed is a physical floppy in the physical floppy disk drive of host system 16 or is a virtual floppy in the hard disk of host system 16. If a physical floppy is to be accessed, the IOCB is enqueued for processing by a floppy handler task on IOP 160. If a virtual floppy is to accessed, an upnotify is sent to Mesa CPU 112 for processing of the IOCB, In either case, upon completion, the floppy emulator handler receives a notify, and provides any results it receives to PCE CPU 210.

Figure 46:
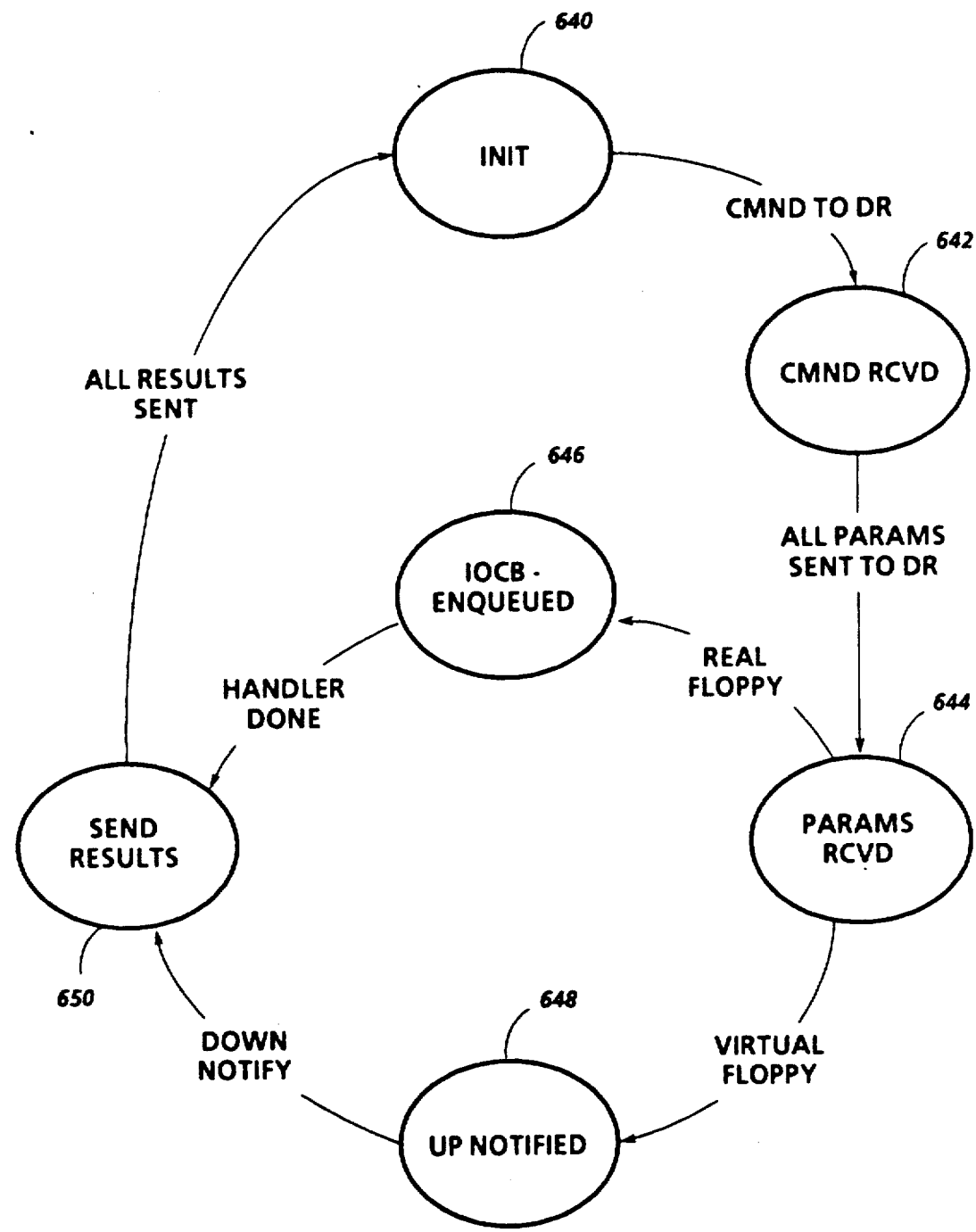
FIG. 46 is a state and transition diagram for the floppy disk emulator of FIG. 32.
Figure 47:
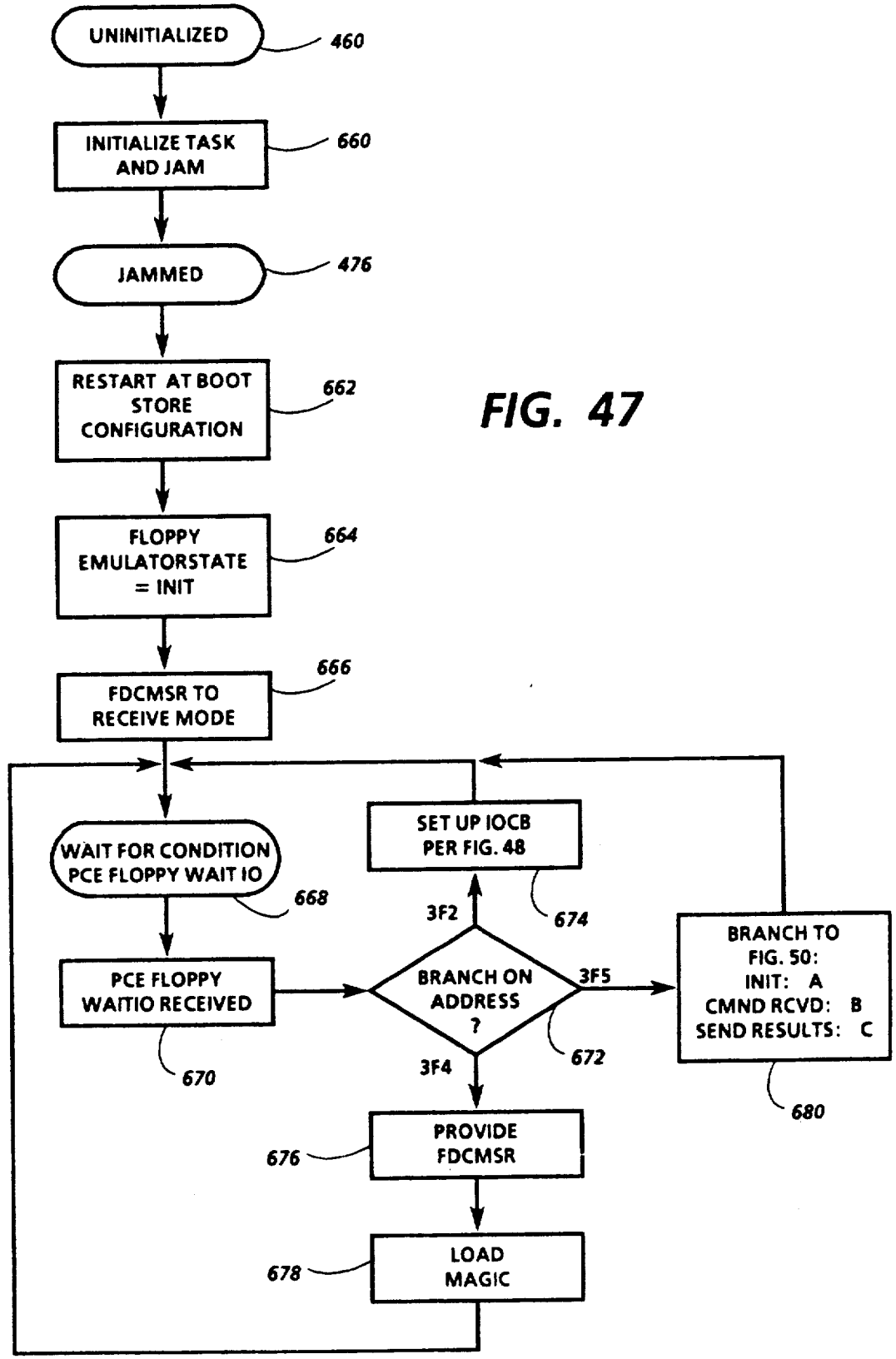
FIG. 47 is a flowchart of the floppy emulator IOP task.

In performing the operations described above, the floppy emulator handler goes through a number of states corresponding to states of the FDC. The current state of the emulator handler is indicated by a value FloppyEmulatorState stored in I/O region 478 and the emulator handler determines how to respond to a notify from Dispatcher 410 based on the current FloppyEmulatorState. FIG. 46 is a state diagram showing the values of FloppyEmulatorState and the transitions between them. FIGS. 47–50 are flow charts showing the steps which correspond to the transitions in more detail and relating the states in FIG. 46 to the states of the emulator handler task as shown in FIG. 34.

FloppyEmulatorState begins with the value Init, in box 640 in FIG. 46. It reaches Init, however, only after a series of steps in FIG. 47, beginning with the floppy emulator handler task's unInitialized state 460, discussed above in relation to FIG. 34. The task is initialized and jammed in box 660.

From jammed state 476, the task is restarted in box 662 when PCE CPU 210 is being booted, and information about the configuration selected by the user is stored, including the size of PCE memory, the number of the drive which is the physical floppy disk drive, and the handles or access codes for the emulated floppy disk drives which can access virtual floppy disks. Any virtual floppy disks are meanwhile opened and set up by processes on Mesa CPU 112. Finally, FloppyEmulatorState is set to Init, in box 664, and FDCMSR is set to its receive mode in box 668, reflecting that the emulated FDC is ready to receive a command. Then the emulator handler task enters its waitForCondition state in box 668, awaiting the notify pceFloppyWaitIO from Dispatcher 410 indicating an I/O request for a floppy operation.

FIG. 46 shows a transition CmndtoDR from the Init state, box 640, to CmndRcvd state, box 642. During this transition, the floppy emulator handler task executes through the remainder of FIG. 47, and on to FIG. 50. When the notifyPCEFloppyWaitIO is received in box 670, causing the task to execute, the trapped address, data and status from PCE CPU 210 will be received from Dispatcher 410, and the task will branch on the address, in box 672, as in boxes 512 and 514 in FIG. 38.

Figures 48, 49:
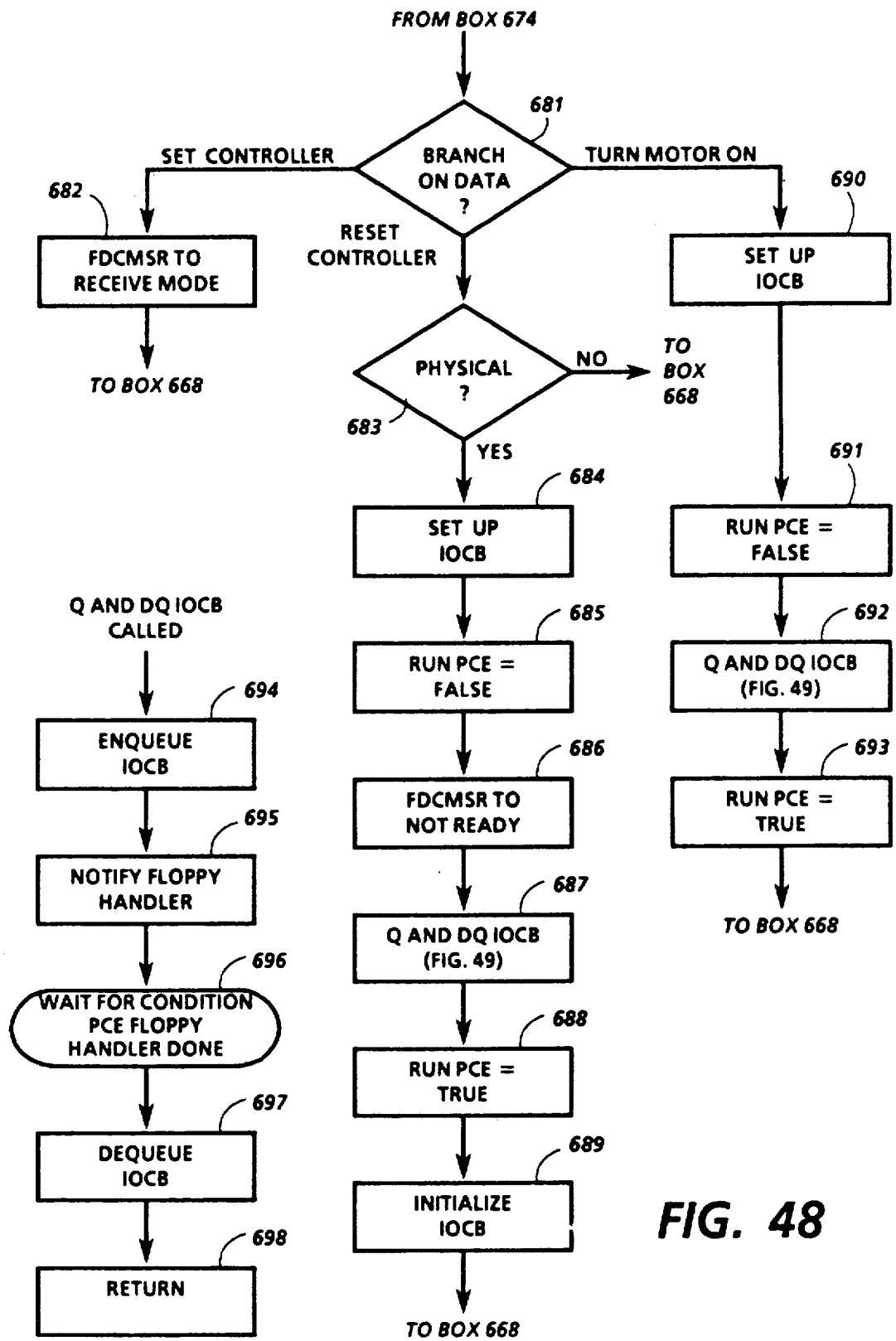
FIG. 48 is a flowchart of the step of setting up the IOCB in the task of FIG. 47.
FIG. 49 is a flowchart of the routine Q and DQIOCB which is called within the floppy emulator task of FIG. 47.

If the address received from PCE CPU 210 is 3F2h, the task will, in box 674, set up the floppy IOCB in I/O region 478 according to the steps in FIG. 48, after which the task will again wait for pceFloppyWaitIO in box 668. If the address is 3F4h, the system routine will provide FDCMSR from I/O region 478 as an input signal, in box 676, and will call LoadMagic in box 678, so that the status of the emulated FDC will be available to PCE CPU 210 when it performs the NMI correction routine, as discussed above. Then the task will again wait for pceFloppyWaitIO in box 668. If the address is 3F5h, the system routine will branch in box 680 to a corresponding step shown in FIG. 50 based on the value of FloppyEmulatorState before again waiting for pceFloppyWaitIO in box 668.

From box 674, FIG. 48 begins with a branch based on the trapped data from PCE CPU 210, in box 681. Three possible branches are shown, in which the data indicates a request that the controller be set, that the controller be reset, or that the motor in the floppy disk drive be turned on.

If the controller is to be set, the FDCMSR is changes to its receive mode, in box 682, before returning to wait for pceFloppyWaitIO in box 668.

If the controller is to be reset, the test in box 683 first determines whether a physical floppy drive is present in the configuration of PCE CPU 210 selected by the user. If not, there is no need to reset the FDC controller, since all floppy disk operation will relate to virtual floppy disks, and the FDC controller will not be used. But if a physical floppy drive is present, the IOCB is set up in box 684 with values appropriate to reset the controller, RunPCE is set false in box 685 to hold PCE CPU 210, and FDCMSR is changed to its not ready value, in box 686. A routine QandDQIOCB, discussed below in relation to FIG. 49, is then called in box 687 to provide the IOCB to the floppy handler task on IOP 160. Upon completion, RunPCE is set true in box 688 and the IOCB is initialized in preparation for future operations in box 689 before returning to wait for pceFloppyWaitIO in box 668.

If the motor is to be turned on, the IOCB is set up in box 690 with values appropriate to turn the motor on and RunPCE is set false in box 691. QandDQIOCB is called in box 692 to provide the IOCB to the floppy handler task. Upon completion, RunPCE is set true in box 693 before returning to wait for pceFloppyWaitIO in box 668.

QandDQIOCB is shown in more detail in FIG. 49. The IOCB is first enqueued on a queue of IOCBs waiting for servicing by the floppy handler task on IOP 160. Then a notify is sent to the floppy handler task so that, if it is waiting, it will begin emptying the queue. QandDQIOCB is called only within the floppy emulator handler task, and it then enters a waitForCondition state of that task, in box 696, awaiting a notify from the floppy handler that it has processed the IOCB, pceFloppyHandlerDone. Then QandDQIOCB dequeues the processed IOCB in box 697 and returns control to the routine which called it in box 698. QandDQIOCB is called not only in boxes 687 and 692, discussed above in relation to FIG.48, but also during the routine described below in relation to FIG. 50, which is called when the I/O request includes the address 3F5h.

As discussed above in relation to FIG. 47, when PCE CPU 210 provides the address 3F5h, the floppy emulator handler task branches based on the FloppyEmulatorState, as shown in box 680. The branch takes it to a corresponding step in the sequence shown in FIG. 50, indicated by A, B or C, corresponding respectively to Init, CmndRcvd and SendResults.

Figure 50:
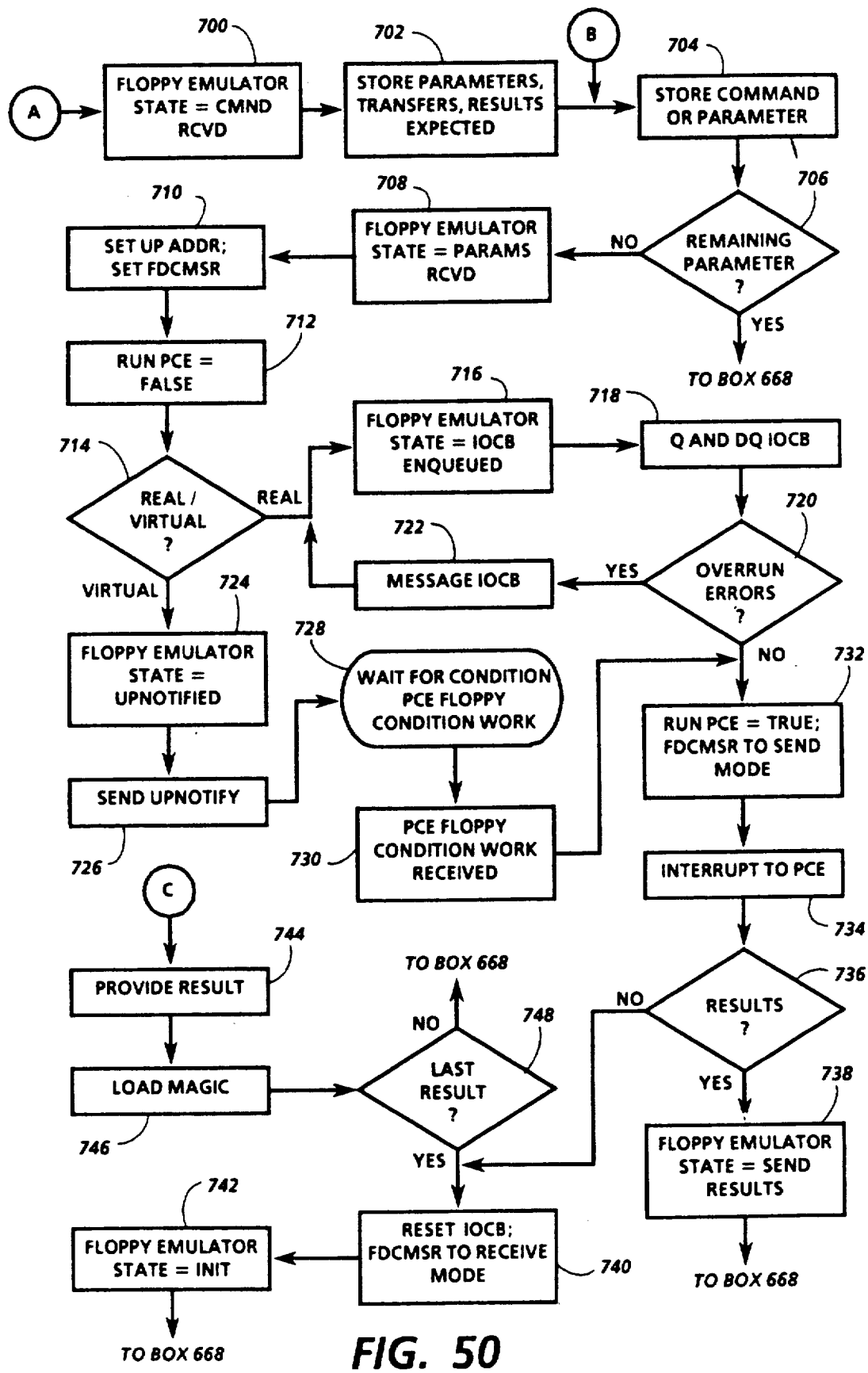
FIG. 50 is a flowchart of the branch based on the emulator state in the task of FIG. 47.

If FloppyEmulatorState is Init, it will first be changed to CmndRcvd, in box 700 in FIG. 50. If the command received from PCE CPU 210 is a valid command having expected numbers of parameters and results and expected data transfers, the expected values will be stored in I/O region 478, in box 702. The command itself is stored in box 704, or, if the FloppyEmulatorState was CmndRcvd when the address 3F5h was received, the parameter received is stored. The test in box 706 will then determine whether at least one parameter is still expected, which will be false if no parameters were expected or if a number as great as the number expected has been received. If there are any remaining parameters, the handler task returns to box 668 in FIG.47 to wait for pceFloppyWaitIO.

When the last parameter is received, FloppyEmulatorState will be set to ParamsRcvd in box 708. The Emulator handler task may in box 710 call a routine SetUpAddr to set up the byte count of the number of bytes to be transferred and to set the address fields in the IOCB, checking in the process to make sure the addresses provided are within the PCE memory determined at boot. SetUpAddr obtains the byte count and addresses from pceDMAData and pceDMAPages, discussed above. The emulator handler task also sets FDCMSR based on the trapped data from PCE CPU 210, with two bits indicating whether the FDC is not ready, in its receive mode or in its send mode; one bit indicating whether the FDC is busy, which is turned on it the command from PCE CPU 210 is not a seek; and four bits each indicating that a seek command is directed to a respective one of four floppy drives.

RunPCE is set false in box 712 to prevent PCE CPU 210 from executing instructions.

At this point FloppyEmulatorState is changed to ParamsRcvd, box 644 in FIG. 46, and the IOCB has been completed. The test in box 714 in FIG. 50 determines whether the floppy disk drive specified by the command is the physical drive for accessing a real floppy or an emulated drive for accessing a virtual floppy.

If a real floppy is to be accessed, FloppyEmulatorState is set to IOCBEnqueued in box 716, moving to box 646 in FIG. 46. Then, in box 718, QandDQIOCB is called as in FIG. 49. During the execution of QandDQIOCB, the floppy handler provides the IOCB to the physical FDC, which is the same as the FDC in an IBM PC. The floppy handler has two queues, one for IOCBs directly from the floppy emulator handler or other tasks on IOP 160 and one for IOCBs from Mesa CPU 112. The floppy handler makes use of a built-in DMA channel on IOP 160 to perform DMA operations. The floppy handler provides a notify pceFloppyHandlerDone upon completion, and, as discussed in relation to FIG. 49, the emulator handler task dequeues the IOCB upon receiving this notify. The test in box 720 then determines whether the dequeued IOCB indicates that an error, and specifically an overrun error, occurred. If so, the IOCB is massaged in box 722 and another attempt is made to have the IOCB processed, beginning with box 716. This retry may have a maximum number of attempts, such as three.

If a virtual floppy is to be accessed, FloppyEmulatorState is set to UpNotified in box 724, moving to box 648 in FIG. 46. Then, in box 726, an upnotify is sent to Mesa CPU 112, the upnotify bit indicating that a virtual floppy operation is requested. The emulator handler task then, in box 728, enters a waitForCondition state awaiting a downnotify pceFloppyConditonWork for Mesa CPU 112, indicating completion of processing of the IOCB. The Mesa procedure for virtual floppy operation receives the IOCB, identifies the specific floppy command, sets up the parameters needed to carry it out, and calls a routine corresponding to the command. This routine then calls a virtual floppy controller procedure to service the command, as discussed in greater detail below. When the command has been serviced, any error conditions are stored in the IOCB, after which the downnotify pceFloppyConditionWork is sent to IOP 160 for the floppy emulator handler task.

When the floppy emulator handler task receives pceFloppyConditonWork, it sets RunPCE true in box 730 or determines in box 720 that there were no overrun errors, it proceeds to set RunPCE to true and FDCMSR to its send mode, in box 732. An IOP interrupt may be sent to PCE CPU 210 to indicate completion of the floppy operation in box 734. Before stopping, however, the handler task tests in box 736 whether any results were returned from the floppy operation. If so, FloppyEmulatorState is set to SendResults in box 738, as shown in box 650 in FIG. 46, before returning to wait for a notify pceFloppyWaitIO in box 668 in FIG. 47. If not, the IOCB is reset and the FDCMSR is set to its receive mode, in box 740, in preparation for the next command. Then FloppyEmulatorState is set to Init in box 742, before returning to wait for a notify pceFloppyWaitIO in box 668.

If FloppyEmulatorState is set to SendResults in box 738, the next 3F5h IN request from PCE CPU 210 will lead to C in FIG. 50. In box 744, the emulator handler task provides a result from the IOCB as an input signal, and calls LoadMagic in box 746 to load it into PCE memory for the NMI correction routine. If the test in box 748 determines that the last result has been sent, the IOCB will be reset in box 740, and so forth as described above for the case in which there are no results. Otherwise, the task returns to wait for a notify pceFloppyWaitIO in box 688.

The virtual floppy controller, mentioned above, provides access to a virtual floppy, which is a file in the filing system of host system 16 which is also accessible as if it were a memory medium, in this case as if it wee a floppy disk. Another such memory medium file is the emulated rigid disk, discussed below. These memory medium files provide an important technique for transferring large quantities of data between the control of Mesa CPU 112 and PCE CPU 210. The transfer technique is discussed in detail in coassigned application Ser. No. 856,525, now U.S. Pat. No. 4,899,136, incorporated herein by reference.

As used herein, a filing system is any means in a data processing system which permits operations on units of data by name without reference to location in memory. The filing system converts the names into memory locations and makes the data available for an operation being performed. As used herein, a file is a unit of data within a filing system. Objects, documents, folders, and file drawers are all examples of files which may be operated on by name in the filing system. The filing system makes it possible to operate on a file by name by storing and updating a relationship between the file name and the location of the corresponding data, which will be stored somewhere within the data processing system. A file may be fragmented, so that it may not be stored in one contiguous block of memory, but the filing system typically treats the file as if it were one contiguous block. An operating system may assist in managing the fragments, storing the relationships between the file fragments and their locations in memory, making the file appear as a contiguous block. Subfiles within the file may be accessed with the file name and the subfile name.

A memory medium file which can be accessed either as a file or as a memory medium could be created in any of a multitude of filing systems currently in use. The filing system of the 6085 on which memory medium files have been implemented according to the invention resembles many filing systems in that it uses a rigid disk for the storage of most files. Coassigned application Ser. No. 856,525, now U.S. Pat. No. 4,899,136 discusses the manner in which files called objects may be made available to a user for manipulation using an application called the Desktop on the 6085. Within the system, however, each of these objects, like any other file, is accessible on the basis of its name or a file handle equivalent to that name which is used within the system to refer to the file. Therefore, from the point of view of the user, a virtual or an emulated rigid disk will be an object which can be manipulated on the Desktop, while from the point of view of Mesa CPU 112 these objects will be files within its filing system and from the point of view of PCE CPU 210 these files will be memory mediums.

Procedures on the Mesa CPU 112 can be used to access the memory medium file as a file in the conventional manner and to interpret the information on an accessed file and provide it for display on the desktop. The interpreter procedure will be able to further access the file to obtain the information to be interpreted and also to convert the information obtained into a form capable of being displayed as a part of the Desktop display. This interpreter need not, however, be a part of the memory medium file and must, in order to be effective, be specific to the format and encoding of the data in the memory medium file.

Figure 50A:
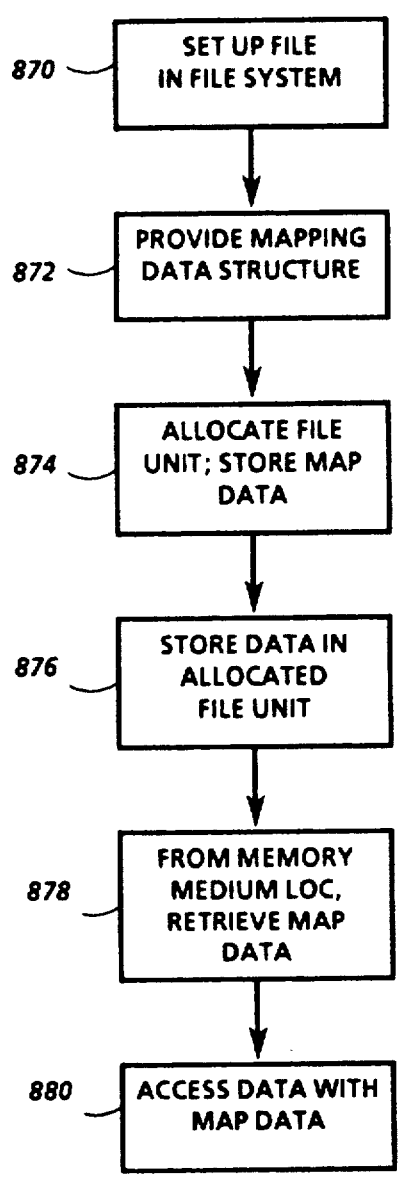
FIG. 50A is a general flowchart showing functional steps by which a memory medium file such as a virtual floppy is created and managed.

FIG. 50A shows basic functional steps in the creation of a memory medium file and the management of data in a memory medium file. In box 870, the file is set up in the filing system within the data processor being used. This will follow the standard procedures for that filing system, and may involve setting up attributes of the file such as its name, file type, and so forth. Then, in box 872, a data structure is associated with the file which makes it possible to retrieve the location of a unit of data within the file by providing the memory medium address or location of that unit of data. This data structure will perform its mapping function when an I/O operation request for that file is received.

A subsequent step, in box 874, is to allocate to a unit of data a unit of the file, storing the location of that file unit in the data structure so that it will be retrieved when a memory medium location of that data unit is received. Once the file unit has been allocated, the data itself may be stored in that file unit, in box 876. For example, once a track of a virtual floppy file has been allocated, data may be stored in that track. Thereafter, in order to access the data, its memory medium location is provided to the data structure, retrieving from the mapping data structure the location within the file of the file unit where the data is stored, in box 878. Using the location, the data may then be accessed, in box 880.

The functional steps in FIG. 50A will occur in the creation of a memory medium file and the management of its data, but they may be implemented so as to occur in a variety of ways. If the memory medium is a rigid disk, then one implementation would be to allocate a file unit to each sector of the rigid disk at the time the data structure is provided, storing the location of the file unit corresponding to each sector in the data structure. Subsequently, the emulated rigid disk file may be accessed simply by retrieving the location of the file unit corresponding to a sector being addressed from the data structure. Data may be stored in that file unit, and that data may be read and rewritten.

Figure 50B:
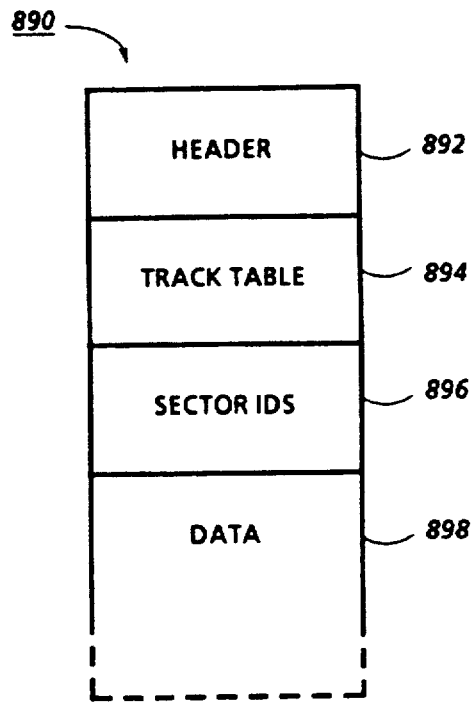
FIG. 50B shows the contents of a virtual floppy.

If the memory medium is a floppy disk, however, it may be more appropriate to implement it differently, in order to accommodate the variable sector size and identification typical of floppy disks. FIG. 50B shows the structure of a virtual floppy file 890 according to such an implementation.

Virtual Floppy File 890 includes header 892, containing general information about the virtual floppy file, including a key which uniquely identifies it, a field indicating single or double sided format, the number of tracks formatted and the current size of the virtual floppy file. The size of the virtual floppy file according to this implementation may vary, because its space is allocated based on an estimate of space needed.

Virtual floppy file 890 also includes track table 894 which contains one element for each track the virtual floppy file may have. If the heads of the emulated floppy drive are assigned the values 0 and 1 and the cylinders are assigned integer values beginning with 0, each track will have an address based on the cylinder in which it is located and the head which accesses it defined by (2× cylinder)+head, and this address determines the position of that track's entry in track table 894. The track entry will include the size of the sectors on the track, flags with characteristics of the track, the number of sectors on the track, a filler byte value stored in the track when formatted but not yet written, an offset indicating the location of the track's allocated unit of the file within the file, and a pointer used to map the track into virtual memory of host system 16. The flags will include a dirty flag indicating whether the track has been written or read and an IDsaved flag indicating whether the sector IDs for the track have been saved, as discussed below.

Virtual floppy file 890 includes sector IDs 896 for sectors which have special sector IDs. These special sector IDs are necessary to locate those sectors within a track. On a real floppy, the sector ID is stored immediately before the data in the sector, but in the virtual floppy file, the sector ID for any sector which has a sector ID other than its order within the track is stored in the sector IDs 896, together with the location of that sector within the track. Sector IDs 896 also permit retrieval of the sector ID of a given sector based on the order of that sector within the track.

The final part of virtual floppy file 890 is the data 898, containing all the tracks to which units of the file have been allocated. In general, the track numbered 0 is allocated immediately, with other tracks being allocated as needed.

Figure 50C:
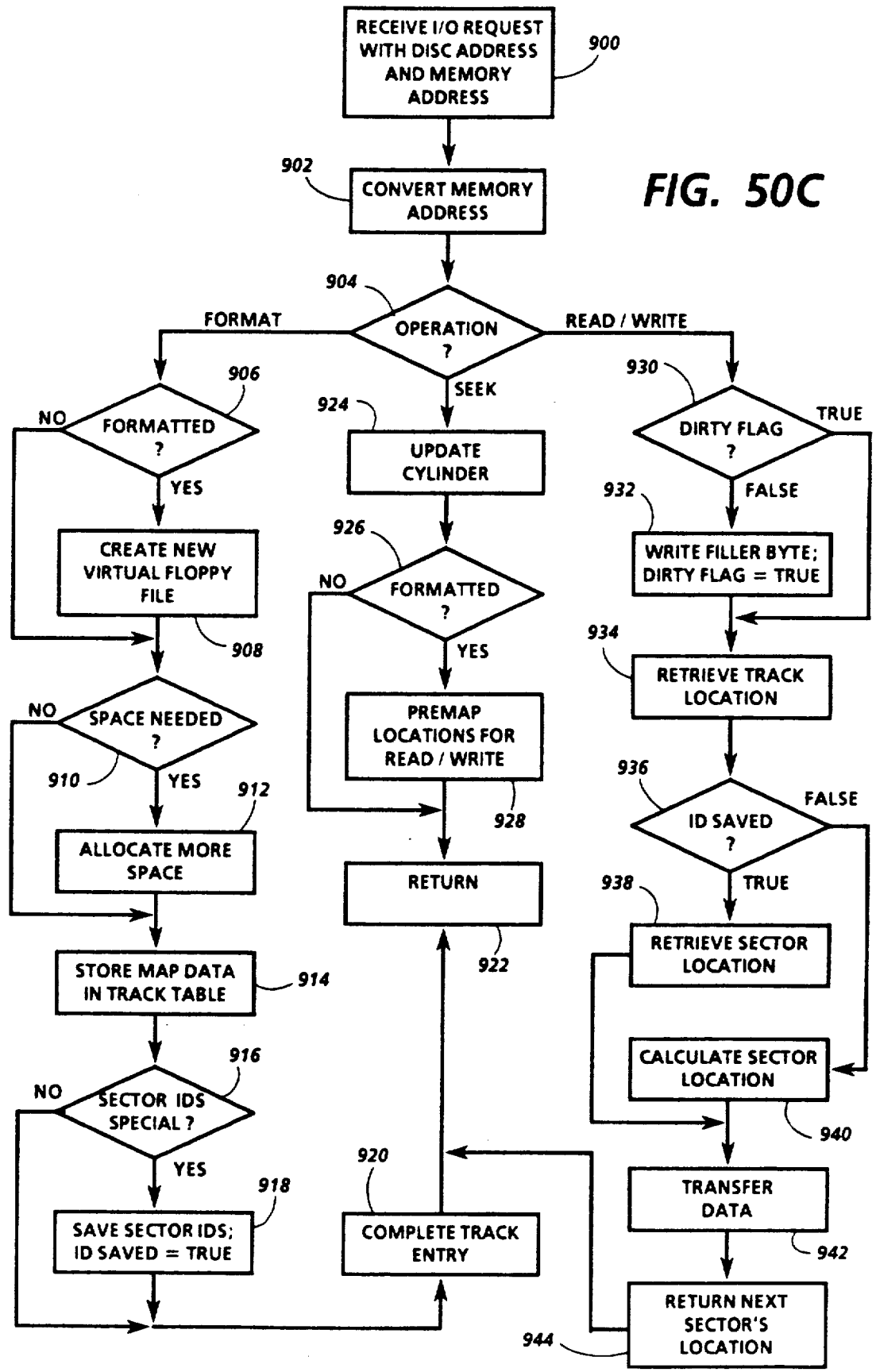
FIG. 50C is a flowchart of the operations of an emulated floppy disk controller which accesses the virtual floppy of FIG. 50B.

FIG. 50C is a flowchart showing the steps followed by a controller procedure which handles I/O operation requests to a virtual floppy file, and therefore serves in a sense as an emulated floppy disk controller. This procedure is called with the I/O request, which may include a disk address of a cylinder, track or sector, and a memory address may be provided indicating the location of the PCE memory with which a data transfer is requested, in box 900. The controller will evaluate whether the request contains a valid command and whether the drive number in the request corresponds to a virtual floppy file before proceeding. If a memory address is received, that address is converted in box 902 from the PCE address to a virtual address which can be applied to memory by Mesa CPU 112 in order to access the location in PCE memory. Then, in box 904, a branch is taken based on the operation requested. FIG. 50C illustrates the frequently requested operations format, seek and read or write.

If the request is for a format operation of a track whose address is provided, the controller will access that tracks entry in track table 894 to determine whether it has been formatted, in box 906. If so, the old virtual floppy file is deleted, and a new file is created in box 908, since reformatting a track clears a floppy. In box 910, the controller determines whether the previously allocated space for data 898 is sufficient to include the track to be formatted. If more space is needed, more space is allocated in 912, the controller allocating space based on the possible number of tracks remaining to be formatted. Then, space is allocated to this track, and the map data necessary to access that space within the file is stored in the track table in box 914. The test in box 916 then determines whether the IDs of the sectors in the track being formatted are special. If so, the sector IDs are saved in sector IDs 896, and the Id saved flag is set true, in box 918. Then, the data entry is completed in box 920 before returning to the routine which called the controller in box 922.

If the request is for a seek operation, the controller updates its own stored value for the cylinder number in box 924. The controller stores a number of values of importance to its operation, including a cache of tracks mapped into memory, which saves time by holding the cached tracks for subsequent use without the necessity of remapping. This mapping is a mapping to Mesa CPU virtual addresses, and is not the same as the mapping into the virtual floppy file using track table 894. The controller tests in box 926 whether the track has been formatted, which would permit it to be mapped to virtual addresses. If so, a mapping to virtual addresses is performed in box 928, and stored in the cache described above, so that subsequent read and write operations will be more efficient. Then, the controller returns to the routine which called it in box 922.

If the request is for a read or write operation, substantially the same sequence of steps is taken. The controller tests the dirty flag in box 930, and, if it is still false, its initial value, the filler byte is written into the track and the dirty flag is set true, in box 932, which saves time during the format operation. The controller uses the floppy disk address received in box 900 to retrieve the track location in the virtual floppy file from the track table 894 in box 934. Then, the controller checks the IDsaved flag of the track in box 936. If the flag is true, the sector location is retrieved form sector IDs 896, in box 938, but if false, the sector location is calculated based on the position of the sector in the order of sectors within the track and on the length of the sectors on the track, in box 940. Then the data is transferred in box 942 to or from that sector, and if the length of the data to be transferred, as received with the request, is greater than one sector from following sectors to the end of the track and around to the beginning of the track again until the transfer is completed. The transfer is to or from the virtual address in memory determined in box 902. When the transfer is completed, the next sector's location is returned in box 944 and the controller returns to the routine which called it in box 922. The location of the next sector is returned to assist in emulating the DMA controller, and may be provided to PCE CPU 210 in response to an I/O operation request for its value.

A memory medium file such as the virtual floppy may be used to transfer data from the control of one of Mesa CPU 112 and PCE CPU 210 to the other. The steps include receiving a signal from the user through the user interface selecting the virtual floppy to be transferred while it is under the control of one of the processors, receiving another signal indicating a destination which is the other processor, and providing the virtual floppy to the destination processor so that it has control of the virtual floppy. For example, if the virtual floppy is accessed through an object on the display such as an icon of the type described in coassigned application Ser. No. 856,525, now U.S. Pat. No. 4,899,136, that icon may be selected by mouse operations. If the icon is on the Desktop portion of the display, it is under control of Mesa CPU 112, and by moving or copying it to another display object representing an emulated floppy drive which is a procedure for accessing the virtual floppy as a floppy disk, the user may indicate that the destination is the emulating processor. The virtual floppy is then provided to the emulating processor and placed under its control.

From the above, it can be seen that memory medium files such as the virtual floppy file could be implemented in various ways. The emulated rigid disk file, discussed briefly above, is an example which is somewhat simpler than the virtual floppy file, since it only requires a fixed mapping table from rigid disk addresses to the emulated rigid disk file. We turn now to the rigid disk drive emulator itself.

6. Rigid disk drive emulator. The IBM PC XT, one variant of the IBM PC, may include a rigid (also called hard or fixed) disk. Also, a number of rigid disk controllers (RDCs) may be used in the IBM PC without the XT option or in other PC compatible machines. Therefore, the sequence of I/O requests to access the rigid disk depends on the specific RDC present in the system. As a result, each RDC is run by software which converts a set of requests to the ridge disk into signals which, when applied to that RDC, produce the desired I/O operation. This software is stored on an auxiliary ROM, also referred to as Fixed Disk ROMBIOS. The RDC vendor usually provides this auxiliary ROM with the Fixed Disk ROMBIOS along with the RDC.

The Xerox 6085, which may be modified according to the present invention to emulate the IBM PC XT, always includes a hard disk, and the 6085 hard disk also operates in its own unique way. Emulation of the rigid disk drive on the IBM PC makes use of this 6085 hard disk. The rigid disk emulator includes not only specially written BIOS software similar in function to Fixed Disk ROMBIOS but also includes an emulator handler task which is called by Dispatcher 410 and procedures executed by Mesa CPU 112 when it receives an upnotify from the emulator handler task. The use of specially written BIOS software simplifies rigid disk emulation, but the rigid disk could also be emulated using the same general approach used in floppy emulation and the emulation of other I/O devices.

The specially written BIOS software for the Xerox 6085 hard disk (XBIOS) differs from the remainder of the ROMBIOS used in emulating the IBM PC according to the invention. The remainder of the ROMBIOS may be any BIOS which meets the functional specifications of the standard IBM PC ROMBIOS, while XBIOS, in effect, provides an interface between the software run on PCE CPU 210 and the 6085 hard disk. Nonetheless, XBIOS is stored like the ROMBIOS on the 6085 hard disk prior to booting of PCE CPU 210, and if the user selects a configuration which includes the emulated rigid disk drive XBIOS is copied into the PCE region of main memory 126 during booting, like the ROMBIOS, and initialized. Then, during operation of PCE CPU 210, XBIOS is called upon execution of an instruction requesting rigid disk operations, and generates I/O request which, when received by IOP 160, result in the requested operations.

XBIOS has two routines, an initialization routine and an interrupt routine, performed whenever a rigid disk operation is requested. The initialization routine is called by the ROMBIOS if it determines during initialization that XBIOS has been loaded. This is indicated by the first word of the portion of PCE memory into which XBIOS would be loaded. The initialization routine replaces the floppy interrupt vector with the rigid disk interrupt vector, so that an instruction INT 13h will call the XBIOS interrupt routine. The floppy interrupt vector is stored elsewhere to be able to invoke the floppy interrupt routine. The initialization routine then provides an I/O OUT request with the address 332h and with data indicating the offset of a region of PCE memory called diskRegs which is used for transfer of data relating to the emulated rigid disk between PCE CPU 210 and IOP 160. After IOP 160 responds to the 322h OUT request, the initialization routine will continue by sending a 322h IN request to obtain the emulated rigid disk (ERD) size from IOP 160. XBIOS will store the ERD size received in a disk parameter table in PCE memory, thus completing the XBIOS initialization routine.

The interrupt routine is executed in two parts whenever PCE CPU 210 executes INT 13h, as noted above. Prior to executing INT 13h, PCE CPU 210 loads parameters for a rigid disk operation into its AX, BX, CX, DX and ES registers. The first part of the interrupt routine first tests the contents of these registers to determine whether a rigid or floppy disk operation is requested. If a floppy operation, the floppy interrupt routine from the ROMBIOS is called. But if a rigid disk operation is requested, the contents of these registers are loaded into diskRegs in PCE memory and a 320h OUT request is provided, after which PCE CPU 210 enters a wait state. PCE CPU 210 waits for a disk interrupt from its interrupt controller, which will be provided by IOP 160 when it completes the requested rigid disk operation. Upon receiving the disk interrupt, the second part of the interrupt routine is called, and its loads values stored in diskRegs by IOP 160 back into the registers of PCE CPU 210 before returning control to the routine which called the interrupt routine with INT 13h.

Figure 51:
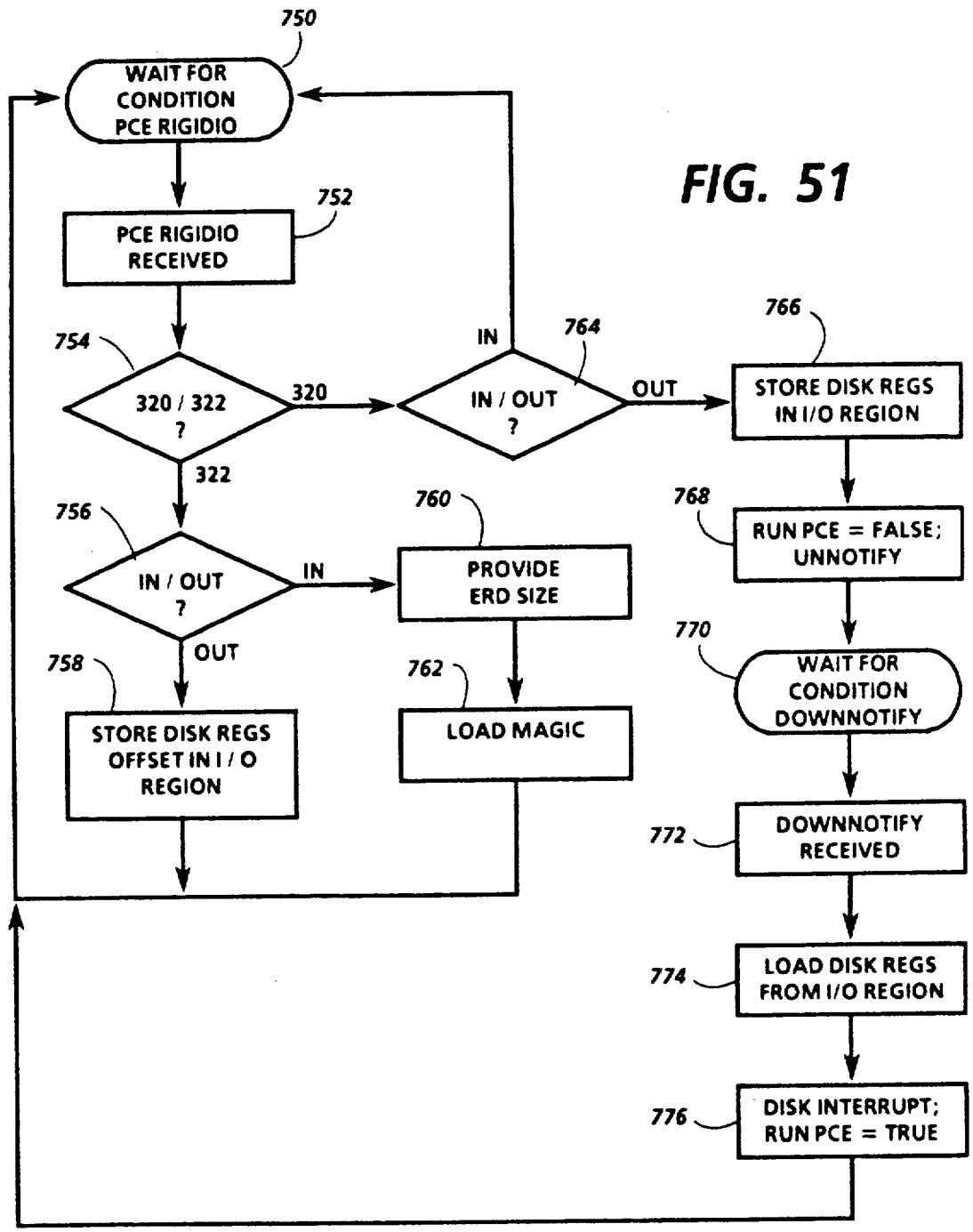
FIG. 51 is a flowchart of an IOP task within the fixed or rigid disk emulator of FIG. 32.

FIG. 51 shows the rigid disk emulator handler task which is notified by Dispatcher 410 when an I/O request with an address of 320h or 322h is received from PCE CPU 210. The emulator handler task ordinarily remains in its waitForCondition state awaiting a notify pceRigidIL from Dispatcher 410. As described in relation to boxes 510 and 512 in FIG. 38, when the task receives the notify pceRigidIL in box 752, it also receives the address, data and status from Dispatcher 410 and then branches on the address, as shown in box 754.

If the test in box 754 determines that the address is 322h, sent by the initialization routine of XBIOS, the status lines are tested in box 756 to determine whether an IN or OUT request was received. If an OUT request, the data from PCE CPU 210 is an offset for diskRegs in PCE memory, and is stored in I/O region 478, in box 758. But if an IN request, the task retrieves the ERD size from I/O region 478 and provides it as an input signal in box 760, calling LoadMagic in box 762 to load it into MagicDataStructrue in PCE memory. In either case, the task returns to box 750 to wait for another notify pceRigidIO from Dispatcher 410.

If the test in box 754 determines that the address is 320h, sent by the interrupt routine of XBIOS, the status lines are similarly tested in box 764 to determine whether an IN or OUT request was received. If an IN request, it is treated as a no op, and the task returns to box 750 to wait for a notify. But is an OUT request, the task stores diskRegs from PCE memory in I/O region 478 in box 766 and sets RunPCE to false and sends an upnotify to Mesa CPU 112 requesting an emulated rigid disk operation, in box 768. The task enters its waitForConditionState in box 770, waiting for a downnotify from Mesa CPU 112 indicating completion of the rigid disk operation. When the downnotify is received in box 772, the task loads diskRegs in PCE memory from I/O region 478, to provide any error and status data from the rigid disk operation, in box 774. In box 776, the system routine sends a disk interrupt to PCE CPU 210 via the programmable interrupt controller (PIC)330, discussed above in relation to FIG. 25, and sets RunPCE true. Then the task returns to box 750 to wait for a notify pceRigidIO from Dispatcher 410.

When Mesa CPU 112 receives an upnotify requesting an emulated rigid disk operation, an appropriate procedure for handling the request will be called based on the information in I/O region 478. The procedure called may not require interaction with the ERD region of the 6085 hard disk, such as procedures responding to requests to verify sectors, initialize the drive, seek and recalibrate, all of which are essentially no ops to which status data indicating successful completion are returned. The procedure responding to read status returns the status of the previous operation before returning the successful completion status.

If the procedure involves the ERD itself, the ERD is accessed through an interface consisting of a set of public procedures within the Mesa workstation software. Such procedures include format commands or write sector commands which change the ERD, read sector which retrieve information from ERD to PCE memory, and return drive parameters which obtains data about the configuration of the ERD and returns it in I/O region 478.

Some procedures involve the ERD system buffer, a region within the ERD which holds information about the ERD. Read sector buffer transfers one sector's worth of information from ERD system buffer into PCE memory, while write sector buffer does the reverse. The ERD system buffer is also used in formatting a single track or the whole ERD, in which case data is copied from the system buffer into the designated section of ERD.

Rigid disk emulation as described above involves predominantly transfer of data between the ERD region of the 6085 hard disk and the PCE memory. We turn now to keyboard emulation, involving both transfer of data from a user to PCE CPU 210 and also transfer of data from regions of main memory 126 other than PCE memory to PCE CPU 210.

7. Keyboard emulator. The keyboard on the IBM PC is a primary source of user input, as in most personal computers and workstations. The keyboard itself is scanned by a keyboard processor which detects downstrokes and upstrokes by the user and thus can determine how long a key has been held down. The keyboard processor generates a scan code for each keyboard action detected, the scan code being a unique number corresponding to that action. If the user holds a key down longer than half a second, the keyboard processor generates the corresponding scan code repeatedly at a rate of 10 times per second until the user releases the key, which may result in a display in which the character auto-repeats. Upon detecting a keyboard action, the keyboard processor also sends an interrupt to the programmable interrupt controller (PIC), and the PIC in turn interrupts the CPU when the highest priority interrupt waiting for service is from the keyboard processor. The keyboard processor presents the first scan code in its internal buffer to the port which the CPU reads, and as each scan code is read, the keyboard processor presents the next scan code from its buffer.

In reading the scan codes, the CPU of an IBM PC applies signals to its programmable peripheral interface (PPI), which applies appropriate signals to the keyboard processor to obtain requested operations. The CPU sends an I/O request with address 60h to receive the next scan code from the keyboard processor, and also sends OUT requests with address 61h to enable and clear the keyboard.

Keyboard emulation encompasses a feature which enhances emulation capabilities by taking advantage of underlying features of the 6085. As discussed in detail in coassigned patent application Ser. No. 856,525, now U.S. Pat. No. 4,899,136, incorporated herein by reference, the use of a 6085 may, during emulation of an IBM PC, transfer character data from other windows on the display into a window in which an emulated PC screen appears, using mouse and keyboard operations in a manner which is conventional for the 6085. This transfer will have the effect of transferring the character data to PCE CPU 210, which receives the transferred characters as if they were keystrokes on an IBM PC keyboard. This enhanced emulation capability is supported by the manner in which keyboard emulation is performed.

Figure 52:
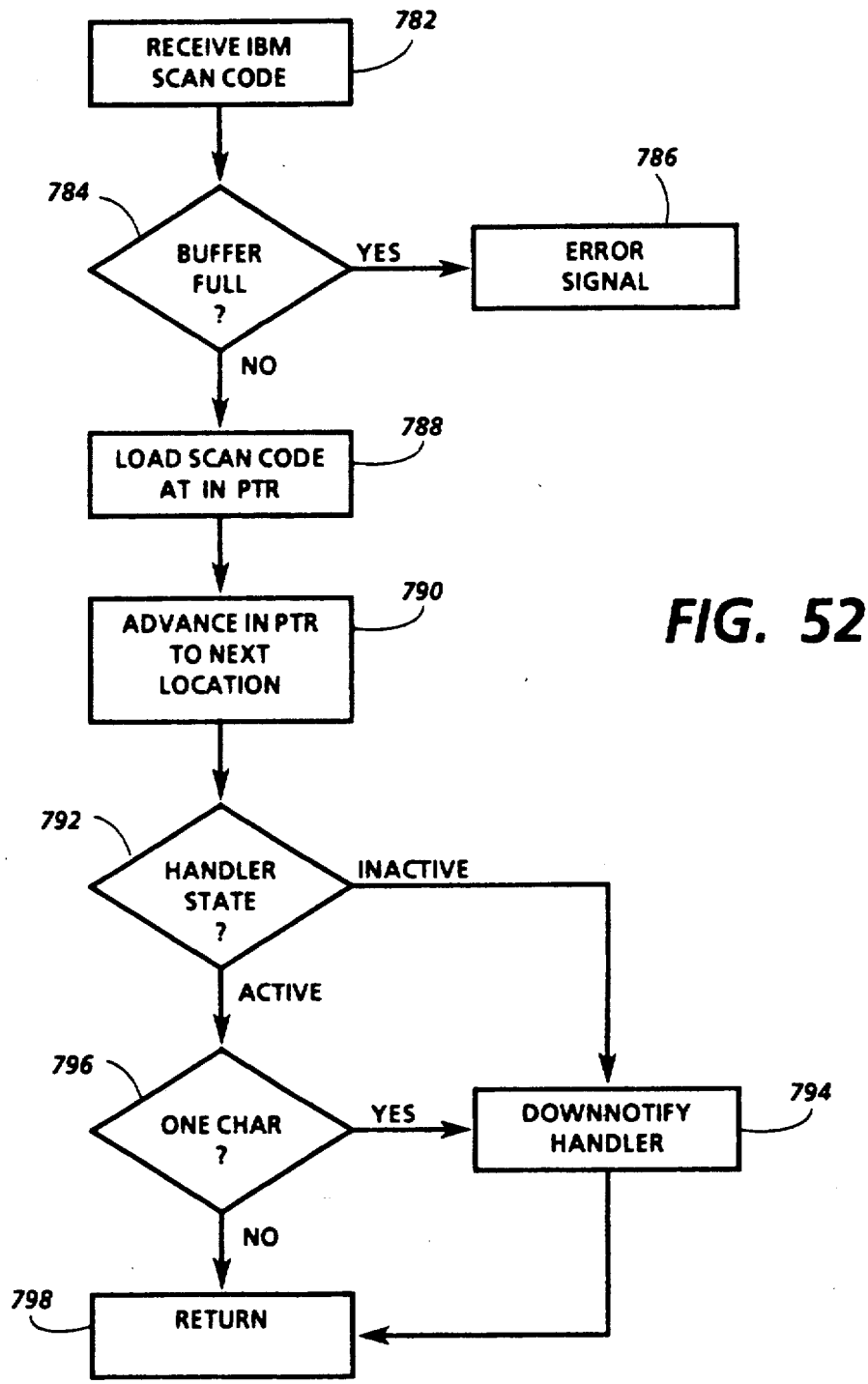
FIG. 52 is a flowchart of steps taken by the Mesa CPU as part of the keyboard emulator of FIG. 32.
Figure 53:
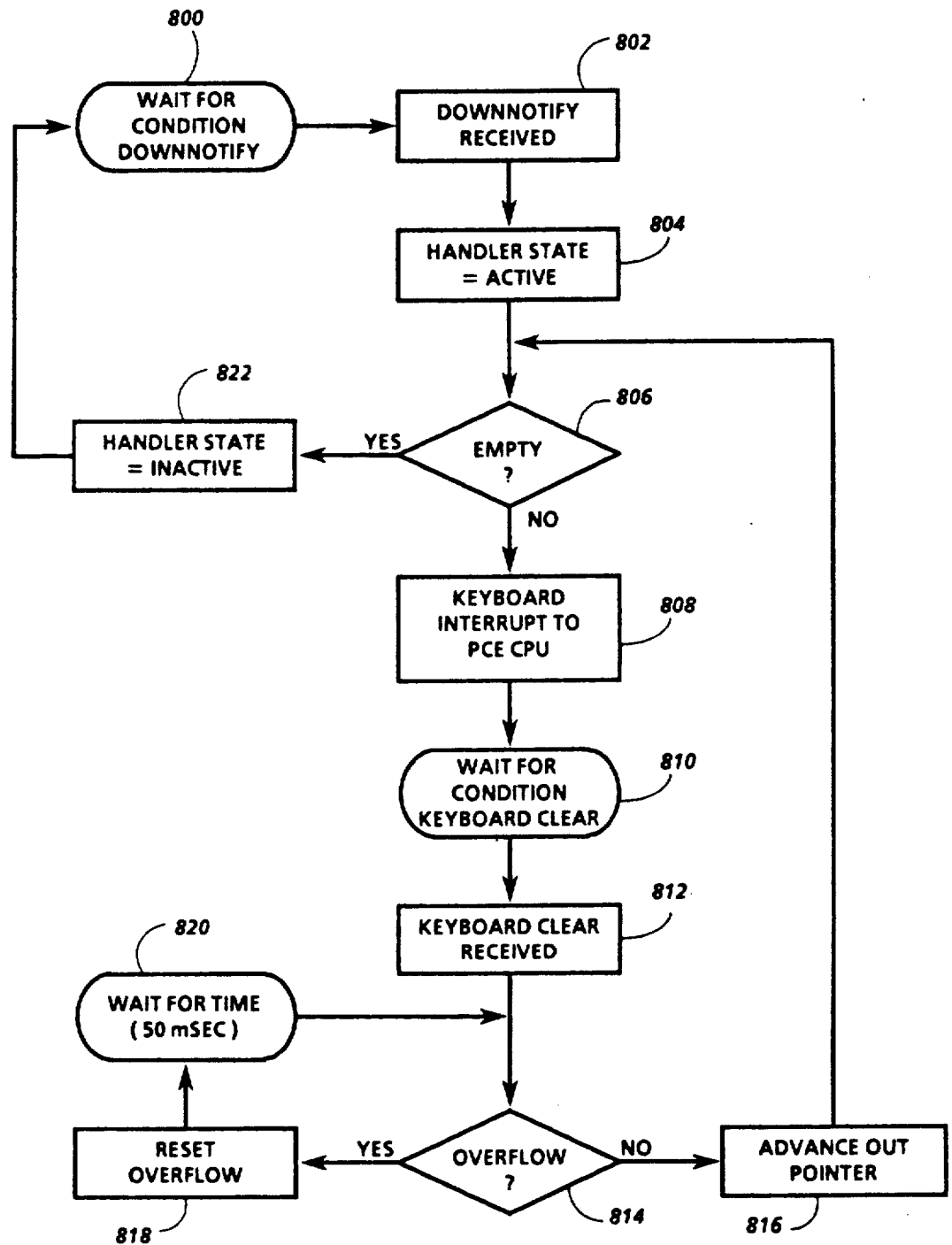
FIG. 53 is a flowchart of an IOP task within the keyboard emulator of FIG. 32.

The focus of keyboard emulation is a keyboard buffer in I/O region 478. This buffer is loaded by procedures executed by Mesa CPU 112, and its contents are provided to PCE CPU 210 by a keyboard emulator handler task which Dispatcher 410 notifies in response to keyboard I/O requests from PCE CPU 210. FIG. 52 shows some of the features of the loading of the keyboard buffer, while FIG. 53 shows features of the keyboard emulator handler task.

Prior to the loading of the keyboard buffer as shown in FIG. 52, a number of events have occurred. If the user is providing keystrokes, each keystroke will result in a 6085 scan code, which will be received by a keyboard handler task executed on IOP 160. An upnotify will occur, requesting keystroke servicing, and a procedure will be called which determines whether the keystrokes are to go to the window in which the emulated PC screen appears or to another displayed window. If to the emulated PC screen, a procedure is called which converts the received keystrokes to IBM scan codes based on an assignment of values to the keys of the 6085 keyboard which is similar to the assignment of values on the IBM PC keyboard. This conversion procedure and technique by which the user may obtain a display of the emulated keyboard showing the values assigned are also described in coassigned patent application Ser. No. 856,525, now U.S. Pat. No. 4,899,136, incorporated herein by reference. After conversion, the IBM scan code is then passed to the procedure shown in FIG. 52.

Similarly, if a series of keystrokes and mouse operations by the user results in a transfer of displayed characters into the emulated PC screen, a procedure is called which converts the codes corresponding to the displayed characters to IBM scan codes. These scan codes are similarly passed to the buffer loading procedure shown in FIG. 52.

The buffer loading procedure of FIG. 52 begins by receiving an IBM scan code from the procedure which calls it, in box 782. The test in box 784 determines whether the keyboard buffer is full. The manner in which this is done depends on the implementation of the buffer. If the buffer is a ring buffer like the printer buffer described above, for example, the variable which indicates the number of scan codes in the buffer can be compared with the maximum buffer size to determine whether the buffer is full. If the buffer is full, loading another character will overwrite a character which has not yet been read out, so an error signal is sent in box 786 to other procedures which recover and provide the scan code again after IOP 160 has had time to unload a scan code from the buffer.

If the buffer is not full, the buffer loading procedure loads the received scan code into the keyboard buffer at the location indicated by the in pointer, in box 788. The In pointer is then advanced to the next location, in box 790. This may be done by incrementing the In pointer, unless incrementing it would take it past the last location in the buffer, in which case it is reset to the first location in the buffer. A test in box 792 determines whether the emulator handler task is currently actively removing scan codes from the buffer, by reading a flag in I/O region 478 which is set by the handler task to indicate its current state. If the handler is inactive, a downnotify is set in box 794 to start the unloading of the buffer. Also, if the test in box 796 determines that only one scan code remains in the buffer, so that the handler may be about to set the flag to indicate it is inactive, even though it has not yet done so, a downnotify is sent. Otherwise, no downnotify is necessary, since the handler task will continue to unload the buffer until it is empty. In either case, the buffer loading procedure then returns control to the procedure which called it.

The keyboard emulator handler task in FIG. 53 responds to the downnotify in box 794 in FIG. 52. As with other tasks executed by IOP 160, this task is previously initialized. Then the task is jammed and, unlike tasks relating to features controlled by user selection, no action is taken during configuration of PCE CPU 210 by the user. During boot, however, the task is restarted and enters a waitForCondition state in box 800 awaiting a downnotify from Mesa CPU 112 resulting from the procedure in FIG. 52. The In and Out pointers to the keyboard buffer are reset, and a flag HandlerState in I/O region 478 is set to false to indicate the task is inactive before it enters its waitForCondition state in box 800.

When a downnotify from the procedure in FIG. 52 is received in box 802, the task in FIG. 53 will continue by setting HandlerState in I/O region 478 to indicate it is active, in box 804. The test in box 806 then determines whether the keyboard buffer in I/O region 478 is empty, which may be done by comparing the In point to the Out pointer or, if the keyboard buffer is implemented in the same manner as the printer buffer, described above, by checking the variable containing the number of scan codes in the buffer. If scan codes remain in the buffer to be unloaded, the task sends an interrupt to PCE CPU 210 indicating that a keyboard interrupt requires servicing, in box 808. The task then enters a waitForCondition state, awaiting a notify fromDispatcher 410 that the keyboard clear signal has been received from PCE CPU 210, in box 810.

The task in FIG. 53 is somewhat different than the sequence in FIG. 38, because Dispatcher 410 itself handles keyboard I/O request from PCE CPU 210, rather than calling the keyboard emulator handler task. Dispatcher 410 calls an appropriate procedure from the keyboard emulator to handle an I/O request. In response to the interrupt sent in box 808 in FIG. 53, PCE CPU 210 will send an I/O IN request to address 60h; Dispatcher 410 responds to this IN 60h request by calling a procedure which provides the scan code at the Out pointer in the keyboard buffer and then calls LoadMagic, so that when PCE CPU 210 executes the NMI correction routine, it will load the next scan code from the keyboard buffer into one of its registers. In an IBM PC, if the BIOS fails to load a scan code received in this manner into its own keyboard buffer, it sends a signal causing the speaker to sound, but for emulation, the BIOS is modified to provide an otherwise unassigned I/O request value to indicate such an overflow; if Dispatcher 410 detects this I/O request, it sets an overflow flag. If the scan code is successfully loaded, however, PCE CPU 210 will send a sequence of two I/O OUT requests to address 61h, the first with its seventh bit high and the second with its seventh bit low; upon detecting the toggling of this seventh bit, Dispatcher 410 will provide the keyboard clear notify to the keyboard emulator handler task of FIG. 53.

When Dispatcher 410 provides the keyboard clear notify in box 812, the task determines in box 814 whether the overflow flag was set by Dispatcher 410, indicating a BIOS failure to load a scan code. If the scan code was successfully loaded, the Out pointer is advanced to the next location in the keyboard buffer, in box 816, and the task then returns to test whether the buffer is empty in box 806. But if an overflow is found in box 814, the overflow flag is reset in box 818 and the task enters a waitForTime state in box 820 for a period of time such as 50 msec, long enough for the BIOS to begin to unload its keyboard buffer. Then, the test in box 814 for an overflow will be repeated. Eventually, the scan code should be successfully loaded by the BIOS.

When the test in box 806 determines that the keyboard buffer is empty, HandlerState is set inactive in box 822. Then the task returns to a waitForCondition state in box 800, awaiting another downnotify from the procedure in FIG. 52.

The keyboard emulator handles inputs to PCE CPU 210 in the manner described above. We turn finally to display emulation, handling outputs from PCE CPU 210, which is done in a bifurcated manner.

8. Display controller emulator. The IBM PC may provide either monochrome or color/graphics display. A number of components assist in providing the display, including a display buffer memory, a character generator, a display controller and supporting video control logic. The display buffer memory is within the logical address space of the CPU of the IBM PC, so that it is updated through ordinary memory accesses. If the data in the display buffer is character data, the character generator generates the corresponding pixel patterns to be displayed. The display controller receives a number of control parameters from the CPU and controls the painting of the screen. The video control logic assists in converting the output signals of the CPU into the appropriate control signals for other display components.

Since the CPU updates its display by writing to the display buffer memory, display update is not an I/O request as such, but is a memory operation. The CPU controls the display controller, however, through I/O requests as with other I/O devices. Therefore, display emulation has two distinct parts: The display controller and some associated circuitry must be emulated as part of the I/O environment of PCE CPU 210. On the other hand, the updated display buffer memory must be the source of information used to emulate the IBM PC display as part of the user interface provided by host system 16. We will consider emulation of the display controller and associated circuitry in this section, turning to the emulation of the IBM PC display user interface in the next section.

The display controller on an IBM PC is a Motorola 6845 component, which has 18 registers for display control parameters. The CPU of an IBM PC accesses these registers with an I/O request to addresses or ports between 3B0–3BBh or 3BFh for a monochrome display controller and to addresses between 3D0–3DFh for a color display controller. In addition, the CPU will provide an index indicating which register is to be accessed. Based on the address and the index, the display controller performs an appropriate operation.

Although it would be possible to emulate the operations for all 18 registers, emulation of all 18 may not be necessary or feasible. For example, it may be appropriate to save the data written to all 18 registers, but to perform full emulation only for registers 10–15, which include the write only cursor start and end registers, read/write start address high and low registers and write only cursor address high and low registers. In other words, the contents of these registers affect the emulated display, while the contents of other registers do not, even though stored when received from PCE CPU 210.

Similarly, some of the I/O request addresses are unused by the IBM PC or call for operations which are not necessary or feasible. For example, monochrome display controller addresses 3B1–3B3h, 3B6–3B7h, 3B9h, 3BBh and 3BFh are unused, although the video control logic ordinarily provides default signals FFh or 80h when one of these addresses is provided with an I/O IN request. Addresses 3BC–3BEh relate to printer operations rather than display. Thus, only some of the operations called for by addresses 3B4–3B5h, 3B8h and 3BAh are emulated. Similarly, only some of the operations called for by color display controller addresses 3D4–3D5h and 3D8–3DAh are emulated. The default provided by the video control logic is also emulated on I/O IN requests.

Unlike the general technique of FIG. 38, the handling of display controller I/O requests are handled within Dispatcher 410 by calling procedures in the display emulator. Dispatcher 410 calls the procedure of FIG. 54 if the address is a monochrome display controller address, and calls a substantially similar procedure if the address is a color display controller address.

The procedure receives the call from Dispatcher 410 in box 830, and tests in box 832 whether the user has selected a monochrome display, which can be determined from configuration data in I/O region 478. The corresponding procedure for a color display controller address will test for selection of a color display. If the address received does not correspond to the selected display, the test in box 834 determines from the status data from PCE CPU 210 whether the request is for an IN or OUT operation. If an I/O IN request was received, default data is provided in box 836 in the same manner as provided by the video display logic of an IBM PC, and LoadMagic is called to load the default into MagicDataStructure, to be read by PCE CPU 210 during the NMI correction routine. Then, control is returned to Dispatcher 410 in box 840.

If the address and the selected display correspond, in box 832, the base address of a jump table is retrieved in box 842 from within the procedure. The test in box 844 determines whether an IN or OUT operation is requested, and if OUT, the base address is corrected in box 846 to indicate the base address of the OUT portion of the jump table. The service routine for the address received is then called suing the address from the jump table, in box 848. The service routine returns control to Dispatcher 410 upon completion.

Figure 54:
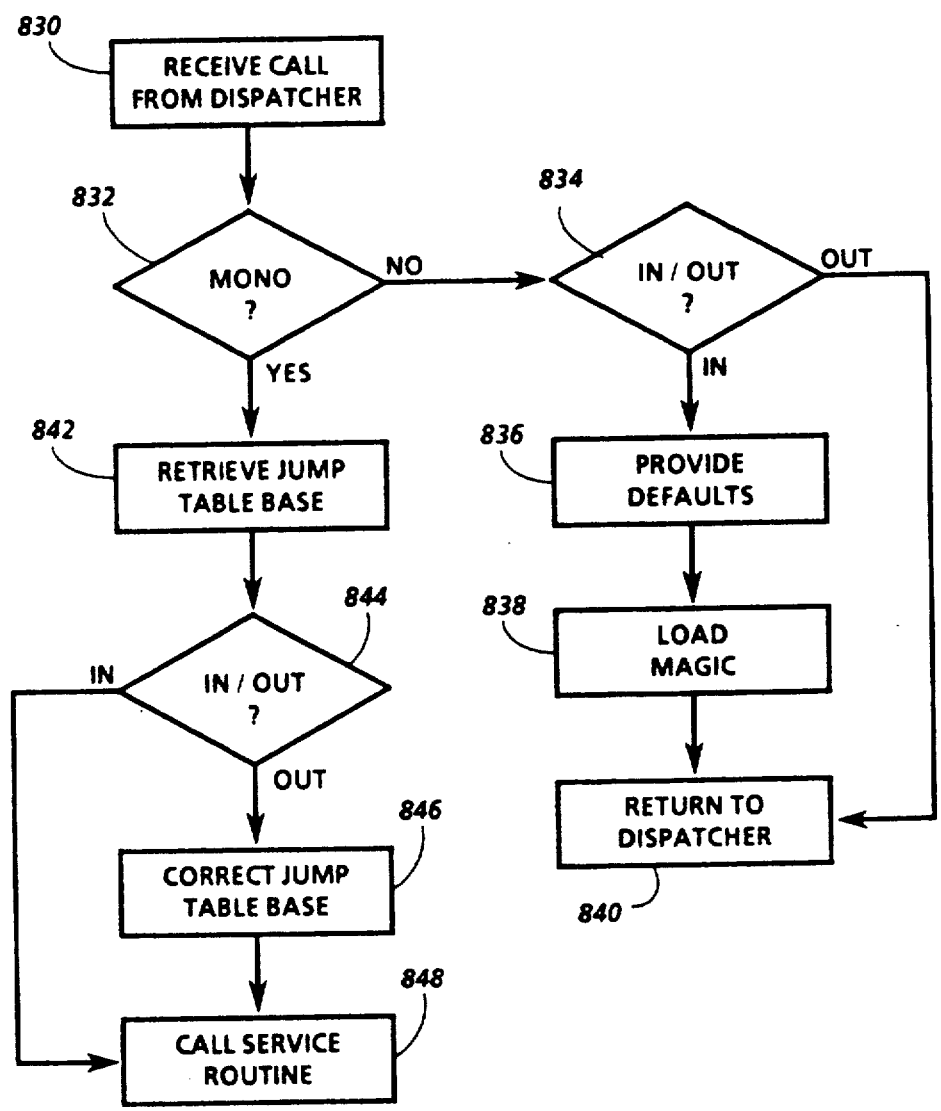
FIG. 54 is a flowchart of an IOP procedure within the display controller emulator.

A number of service routines may be called in box 848 in FIG. 54. A few relate to illegal operations, determining what will occur, for example, if the address indicates write only but the request is for an IN operation, or if the address indicates read only but the request is for an OUT operation. A routine BadPortRetFF loads FFh into the MagicDataStructure as a default value, and another routine BadPortRet80 loads 80h as a default value. These default values are appropriate for some of the improper IN operations. A routine IgnoreOut simply returns execution to Dispatcher 410, appropriate for an improper OUT operation.

The more important service routines each relate to an emulated function corresponding to a specific address. The following are the monochrome service routines, although similar routines are provided for color display.

The routine Port3B4Out emulates display controller indexing. The routine checks whether the index value received from PCE CPU 210 indexes an existing register. If not, error servicing is called, but if the register exists, the index value is stored in I/O region 478 as MonoIndexPort.

The routine Port3B5In emulates a data IN operation from the display controller. Of the emulated registers, only the start address high and low registers can be read, so this routine checks whether MonoIndexPort points to one of those register. If not, a default value is returned to PCE CPU 210 as described above, but if one of those registers is indexed by MonoIndexPort, its contents are loaded into MagicDataStructure, to be received by PCE CPU 210 during the NMI correction routine.

The routine Port3B5Out emulates a data OUT operation to the display controller. This routine therefore moves the data from PCE CPU 210 to the register in I/O region 478 indexed by MonoIndexPort. Then, this routine accesses a jump table for the location of the appropriate procedure for the register written. If the register is one of the fully emulated registers, the called procedure will set a corresponding bit in a word variable ServiceReqBits in I/O region 478 and will upnotify Mesa CPU 112 to scan ServiceReqBits and service the bits which are set, as discussed in relation to the emulated user interface below. If not an emulated register, however, the called procedure will return control to Dispatcher 410.

The routine Port3B8Out emulates a mode OUT operation to the display controller. This routine checks the mode bits from PCE CPU 210 and determines the mode from them. The monochrome high resolution bit is checked, and if not set, an error service routine is called, but if set, the routine checks whether a video enable bit is set. If not, a procedure is called to disable the video by setting a disable bit in ServiceReqBits and upnotifying Mesa CPU 112. If the video enable bit is set, the routine checks which of two monochrome modes is selected, one permitting blinking characters and the other not. If neither, an error service routine is called, but if one of the modes is selected, a mode control bit in ServiceReqBits is set and Mesa CPU 112 is upnotified.

The corresponding color display routine is different in some respects: It need not check the high resolution bit. After checking the enable bit, it checks whether the new mode is the same as the current mode, and if so, control returns to Dispatcher 410, avoiding frequent mode loading. The color display has more than two modes, so a table is used to determine whether a valid mode is indicated.

The routine Port3BAIn emulates a status IN operation from the display controller. The routine alternates between loading a retrace status and a trace status into MagicDataStructure for PCE CPU 210.

An additional color routine, Port3D9Out emulates a color control OUT operation for the color/graphics display. The data from PCE CPU 210 is moved to ColorByte in I/O region 478 and a color change bit in ServiceReqBits is set before an upnotify is sent to Mesa CPU 112.

As noted above, there are also a number of error service routines which may be called if an error is detected. These routines may load an error code into the I/O region and upnotify Mesa CPU 112 of the error.

The routines described above suffice to emulate the display controller from the point of view of PCE CPU 210. After a brief discussion of miscellaneous I/O device emulation, we will return to display emulation as it relates to emulation of the user interface.

9. Miscellaneous I/O device emulation. The above discussion covers emulation of all the I/O devices in a standard IBM PC XT. Additional I/O devices could be emulated, however. For example, the 6085 mouse could be used to emulate a mouse for the IBM PC. Emulation of additional I/O devices involves generally the same techniques as those discussed above, but tailored for the specific device in question.

V. Display and Emulated User Interface

The CPU in an IBM PC updates its display by writing to a display buffer memory. As discussed above in relation to memory emulation, PCE CPU 210 similarly writes to a display buffer in PCE memory space. In order to emulate the user interface of the IBM PC, however, it is necessary also to use the information in that display buffer to update a window on the 6085 display which emulates the PC screen. Display trapper 230 provides information about which part of the emulated PC screen must be updated, and a task on IOP 160 periodically checks for display update, upnotifying Mesa CPU 112 if display update is needed. In addition, a number of procedures executed by Mesa CPU 112 assist in emulating the display portion of the user interface.

Figure 55:
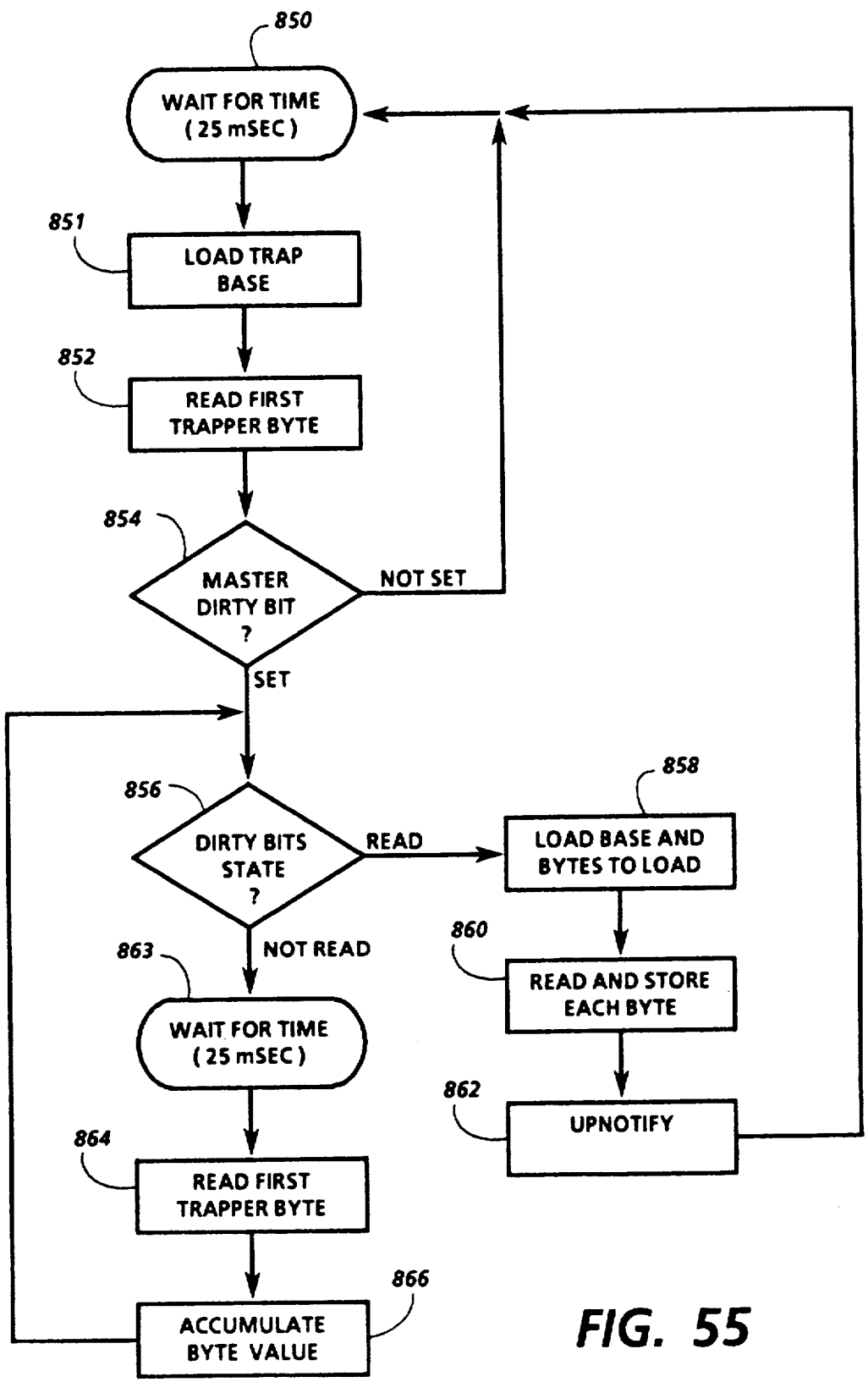
FIG. 55 is a flowchart of an IOP task which reads the display trapper contents according to FIG. 16 and helps emulate the PC user interface.

FIG. 55 shows the dirty bit scanning task on IOP 160 which periodically checks for display update by scanning the display trapper registers. During initialization, Dispatcher 410 calls a procedure in the display emulator which initializes and jams the dirty bit scanning task. During configuration, the task remain idle in order to avoid spurious activity, even though the user may have selected display type. Then, during boot, Dispatcher 410 calls another procedure in the display emulator which initializes ServiceReqBits so that no bits are set; initializes an ErrorCode in I/O region 478 so that no bits are set; initializes DirtyBitsState in I/O region 478 to Read, indicating that the dirty bits have been read by a Mesa procedure; and initializes display type dependent variables, based on the display type selected by the user during configuration and stored in I/O region 478, including the variable BytesToLoad indicating the number of scans needed to fill the I/O region dirty bit array for monochrome or color display and the variable trapBase indicating the series of display trapper ports to read to report dirty bits for a monochrome or color display buffer. Then this procedure calls the Restart macro to release the dirty bit scanning task from its jammed state. At this point, the scanning task begins to perform the sequence in FIG. 55 periodically.

The dirty bit scanning task enters a waitForTime state in box 850, in which it waits for an arbitrary period such as 25 msec. After that period, it loads the variable trapBase from I/O region 478 in box 851 and reads the first trapper byte, found at the address trapBase, in box 852. Reading a byte in a trapper register clears that register, as discussed above in relation to FIG. 16. Then the scanning task tests the first bit of the byte which it read, which is the master dirty bit, in box 854. If the master dirty bit is not set, no display update has occurred, so that the scanning task returns to a waitForTime state in box 850 to begin the loop again.

If the master dirty bit has been set, a further test in box 856 determines whether the value DirtyBitsState in I/O region 478 indicates that a Mesa procedure has read the dirty bits array. If the array has been read, its base and the value BytesToLoad indicating its size are loaded in box 858, and the scanning task proceeds to read and store each byte from the dirty bit registers into the array. Since the first byte has already been read, it is stored before reading the second byte, and so forth. When the reading and loading of the dirty bits array has been completed as appropriate for the type of display selected by the user, an upnotify is sent to Mesa CPU 112 in box 862 to indicate that the dirty bits array is ready to be read. The scanning task then return to a waitForTime state in box 850.

When the test in box 856 determines that the dirty bits array has not been read, the scanning task enters another waitForTime state in box 863, after which it again reads the first trapper byte in box 864. The value read is accumulated with the previously stored value in box 866 by performing an OR operation on the two values, so that any additional dirty bits in that value will be added. Then the scanning task returns to repeat the test in box 856.

The task in FIG. 55 continues during operation of PCE CPU 210, so that the emulated display is continually updated according to the contents of the PCE display buffer memory. The contents of that buffer memory are obtained by procedures on Mesa CPU 112 which have previously obtained display configuration data and which proceed to update the display in response to an upnotify sent in box 862 in FIG. 55.

The procedure for updating the display is set up during initialization and whenever a change is made between text oriented and graphics oriented processing. The display is configured by setting up the initial display type and a procedure for either monochrome or color display update, based on the user selection. A process is forked off during booting to wait for upnotifies from the display emulator handler task in FIG. 55.

When an upnotify is received, the appropriate display update procedure is called. For a monochrome display, the displayed data includes only text data. The monochrome procedure begins by reading and storing ServiceRequestBits from I/O region 478. It checks that the error number is zero, and, if not, it calls an error service routine to handle the error whose code is received. If no error, the monochrome procedure loads data from I/O region 478 into a data record, including the ServiceRequestBits and, if dirtyBits in ServiceRequestBits is set, the dirty bits array. After reading the dirty bits array, the monochrome procedure sets DirtyBitsState to Read, discussed above. The monochrome procedure also loads the cursor position from I/O region 478 into the data record, and, it the extraWork flag in ServiceRequestBits is set, loads cursor shape data and blinking and intensity information into the data record. Finally, the monochrome procedure provides a pointer to the data record to a display painting procedure which, from the information in the data record, updates the emulated screen window.

Unlike a monochrome display, a color display may contain text data and graphics data. The color procedure also begins by reading and storing ServiceRequestBits from I/O region 478. It also checks the error number, calling an error service routine if necessary. If no error, the color procedure checks the display mode, which indicates one of four sections of code to handle display data processing.

The 40×25 section handles 40×25 test emulation. This section loads ServiceRequestBits into a data record and, if the dirty bit is set, also loads the dirty bits array, setting the DirtyBitsState to Read. This section then loads the cursor position and active page data into the data record, and, if the extraWork flag in ServiceRequestBits is set, also loads the color active data, border color data, cursor shape data, blinking and intensity information into the data record. Then this section provides a pointer to the data record to the display painting procedure.

The 80×25 section is similar to the 40×25 section except that some constant are different.

The Medium Resolution Graphics Section handles medium resolution graphics text emulation. This section loads ServiceRequestBits into a data record and, if the dirty bit is set, also loads the dirty bits array, setting the DirtyBitsState to Read. This section checks the extraWork flag in ServiceRequestBits and, if it is set, loads color active data, color and palette data and intensity information into the data record. This section then provides a pointer to the data record to the display painting procedure.

The High Resolution Graphics Section handles high resolution graphics text emulation in a manner similar to the Medium Resolution Graphics Section. Some constants are different.

When the emulation session is terminated, the process waiting for upnotifies is halted, terminating display emulation.

VI. Further Developments

The embodiments of the invention described above may be modified in many ways within the scope of the invention. Host system 16 itself need not be a Mesa system, but could be any other system capable of performing the functions described above. The architecture of Host system 16 could be modified in many ways, including consolidating Mesa CPU 112 into a single VLSI chip, and similarly providing each memory/display controller on a single VLSI chip for each bank of memory.

The degree to which the emulating processor can execute a sequence of instructions executable by the IBM PC or other emulated system depends on the level at which those instruction are written. If directed to the ROMBIOS, those instructions will be executable to the extent the ROMBIOS loaded into PCE memory can execute them. The modifications to ROMBIOS noted above for emulation should not change the ability to execute instructions. Some sequences of instructions which bypass the ROMBIOS or are otherwise unconventional may not be executable, however. In general, loadable applications and operating systems executable on an IBM PC should be executable by a system emulating as described above, in distinction to a modified ROMBIOS which may not be executable. It is within the scope of the invention, however, to modify the ROMBIOS loaded into PCE memory to make it capable of executing other sequences of instruction or conversely to make it capable of executing fewer sequences of instructions but more efficiently. Furthermore, modifications to provide signals such as the MCS and UCS signals, as described above, are also within the scope of the invention.

Many other modifications, variations and improvements will be apparent from the above description, and the scope of the invention is not limited by the description, but only by the attached claims.

What is claimed:

1. A system for emulating a target system having a central processor for executing a set of target system instructions and a set of target system devices that provides an environment for the central processor, the target system devices including a target system I/O device for performing a target system I/O operation and for receiving output signals from the central processor while performing the target system I/O operation, the target system further including communication means for communicating the output signals from the central processor to the target system I/O device; the emulating system comprising:

a host system having a host processor for executing a set of host system instructions different from the target system instructions; and an emulating processor for executing a sequence of the target system instructions; the emulating processor providing signals during execution of the sequence of target system instructions, one of the signals being a target I/O output signal that is one of the output signals received by the target system I/O device while performing the target system I/O operation;

the host system further comprising environment means connected for providing an environment for the emulating processor so that the emulating processor continues to execute the sequence of target system instructions and connected for providing an environment for the host processor so that the host processor executes the host system instructions;

the environment means comprising I/O monitoring circuitry for detecting the target I/O output signal and for obtaining monitoring data relating to the target system I/O operation;

the environment means further comprising I/O device data from which the environment means can determine a current emulated state of the communication means;

the environment means further comprising device emulating means for emulating the target system I/O operation by using the I/O device data to determine the current emulated state of the communication means; the device emulating means accessing the I/O device data based on the monitoring data in response to the target I/O output signal;

the host processor independently executing a sequence of the host system instructions while the emulating processor executes the sequence of target system instructions.

2. The system of claim 1 in which the monitoring data include control data indicating an input operation, the device emulating means retrieving the control data and providing input signals to the emulating processor based on the I/O device data if the control data indicate an input operation.

3. The system of claim 1 in which the monitoring data include address data indicating a type of I/O operation, the I/O device data including respective data for the indicated type of I/O operation, the device emulating means retrieving the address data and emulating the type of I/O operation based on the respective data for the indicated type of I/O operation.

4. The system of claim 1 in which the target I/O output signal includes an address indicating a suboperation performed by the target system I/O device while performing the target system I/O operation; the I/O device data including respective data for the indicated suboperation; the monitoring data obtained by the I/O monitoring circuitry including the address; the device emulating means emulating the target system I/O operation by accessing the respective data for the indicated suboperation and emulating the target system I/O device in response to the monitoring data that includes the address.

5. The system of claim 4 in which the device emulating means further identifies the suboperation performed by the target system I/O device from the address included in the monitoring data.

6. The system of claim 4 in which the target I/O output signal includes status data indicating whether the suboperation performed by the target system I/O device is an input I/O operation, the monitoring data obtained by the I/O monitoring circuitry including the status data; the environment means further being for determining whether the status data included in the monitoring data indicates that the suboperation performed by the target system I/O device is an input I/O operation and, if so, for providing input data to the emulating processor.

7. The system of claim 6 in which the environment means further stops operation of the emulating processor whenever the status data included in the monitoring data indicates that an input I/O operation is requested and permits the emulating processor to resume operation after the requested I/O operation has been emulated, the emulating processor executing a routine for retrieving the input data when it resumes operation.

8. The system of claim 1 which the target I/O output signal includes an indication of whether the target system I/O device performs an input operation while performing the target system I/O operation, the I/O monitoring circuitry further obtaining form the target I/O output signal a read signal indicating whether the target system I/O device performs the input operation.

9. The system of claim 8 in which the I/O monitoring circuitry is further connected for providing an interrupt to the emulating processor, the I/O monitoring circuitry providing the interrupt if the read signal indicates the target system I/O device performs the input operation.

10. The system of claim 9 in which the emulating processor has a non-maskable interrupt input line, the I/O monitoring circuitry being connected to provide the interrupt on the non-maskable interrupt input line.

11. A system for emulating a target system having a central processor for executing a set of target system instructions and a set of target system devices that provides an environment for the central processor, the target system devices including a target system I/O device for performing a target system I/O operation and for receiving output signals from the central processor while performing the target system I/O operation, the target system further including communication means for communicating the output signals from the central processor to the target system I/O device; the emulating system comprising:

- a host system having a host processor for executing a set of host system instructions different from the target system instructions; and
- an emulating processor for executing a sequence of the target system instructions; the emulating processor providing signals during execution of the sequence of target system instructions, the signals provided by the emulating processor including a target I/O output signal that is one of the output signals received by the target system I/O device while performing the target system I/O operation;
- the host system further comprising environment means connected for providing an environment for the emulating processor so that the emulating processor continues to execute the sequence of target system instructions and connected for providing an environment for the host processor so that the host processor executes the host system instructions;
- the environment means comprising a corresponding I/O device corresponding in function to the target system I/O device;
- the environment means further comprising I/O device data from which the environment means can determine a current emulated state of the communication means;
- the environment means further comprising device emulating means for emulating the target system I/O operation in response to the target I/O output signal by using the host processor and the corresponding I/O device and by using the I/O device data to determine the current emulated state of the communication means, the device emulating means accessing the I/O device data in response to the target I/O output signal;
- the I/O device data comprising a data structure for transferring data between the emulating processor and the host processor during emulation of the target system I/O operation;
- the host processor independently executing a sequence of the host system instructions while the emulating processor executes the sequence of target system instructions; the host processor being connected for accessing the data structure; the sequence of the host system instructions including an operation accessing the data structure.

12. The system of claim 11 in which the corresponding I/O device is a printer controller, the data structure being a multi-character printer buffer for transferring characters to the printer controller, the device emulating means further managing the printer buffer to generate input signals for the emulating processor reflecting the status of the buffer.

13. The system of claim 11 in which the corresponding I/O device is a keyboard controller, the data structure being a multi-character keyboard buffer for transferring codes from the keyboard controller, the device emulating means further interrupting the emulating processor when the buffer contains at least one code.

14. The system of claim 11 which the corresponding I/O device is a display controller, the host system comprising a bitmap memory loaded by the host processor and read by the display controller, the data structure being for transferring display parameters to the display controller, the device emulating means further requesting the host processor to load display update information into the bitmap memory.

15. The system of claim 11 in which the device emulating means loads the data structure based on data received from the emulating processor in order to transfer the loaded data to the host processor and unloads from the data structure data received from the host processor in order to transfer the unloaded data to the emulating processor.

16. The system of claim 11 in which the target I/O operation signal includes status data indicating whether the suboperation performed by the target system I/O device is an input operation or an output operation, the monitoring data obtained by the I/O monitoring circuitry including the status data; the corresponding I/O device being equivalent to the target system I/O device, the device emulating means further providing output data from the data structure to the corresponding I/O device when the status data indicates the requested operation is an output operation and retrieving input data from the corresponding I/O device when the status data indicates the requested operation is an input operation.

17. The system of claim 16 in which the target system I/O device is a floppy disk controller, the data structure including a data block for holding the input data to transfer floppy operation parameters to the floppy disk controller and for holding the output data to transfer floppy operation results to the emulating processor.

18. The system of claim 11 in which the environment means further comprises memory for storing the data structure, the environment means further comprising an input/output processor connected for accessing the data structure in the memory to transfer data between the emulating processor and the host processor; the device emulating means operating the input/output processor to transfer data between the emulating processor and the host processor during emulation of the target system I/O operation.

19. The system of claim 18 in which the device emulating means further operates the input/output processor to load data from the emulating processor into the data structure and retrieve the loaded data from the data structure for transfer to the corresponding I/O device.

20. The system of claim 18 in which device emulating means operates the host processor to perform the host operation during emulation of the target system I/O operation; the host processor operation providing a host I/O operation signal requesting an I/O operation and providing data from the data structure with the host I/O operation signal, the input/output processor further transferring the data provided with the host I/O operation signal to the corresponding I/O device.

21. The system of claim 20 in which the target I/O output signal includes output data, the device emulating means further operating the input/output processor to receive the output data, load the output data into the data structure, and receive the host I/O operation signal from the host processor.

22. A system for emulating a target system having a central processor for executing a set of target system instructions, the emulating system comprising:

- a host system having a host processor for executing a set of host system instructions different from the target system instructions, the host processor providing a host I/O operation signal requesting an I/O operation during execution of the host system instructions; the host system further comprising a set of I/O devices; and an emulating processor for executing a sequence of the target system instructions; the emulating processor providing an emulator I/O operation signal requesting an I/O operation during execution of the sequence of target system instructions;

the host system further comprising environment means connected for providing an environment for the emulating processor so that the emulating processor continues to execute the sequence of target system instructions and connected for providing an environment for the host processor so that the host processor executes the host system instructions; the environment means comprising an input/output processor for responding to the host I/O operation signal and the emulator I/O operation signal by controlling the set of I/O devices to perform requested I/O operations for the emulating processor and the host processor;

the input/output processor further being for stopping the emulating processor while the I/O devices perform the requested I/O operation in response to the emulator I/O operation signal;

the host processor independently executing a sequence of the host system instructions while the emulating processor executes the sequence of target system instructions.

23. The system of claim 22 in which the target system includes a set of I/O devices and the environment means comprises a memory accessible to the input/output processor and to the emulating processor, the emulator I/O operation signal being a request for one of the target system I/O devices; the input/output processor responding to the emulator I/O operation signal by emulating the one target system I/O device to obtain a result and by loading the result into the memory so that the emulating processor can retrieve the result and continue to execute the sequence of target system instructions.

24. The system of claim 22 in which the environment means further comprises a bus shared by the input/output processor and the emulating processor, the environment means further comprising means for controlling which of the input/output processor and the emulating processor has control of the bus, the controlling means giving control of the bus to the emulating processor only after the input/output processor signals the controlling means to allow emulating processor control.

25. The system of claim 24 in which the host system further comprises memory having a part accessible to the input/output processor through the bus and a part accessible to the emulating processor through the bus, the input/output processor and the emulating processor each providing an address on the bus while accessing the respective part of the memory, the environment means further comprising mapping means for determining which of the input/output processor and the emulating processor is accessing memory and for mapping the address on the shared bus into the part of memory accessible to that processor.

26. The system of claim 25 in which the mapping means comprises mapping registers for providing information for mapping the address into the respective part of memory accessible to the processor accessing memory, the mapping register being accessible only to the input/out processor so that the emulating processor cannot change the part of memory which is accessible to it.

27. The system of claim 25 in which the part of memory accessible to the emulating processor is also accessible to the host processor, the mapping means further being for ensuring that the operations of the host processor in executing a sequence of host system instructions are not altered by the operations of the emulating processor in accessing memory.

28. The system of claim 25 in which the part of memory accessible to the input/output processor and the part of memory accessible to the emulating processor share an overlapping area of memory, the input/output processor and the emulating processor using the overlapping area of memory to transfer information to each other.

29. The system of claim 28 in which the set of I/O devices includes a rigid disk controller, the overlapping area of memory including a register block; the input/output processor using the register block to transfer rigid disk operation results to the emulating processor, the emulating processor executing a loading routine for loading the register block and an unloading routine for unloading the register block.

30. A system for emulating a target system having a central processor for executing a set of target system instructions and a set of target system devices that provides an environment for the central processor, the target system devices including a target system I/O device for performing a target system I/O operation, the emulating system comprising:

a host system having a host processor for executing a set of host system instructions different from the target system instructions; and an emulating processor for executing a sequence of the target system instructions; the emulating processor providing signals during execution of the sequence of target system instructions, the signals provided by the emulating processor including a target I/O operation signal requesting the target system I/O operation;

the host system further comprising environment means connected for providing an environment for the emulating processor so that the emulating processor continues to execute the sequence of target system instructions and connected for providing an environment for the host processor so that the host processor executes the host system instructions; the environment means comprising a corresponding I/O device corresponding in function to the target system I/O device; the environment means emulating the target system I/O operation in response to the target I/O operation signal by using the corresponding I/O device, the environment means further comprising a data structure for transferring data between the emulating processor and the corresponding I/O device during emulation of the target system I/O operation;

the environment means further comprising memory for storing the data structure, the environment means further comprising an input/output processor connected for accessing the data structure in the memory to transfer data between the emulating processor and the corresponding I/O device during emulation of the target system I/O operation;

the corresponding I/O device providing data for transfer to the emulating processor during emulation of the target system I/O operation, the host processor being connected for accessing the data structure in the memory, the host processor further loading the data provided by the corresponding I/O device into the data structure for transfer to the emulating processor;

the host processor independently executing a sequence of the host system instructions while the emulating processor executes the sequence of target system instructions.

31. The system of claim 30 in which the input/output further provides the data from the corresponding I/O device to the host processor, retrieves the data loaded by the host processor from the data structure and provides the retrieved data to the emulating processor.

32. A data processing system for emulating a target data processing system having a central processor for executing a set of target system instructions, the central processor providing I/O operation requests to a set of target system I/O devices while executing a sequence of the target system instructions, the target system further including communication means for communicating I/O operation requests from the central processor to a first one of the target system I/O devices; the emulating data processing system comprising:

a host system having a host processor for executing a set of host system instructions and a set of host system I/O devices, the host processor providing I/O operation requests requesting operations of the host system I/O devices while executing a sequence of the host system instructions; and an emulating processor for executing a sequence of the target system instructions, the emulating processor providing I/O operation requests to the host system during execution of the target system instructions, a first one of the I/O operation requests being one of the I/O operation requests provided by the target system central processor to the set of target system I/O devices;

the host system further comprising input/output means for receiving the I/O operation requests from the host processor and from the emulating processor and for handling the I/O operation requests using the host system I/O devices so that the host processor continues to execute the sequence of host system instructions while the emulating processor executes the sequence of target system instructions;

the input/output means comprising I/O monitoring circuitry for detecting the first I/O operation request from the emulating processor and for obtaining monitoring data relating to the requested I/O operation;

the input/output means further comprising I/O device data from which the input/output means can determine a current emulated state of the communication means;

the input/output means further comprising device emulating means for emulating the first target system I/O device by using the I/O device data to determine the current emulated state of the communication means; the device emulating means accessing the I/O device data based on the monitoring data.

33. The system of claim 32 in which the input/output means further comprises an input/output processor, the device emulating means operating the input/output processor to emulate the first target system I/O device so that the emulating processor continues to execute the sequence of target system instructions.

34. A data processing system for emulating a target data processing system having a central processor for executing a set of target system instructions and target interface means for providing external transfer of signals in a manner characteristic of the target system in response to the central processor, the emulating data processing system comprising:

a host system having host interface means for providing external transfer of signals and a host processor for controlling the host interface means to provide external transfer of signals in a manner characteristic of the host system and different from the manner characteristic of the target system; the host interface means comprising a user interface for transferring signals between a user and the host system, the host processor controlling the user interface so that the signals are transferred in a manner characteristic of the host system user interface while simultaneously being transferred in a manner characteristic of a target system user interface; the user interface comprising a display controlled by the host processor; and an emulating processor for executing a sequence of the target system instructions, the emulating processor providing output signals and receiving input signals during execution of the target system instructions;

the host system receiving output signals from the emulating processor and providing input signals to that the emulating processor continues to execute the sequence target system instructions; the host processor controlling the host interface means in response to the output signals to provide external transfer of signals in a manner characteristic of the host system while simultaneously providing external transfer of signals in a manner characteristic of the target system; the host processor controlling the display so that the signals provided by the display to the user provide the appearance of a display characteristic of the host system while simultaneously providing within that display a display characteristic of the target system; the display characteristic of the host system including a set of windows; the host processor controlling the display to provide the display characteristic of the target system in one of the windows in the display characteristic of the host system.

35. A system for emulating a target system having a central processor for executing a set of target system instructions and a set of target system devices that provides an environment for the central processor, the target system devices including a target system I/O device for performing a target system I/O operation, the emulating system comprising:

a host system having a host processor for executing a set of host system instructions different from the target system instructions; and an emulating processor for executing a sequence of the target system instructions; the emulating processor providing signals during execution of the sequence of target system instructions, one of the signals being a target I/O operation signal requesting the target system I/O operation; the target I/O operation signal including an indication of whether the requested I/O operation is an input operation;

the host system further comprising environment means connected for providing an environment for the emulating processor so that the emulating processor continues to execute the sequence of target system instructions and connected for providing an environment for the host processor so that the host processor executes the host system instructions;

the environment means comprising I/O monitoring circuitry for detecting the target I/O operation signal and for obtaining monitoring data relating to the target system I/O operation; the I/O monitoring circuitry further obtaining from the target I/O operation signal a read signal indicating whether the requested I/O operation is an input operation; the environment means emulating the target system I/O operation based on the monitoring data in response to the target I/O operation signal; the I/O monitoring circuitry further being connected for providing an interrupt to the emulating processor if the read signal indicates the requested I/O operation is an input operation;

the environment means further being connected to hold and release the emulating processor, the environment means holding the emulating processor upon completion of execution of one of the sequence of target system instructions during which the target I/O operation signal was provided and then releasing the emulating processor after loading input data for the emulating processor, the emulating processor responding to the interrupt when the environment means releases it by retrieving the input data and using the retrieved input data to correct erroneous data resulting from the completion of execution of the target system instruction;

the host processor independently executing a sequence of the host system instructions while the emulating processor executes the sequence of target system instructions.

36. A system for emulating a target system having a central processor for executing a set of target system instructions and a set of target system devices that provides an environment for the central processor, the set of target system devices including a target system memory and target system I/O devices; the target system further including communication means for communicating signals from the central processor to a first one of the target system I/O devices; the emulating system comprising:

a host system having a host processor for executing a set of host system instructions different from the target system instructions; and an emulating processor for executing a sequence of the target system instructions; the emulating processor providing signals during execution of the sequence of target system instructions, the signals including memory access signals and I/O operation signals; each memory access signal requesting access to the target system memory; each I/O operation signal requesting a respective I/O operation of the target system I/O devices;

the host system further comprising environment means connected for providing an environment for the emulating processor so that the emulating processor continues to execute the sequence of target system instructions and connected for providing an environment for the host processor so that the host processor executes the host system instructions;

the environment means comprising I/O device data from which the environment means can determine a current emulated state of the communication means;

the environment means further being for receiving a first one of the signals from the emulating processor; the environment means further comprising device emulating means for emulating an I/O operation of the first target system device if the first signal is one of the I/O operation signals requesting an I/O operation of the first target system device; the device emulating means accessing the I/O device data in response to the first signal and using the I/O device data to determine the current emulated state of the communication means;

the environment means further comprising memory; the memory being accessed in response to the first signal if the first signal is one of the memory access signals;

the host processor independently executing a sequence of the host system instructions while the emulating processor executes the sequence of target system instructions; the host processor accessing the memory in executing the sequence of the host system instructions.

37. The system of claim 36 in which the memory includes a part that is accessible to the emulating processor, the environment means further being for mapping the first signal into the part of memory accessible to the emulating processor if the first signal is one of the memory access signals, the environment means further being for ensuring that the operations of the host processor in executing the sequence of the host system instructions are not altered by the operations of the emulating processor in accessing memory.

38. The system of claim 36 in which the host system further comprises interface means for providing external transfer of signals, the host processor accessing the memory to retrieve data stored by the emulating processor and controlling the interface means based on the retrieved data.

39. A system for emulating a target system having a central processor for executing a set of target system instructions and a set of target system devices that provides an environment for the central processor, the target system devices including a target system I/O device for performing a target system I/O operation, the target system further including communication means for communicating signals requesting the target system I/O operation from the central processor to the target system I/O device; the emulating system comprising:

a host system having a host processor for executing a set of host system instructions different from the target system instructions; and an emulating processor for executing a sequence of the target system instructions; the emulating processor providing signals during execution of the sequence of target system instructions, the signals provided by the emulating processor including a target I/O operation signal requesting the target system I/O operation;

the host system further comprising environment means connected for providing an environment for the emulating processor so that the emulating processor continues to execute the sequence of target system instructions and connected for providing an environment for the host processor so that the host processor executes the host system instructions;

the environment means comprising an equivalent I/O device to the target system I/O device;

the environment means further comprising means for simulating the equivalent I/O device;

the environment means further comprising I/O device data from which the environment means can determine a current emulated state of the communication means;

the environment means further comprising device emulating means for emulating the target system I/O operation in response to the target I/O operation signal by using the I/O device data to determine the current emulated state of the communication means, the device emulating means accessing the I/O device data in response to the target I/O operation signal; the device emulating means determining in response to the target I/O operation signal whether to emulate the target system I/O operation by using the equivalent I/O device or by using the simulating means;

the host processor independently executing a sequence of the host system instructions while the emulating processor executes the sequence of target system instructions.

40. The system of claim 39 in which the environment means comprises a memory and the target system I/O device is a controller for a memory medium, the environment means further managing a part of the memory to be accessible as if it were the memory medium, the simulating means simulating the equivalent I/O device by accessing the managed part of memory.

41. The system of claim 40 in which the target system I/O device is a floppy disk controller; the environment means managing the part of the memory to be accessible as if it were a floppy disk.

42. A system for emulating a target system having a central processor for executing a set of target system instructions and a set of target system I/O devices that provides an environment for the central processor; the emulating system comprising:

a host system having a host processor for executing a set of host system instructions different from the target system instructions; and an emulating processor for executing a sequence of the target system instructions; the emulating processor providing signals during execution of the sequence of target system instructions, the signals including an I/O operation signal requesting an I/O operation of the target system I/O devices;

the host system further comprising environment means connected for providing an environment for the emulating processor so that the emulating processor continues to execute the sequence of target system instructions and connected for providing an environment for the host processor so that the host processor executes the host system instructions;

the environment means further being for receiving the I/O operation signal from the emulating processor and for emulating the respective I/O operation of the target system devices in response to the I/O operation signal; the environment means further stopping the emulating processor while emulating the respective I/O operation in response to the I/O operation signal;

the environment means further comprising a memory accessible to the emulating processor; if the requested I/O operation is an I/O input operation, the environment means further being for loading input data into the memory while the emulating processor is stopped;

the environment means further being for permitting the emulating processor to resume operation after the requested I/O operation has been emulated;

the emulating processor further being for retrieving the input data from the memory when it resumes operation;

the host processor independently executing a sequence of the host system instructions while the emulating processor executes the sequence of target system instructions.

43. A system for emulating a target system having a central processor for executing a set of target system instructions and a set of target system devices that provides an environment for the central processor, the set of target system devices including a target system memory and target system I/O devices; the target system further including communication means for communicating signals from the central processor to a first one of the target system I/O devices; the emulating system comprising:

a host system having a host processor for executing a set of host system instructions different from the target system instructions; and an emulating processor for executing a sequence of the target system instructions; the emulating processor providing signals during execution of the sequence of target system instructions, the signals including memory access signals and I/O operation signals; each memory access signal requesting access to the target system memory; each I/O operation signal requesting a respective I/O operation of the target system I/O devices;

the host system further comprising environment means connected for providing an environment for the emulating processor so that the emulating processor continues to execute the sequence of target system instructions and connected for providing an environment for the host processor so that the host processor executes the host system instructions;

the environment means comprising I/O device data from which the environment means can determine a current emulated state of the communication means;

the environment means further being for receiving a fist one of the signals from the emulating processor; the environment means further comprising device emulating means for emulating an I/O operation of the first target system device if the first signal is one of the I/O operation signals requesting an I/O operation of the first target system device; the device emulating means accessing the I/O device data in response to the first signal and using the I/O device data to determine the current emulated state of the communication means;

the environment means further comprising memory; the memory being accessed in response to the first signal if the first signal is one of the memory access signals; the memory being accessed in response to the first signal so that the emulating processor continues to execute the sequence of the target system instructions as if it were the central processor of the target system;

the host processor independently executing a sequence of the host system instructions while the emulating processor executes the sequence of target system instructions.

44. The system of claim 43 in which the first signal includes a memory address if the first signal is one of the memory access signals; the environment means further comprising mapping circuitry for receiving the first signal if the first signal is one of the memory access signals and for mapping the memory address in the first signal to a corresponding location in the memory so that the corresponding location is accessed in response to the first signal.

45. A system for emulating a target system having a central processor for executing a set of target system instructions and a set of target system devices that provides an environment for the central processor, the target system devices including a target system I/O device for performing a target system I/O operation, the emulating system comprising:

- a host system having a host processor for executing a set of host system instructions different from the target system instructions; and
- an emulating processor for executing a sequence of the target system instructions; the emulating processor providing signals during execution of the sequence of target system instructions, the signals provided by the emulating processor including a target I/O operation signal requesting the target system I/O operation;
- the host system further comprising environment means connected for providing an environment for the emulating processor so that the emulating processor continues to execute the sequence of target system instructions and connected for providing an environment for the host processor so that the host processor executes the host system instructions; the environment means comprising a printer controller corresponding in function to the target system I/O device; the environment means emulating the target system I/O operation in response to the target I/O operation signal by using the printer controller, the environment means further comprising a multi-character printer buffer for transferring characters from the emulating processor to the printer controller during emulation of the target system I/O operation; the environment means further managing the printer buffer to generate input signals for the emulating processor reflecting the status of the buffer;
- the environment means further comprising a memory, the host processor being connected for storing a series of characters from the printer buffer in the memory for subsequent printing, the environment means determining whether to provide the characters from the buffer to the printer controller or to store the characters for subsequent printing;
- the host processor independently executing a sequence of the host system instructions while the emulating processor executes the sequence of target system instructions.

46. A system for emulating a target system having a central processor for executing a set of target system instructions and a set of target system devices that provides an environment for the central processor, the target system devices including a target system I/O device for performing a target system I/O operation, the emulating system comprising:

- a host system having a host processor for executing a set of host system instructions different from the target system instructions; and
- an emulating processor for executing a sequence of the target system instructions; the emulating processor providing signals during execution of the sequence of target system instructions, the signals provided by the emulating processor including a target I/O operation signal requesting the target system I/O operation;
- the host system further comprising environment means connected for providing an environment for the emulating processor so that the emulating processor continues to execute the sequence of target system instructions and connected for providing an environment for the host processor so that the host processor executes the host system instructions; the environment means comprising a printer controller corresponding in function to the target system I/O device; the environment means emulating the target system I/O operation in response to the target I/O operation signal by using the keyboard controller, the environment means further comprising a multi-character printer buffer for transferring characters from the keyboard controller to the emulating processor during emulation of the target system I/O operation; the environment means further interrupting the emulating processor when the keyboard buffer contains at least one code;
- the emulating processor executing an instruction causing it to provide an overflow signal if an input keyboard buffer under its control cannot accept a code from the multi-character keyboard buffer, the environment means further providing the code which could not be accepted to the emulating processor again in response to the overflow signal;
- the host processor independently executing a sequence of the host system instructions while the emulating processor executes the sequence of target system instructions.

47. A system for emulating a target system having a central processor for executing a set of target system instructions and a set of target system devices that provides an environment for the central processor, the target system devices including a target system I/O device for performing a target system I/O operation the emulating system comprising:

- a host system having a host processor for executing a set of host system instructions different from the target system instructions; and
- an emulating processor for executing a sequence of the target system instructions; the emulating processor providing signals during execution of the sequence of target system instructions, one of the signals being a target I/O operation signal requesting the target system I/O operation; the target I/O operation signal includes an address corresponding to the target system I/O device;
- the host system further comprising environment means connected for providing an environment for the emulating processor so that the emulating processor continues to execute the sequence of target system instructions and connected for providing an environment for the host processor so that the host processor executes the host system instructions;
- the environment means comprising I/O monitoring circuitry for detecting the target I/O operation signal and for obtaining monitoring data relating to the target system I/O operation; the monitoring data obtained by the I/O monitoring circuitry including the address; the environment means emulating the target system I/O operation in response to the target I/O operation signal by emulating the target system I/O device based on the address in the monitoring data;

the environment means further comprising a memory storing an I/O operating system for enabling the emulating processor to execute the sequence of target system instructions and for causing the emulating processor to provide at least one non-target I/O operation signal not provided by the target system central processor, the non-target I/O operation signal requesting a non-target I/O operation that is not performed in the target system but that relates to emulation of the target system I/O operation; the I/O monitoring circuitry further being for detecting the non-target I/O operation signal and for obtaining monitoring data relating to the non-target I/O operation; the environment means further performing the non-target I/O operation in response to the non-target I/O operation signal based on the monitoring data;

the host processor independently executing a sequence of the host system instructions while the emulating processor executes the sequence of target system instructions.

* * * * *

UNITED STATES PATENT AND TRADEMARK OFFICE
CERTIFICATE OF CORRECTION

PATENT NO. : 5,088,033
DATED : February 11, 1992
INVENTOR(S) : Joseph H. Binkley, et al It is certified that error appears in the above-indentified patent and that said Letters Patent is hereby corrected as shown below:

On the title page, Item [75]:

change "Perry A. Caro; John B. Dillon, all of Palo Alto" to --John B. Dillon, both of Palo Alto--;
Change "Kadifa; Jeffery W. Lee, both of" to --Kadifa,--.

Column 66, line 32: Change "input signals to" to --input signals so--;

Line 34: Change "sequence target system instructions" to --sequence of target system instructions--.

Signed and Sealed this

Second Day of November, 1993

Attest:

BRUCE LEHMAN

Attesting Officer

Commissioner of Patents and Trademarks